US011372663B2

(12) United States Patent
Featonby et al.

(10) Patent No.: US 11,372,663 B2
(45) Date of Patent: Jun. 28, 2022

(54) COMPUTE PLATFORM RECOMMENDATIONS FOR NEW WORKLOADS IN A DISTRIBUTED COMPUTING ENVIRONMENT

(71) Applicant: Amazon Technologies, Inc., Seattle, WA (US)

(72) Inventors: Malcolm Featonby, Sammamish, WA (US); Leslie Johann Lamprecht, Seattle, WA (US); John Merrill Phillips, Seattle, WA (US); Umesh Chandani, Seattle, WA (US); Roberto Pentz De Faria, Sammamish, WA (US); Hou Liu, Issaquah, WA (US); Ladan Mahabadi, Seattle, WA (US); Letian Feng, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 274 days.

(21) Appl. No.: 16/367,801

(22) Filed: Mar. 28, 2019

(65) Prior Publication Data

US 2020/0310852 A1  Oct. 1, 2020

(51) Int. Cl.
*G06F 9/455* (2018.01)
*G06F 9/46* (2006.01)
*G06F 9/50* (2006.01)

(52) U.S. Cl.
CPC ........ *G06F 9/45558* (2013.01); *G06F 9/5027* (2013.01); *G06F 9/5077* (2013.01); *G06F 2009/4557* (2013.01)

(58) Field of Classification Search
CPC .. G06F 9/45558; G06F 9/5027; G06F 9/5077; G06F 2009/4557

(Continued)

(56) References Cited

U.S. PATENT DOCUMENTS 5,881,238 A * 3/1999 Aman ................. G06F 9/505
  709/226
7,568,017 B2 * 7/2009 Shah ................. G06F 9/44505
  709/221

(Continued)

FOREIGN PATENT DOCUMENTS

WO  WO2014182894 B1  11/2014

OTHER PUBLICATIONS

Non Final Office Action dated Aug. 18, 2020 for U.S. Appl. No. 16/368,072, "Optimizing Hardware Platform Utilization for Heterogeneous Workloads in a Distributed Computing Environment", Featonby, 19 pages.

(Continued)

*Primary Examiner* — Bradley A Teets
(74) *Attorney, Agent, or Firm* — Lee & Hayes, P.C.

(57) ABSTRACT

Techniques for an optimization service of a service provider network to help optimize the selection, configuration, and utilization, of virtual machine (VM) instance types to support workloads on behalf of users. The optimization service may implement the techniques described herein at various stages in a life cycle of a workload to help optimize the performance of the workload, and reduce underutilization of computing resources. For example, the optimization service may perform techniques to help new users select an optimized VM instance type on which to initially launch their workload. Further, the optimization service may monitor a workload for the life of the workload, and determine new VM instance types, and/or configuration modifications, that optimize the performance of the workload. The optimization service may provide recommendations to users that help improve performance of their workloads, and that also increase the aggregate utilization of computing resources of the service provider network.

19 Claims, 27 Drawing Sheets

(58) Field of Classification Search
USPC .......................................................... 718/1
See application file for complete search history.

(56) References Cited

U.S. PATENT DOCUMENTS

| | | | |
|---|---|---|---|
| 7,640,342 B1* | 12/2009 | Aharoni | G06F 3/0605 |
| | | | 370/237 |
| 7,653,008 B2* | 1/2010 | Patrick | H04L 67/14 |
| | | | 370/254 |
| 8,290,822 B2* | 10/2012 | Gade | G06Q 30/0621 |
| | | | 705/26.1 |
| 8,935,500 B1 | 1/2015 | Gulati et al. | |
| 9,626,710 B1 | 4/2017 | Chheda et al. | |
| 10,057,122 B1 | 8/2018 | Andersen et al. | |
| 10,108,455 B2* | 10/2018 | Smith | G06F 9/45558 |
| 10,511,481 B1 | 12/2019 | Castellanos et al. | |
| 10,735,281 B1 | 8/2020 | Burgin et al. | |
| 11,003,491 B1 | 5/2021 | Gasser et al. | |
| 2008/0154957 A1* | 6/2008 | Taylor | G16H 40/40 |
| 2012/0290725 A1 | 11/2012 | Podila | |
| 2013/0139155 A1 | 5/2013 | Shah | |
| 2014/0040656 A1 | 2/2014 | Ho et al. | |
| 2014/0182894 A1 | 7/2014 | Liu et al. | |
| 2015/0019301 A1 | 1/2015 | Jung et al. | |
| 2015/0058459 A1 | 2/2015 | Amendjian et al. | |
| 2015/0089034 A1 | 3/2015 | Stickle et al. | |
| 2015/0261459 A1 | 9/2015 | Manoharan et al. | |
| 2015/0304243 A1 | 10/2015 | Jasperson, Jr. et al. | |
| 2018/0027058 A1 | 1/2018 | Balle et al. | |
| 2018/0027060 A1* | 1/2018 | Metsch | H04L 49/25 |
| | | | 709/226 |
| 2018/0123912 A1 | 5/2018 | Bryant et al. | |
| 2018/0314533 A1 | 11/2018 | Azhen et al. | |
| 2019/0146850 A1 | 5/2019 | Quinn et al. | |
| 2019/0235765 A1 | 8/2019 | Crawford et al. | |
| 2019/0235896 A1 | 8/2019 | Semmandampalayam et al. | |
| 2019/0245757 A1 | 8/2019 | Meyer et al. | |
| 2020/0133702 A1 | 4/2020 | Sharma et al. | |
| 2020/0218684 A1 | 7/2020 | Sen et al. | |
| 2020/0233690 A1 | 7/2020 | Bhatnagar et al. | |
| 2020/0310851 A1 | 10/2020 | Featonby et al. | |
| 2020/0310853 A1 | 10/2020 | Featonby et al. | |
| 2020/0310876 A1 | 10/2020 | Featonby et al. | |
| 2020/0314171 A1 | 10/2020 | Featonby et al. | |

OTHER PUBLICATIONS

The PCT Search Report, and Written OPinion dated Jun. 3, 2020 for PCT Application No. PCT/US2020/025258, 12 pages.
The PCT Search Report and Written Opinion dated Jun. 3, 2020 for PCT Application No. PCT/US2020/025287, 12 pages.
Office Action for U.S. Appl. No. 16/367,768, dated Nov. 13, 2020, Featonby, "Classification of Workloads in a Distributed Computing Environment", 67 Pages.
Office Action for U.S. Appl. No. 16/367,914, dated Dec. 9, 2020, Featonby, "Compute Platform Optimization Across Heterogeneous Hardware in a Distributed Computing Environment", 10 Pages.
Office Action for U.S. Appl. No. 16/368,072, dated Dec. 10, 2020, Featonby, "Optimizing Hardware Platform Utilization for Heterogeneous Workloads in a Distributed Computing Environment", 19 Pages.
Office Action for U.S. Appl. No. 16/367,768, dated Apr. 28, 2021, Featonby, "Classification of Workloads in a Distributed Computing Environment" 67 pages.
Office Action for U.S. Appl. No. 16/367,768, dated Aug. 3, 2021, Featonby, "Determining Configuration Parameters to Optimize Workloads", 68 pages.
Office Actionfor U.S. Appl. No. 16/367,862, dated Oct. 6, 2021, Featonby, "Compute Platform Optimization Over the Life of a Workload in a Distributed Computing Environment", 20 pages.
The International Report on Preliminary Patentability for PCT Applicatio No. PCT/US20/25258, dated Oct. 7, 2021.

* cited by examiner

300

DEFINE WORKLOAD – WIZARD

Workload Properties:

302 —

Name - A unique identifier for the workload

> My Workload Name

304 —

Description - A brief description of the workload and its intended purpose

> My Workload Description

306 —

Workload type – The type of your workload

> Web Server ▼

308 —

Workload Questions – The following questions scope your workload

How many visitors do you expect per day?

> 25-50 ▼

What length of time is acceptable for a webpage to load?

> 1-3 seconds ▼

310 —

Environment - The environment in which your workload runs
- ● Production
- ○ Pre-production

312 —

Account IDs – Type the IDs of the user accounts this workload spans

> 111122223333, 444455556666

[ Cancel ]  [ Define workload ]

```
┌─────────────────────────────────────────────────────────────────────────────┐
│ HOST A WORKLOAD ON BEHALF OF A USER ACCOUNT AT LEAST PARTLY USING A FIRST   │
│ VIRTUAL COMPUTING RESOURCE THAT IS PROVISIONED ON FIRST COMPUTING RESOURCES │
│ OF A SERVICE PROVIDER NETWORK, WHEREIN THE FIRST VIRTUAL COMPUTING RESOURCE │
│ IS OF A FIRST VIRTUAL COMPUTING RESOURCE TYPE THAT IS ALLOCATED THE FIRST   │
│                  COMPUTING RESOURCES FOR UTILIZATION                        │
│                                  1302                                       │
└─────────────────────────────────────────────────────────────────────────────┘
                                      │
                                      ▼
┌─────────────────────────────────────────────────────────────────────────────┐
│ IDENTIFY A SECOND VIRTUAL COMPUTING RESOURCE TYPE THAT HAS BEEN MADE        │
│ AVAILABLE FOR USE TO HOST WORKLOADS ON BEHALF OF USER ACCOUNTS ASSOCIATED   │
│ WITH THE SERVICE PROVIDER NETWORK, WHEREIN THE SECOND VIRTUAL COMPUTING     │
│ RESOURCE TYPE IS ALLOCATED SECOND COMPUTING RESOURCES FOR UTILIZATION       │
│                                  1304                                       │
└─────────────────────────────────────────────────────────────────────────────┘
                                      │
                                      ▼
┌─────────────────────────────────────────────────────────────────────────────┐
│ RECEIVE A RESOURCE-UTILIZATION CHARACTERISTIC INDICATING UTILIZATION OF THE │
│                 FIRST COMPUTING RESOURCES BY THE WORKLOAD                   │
│                                  1306                                       │
└─────────────────────────────────────────────────────────────────────────────┘
                                      │
                                      ▼
┌─────────────────────────────────────────────────────────────────────────────┐
│ DETERMINE, BASED ON THE RESOURCE-UTILIZATION CHARACTERISTIC, THAT THE SECOND│
│ VIRTUAL COMPUTING RESOURCE TYPE IS MORE OPTIMIZED TO HOST THE WORKLOAD THAN │
│                  THE FIRST VIRTUAL COMPUTING RESOURCE                       │
│                                  1308                                       │
└─────────────────────────────────────────────────────────────────────────────┘
                                      │
                                      ▼
┌─────────────────────────────────────────────────────────────────────────────┐
│ PROVIDE THE USER ACCOUNT WITH RECOMMENDATION DATA INCLUDING A               │
│ RECOMMENDATION TO MIGRATE THE WORKLOAD FROM BEING HOSTED BY THE FIRST       │
│ VIRTUAL COMPUTING RESOURCE TO BE HOSTED BY A SECOND VIRTUAL COMPUTING       │
│ RESOURCE THAT IS OF THE SECOND VIRTUAL COMPUTING RESOURCE TYPE              │
│                                  1310                                       │
└─────────────────────────────────────────────────────────────────────────────┘
```

FIG. 13

COMPUTE PLATFORM RECOMMENDATIONS FOR NEW WORKLOADS IN A DISTRIBUTED COMPUTING ENVIRONMENT

BACKGROUND

Service providers offer cloud-based services to fulfill users' computing-service needs without the users having to invest in and maintain computing infrastructure required to implement the services. These service providers maintain networks of managed computing resources and functionality to implement various types of scalable, on-demand services, such as storage services, compute services, database services, networking services, and so forth. The networks of computing resources, or "service provider networks," can include computing systems that are located across multiple, distinct regions and interconnected by a communication network, or a series of communication networks, to exchange data. Specifically, data centers or data processing centers, may include a number of interconnected computing devices (or "servers") to provide computing resources to users of the service provider networks.

To increase the utilization of the computing resources, virtualization technologies may allow a single physical computing device to host multiple virtual computing resources. For example, a single computing device can host multiple instances of virtual machines (VM) (also referred to herein as "virtual machine instances" or "VM instances") that appear and operate as independent physical computing devices for users, but each share or are allocated portions of the computing resources of the single, underlying physical computing device. In this way, rather than having a single user or process underutilize the resources of a physical computing device, multiple users or processes can utilize the resources of the physical computing device to increase resource utilization.

To further increase the utilization of the computing resources, and also to more effectively meet the computing resource needs of users, service provider networks may offer a variety of different types of virtual machines. Specifically, a service provider network may offer a selection of VM instance types that are optimized, or biased, to support different use cases on behalf of users. In such examples, the different VM instance types may be allocated different amounts, and/or different combinations, of the computing resources of underlying physical computing devices to provide users with flexibility to choose a VM instance that is more appropriately optimized to support their computing resource needs.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 illustrates a graphical user interface through which a user of a service provider network can define a workload to launch on a VM instance.

FIG. 13 illustrates a flow diagram of an example method for determining that a new VM instance type is more optimized to support a workload than a current VM instance type, and recommending the new VM instance type to a user account associated with the workload.

DETAILED DESCRIPTION

Figure 1:
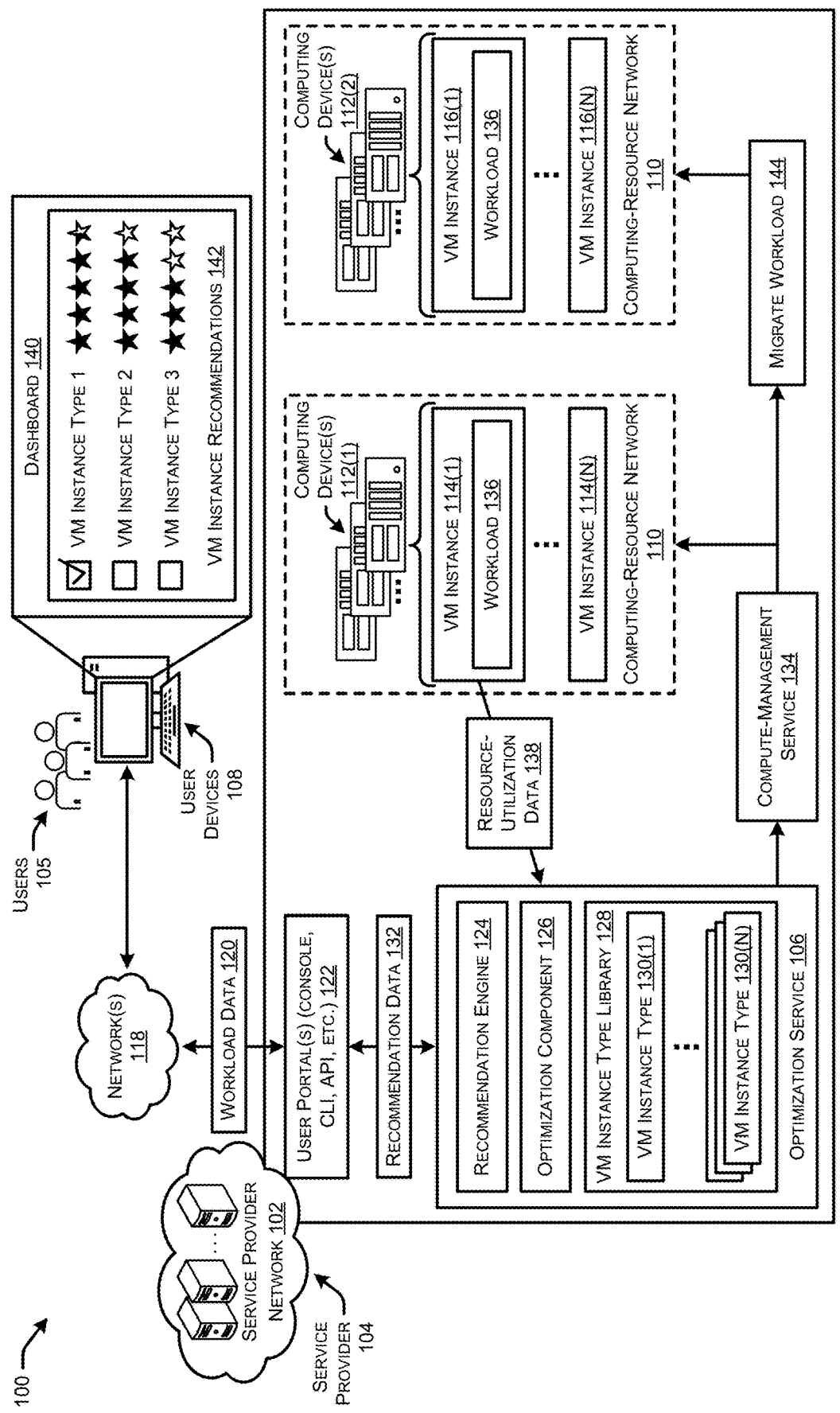
FIG. 1 illustrates a system-architecture diagram of an example environment in which an optimization service of a service provider network determines VM instance types that are optimized to support workloads on behalf of users.

Service providers offer various network-based (or "cloud-based") services to users to fulfill computing needs of the users. These service providers may operate service provider networks that include clusters of managed servers (or other hardware-based computing devices) stored in data centers located across different geographic regions. A user of the service provider network can request that the service provider allocate computing resources in these data centers to support computing workloads on behalf of the users. One or more services of the service provider network can receive these requests and allocate physical computing resources to support the workloads, such as usage of computer processors, memory, storage drives, computer network interfaces, and/or other hardware resources of a computing device, for the user.

As noted above, the service provider networks may utilize virtualization technologies such that the computing devices can each host multiple VM instances that appear and operate as independent computing devices to support workloads of users. Rather than allocating all of the computing resources of a physical computing device to support a single workload for a user, the computing resources of a physical computing device can be allocated amongst multiple VM instances that support different workloads. The service provider network supports many different types of workloads on behalf of users, and these workloads often have different computing resource needs. As described herein, a workload is implemented by a designated set of computing resources and the workload itself can be considered as code or logic that performs functionality using the computing resources. The service provider network may support a wide variety of workloads, such as web servers, databases, customer-facing applications, distributed data stores, batch processing, machine/deep learning training and/or inference, online gaming, video encoding, memory caching, and/or any other type of workload that can be supported by computing resources of a service provider network.

In light of the different workloads that are supported on behalf of users, the service provider network may provide users with a selection of a variety of VM instance types optimized to support different workloads. Generally, each VM instance type may be allocated a different amount of computing resources, and/or different combination of computing resources, such that the VM instance types are optimized, or computationally biased, to support different workloads. As used herein, computing resources refers to compute, memory, storage, networking, and, in some implementations, graphics processing. As an example, one VM instance type may be allocated a larger amount of compute (e.g., processor cycles) and be optimized to support compute-heavy workloads, whereas another VM instance type may be allocated a larger amount of storage (e.g., disk space) and be optimized to support storage-intensive workloads. In this way, users can select a VM instance type or platform that is more optimized to support their workload, thereby increasing the performance of the workload while reducing underutilization of computing resources by the service provider network.

Generally, an increase in the complexity and diversity of VM instance types offered by the service provider network is advantageous and results in a higher likelihood that workloads are supported by a more optimized VM instance. While a large variety of VM instance types is advantageous for various reasons (e.g., efficient utilization of computing resources, high performance for workloads, etc.), it also may become difficult for users, particularly new users, to select a suitable or appropriate VM instance type to support their workload(s). For example, users may attempt to map out the computing resource needs of their workload and then peruse the offering of VM instance types to locate a VM instance type that seems appropriate for their needs. In other examples, users may go through a time-consuming trial-and-error process to analyze performance of their workloads using different VM instance types. However, not only is this time consuming, but it may also result in users having their workloads hosted on VM instance types that are either overutilized and resource constrained, or underutilized and resulting in computing resources that may be unused and sitting idle. As an example, users may be overly cautious and select an oversized VM instance type to help ensure that their workloads are never resource constrained, which may result in low utilization of computing resources of the service provider network.

This disclosure describes techniques and technologies implemented by an optimization service of a service provider network to help optimize the selection, configuration, and utilization of VM instance types to support workloads on behalf of users. The optimization service may implement the techniques described herein at various stages in a life cycle of a workload to help optimize the performance of the workload, and reduce underutilization of computing resources. For example, the optimization service may perform techniques to help new users select an optimized VM instance type on which to initially launch their workload. Further, the optimization service may be configured to monitor a workload for the life of the workload, and determine different VM instance types, and/or different configuration modifications, that optimize the performance of the workload. In this way, the optimization service may provide recommendations to users that help improve performance of their workloads, and that also increase the aggregate utilization of computing resources of the service provider network.

The optimization service may perform techniques to help new users select a VM instance type that is optimized to host or support their workload. Often new users may be unsophisticated with respect to computing resources, and/or unfamiliar with certain terminology. Accordingly, the optimization service may deliver a managed experience, such as a step-by-step process, that allows new users to describe their workload using language and terminology that the new user understands, and then provides the user with recommendations for VM instance type(s) optimized for their workload. In some examples, the optimization service may include a wizard that is accessible to a new user via their user account and presents user interfaces to the user that are configured to receive input data that defines that user's workload. The wizard may present user interface(s) that include text-input fields to receive a textual description of a workload from a user, or fields with a drop-down menu that include answers for a question regarding the workload of the user, such that a user can answer high-level questions about their workloads. For example, the wizard may present the user with questions such as "is your workload a publicly facing website," or "how many visitors do you expect per day?". The optimization service may use the input received from the user to classify the workload as belonging to a predefined workload category (e.g., web-server category, database category, compute-heavy category, etc.), and provide the user account with a listing of recommended VM instance types to support their workload. The listing may further include explanations regarding why the VM instance types are optimized for their workload to enable the user to make a more informed decision regarding what instance type they should select. The user may then select a VM instance type to support their workload, and the optimization service may perform further techniques for launching one or more VM instances of the selected type to support the workload on behalf of the user account. Thus, the optimization service may be configured to identify and recommend VM instance types for new workloads and/or new users.

Additionally, the optimization service may be further configured to help optimize the performance of the workload for the life of the workload. In some instances, and regardless of whether the optimization service previously identified and/or recommended VM instance types for new workloads or new users, the optimization service may determine that the workload would be better suited on a different VM instance type. For example, the workload may have changed over time (e.g., software update, new features, increase in user traffic, etc.) that in turn results in different resource-consumption characteristics of the workload. In light of such modifications or changes, the optimization service may continually, or periodically, analyze the resource-utilization characteristics of the workload and determine if resource consumption has changed significantly enough such that a new VM instance type is more appropriate for the workload than the current VM instance type. In other examples, the service provider network may develop and offer new VM instance type(s) to increase the offerings of VM instance types for users. The optimization service may use various techniques, such as workload simulation, to determine that the new VM instance type is more optimized for the workload (or workload category to which the workload belongs) than the currently utilized VM instance type. For such reasons, and potentially other reasons, the optimization service may provide the user account with recommendations that the user migrate their workload from the current VM instance type to be hosted by a different VM instance type that is more optimized for the resource consumption/utilization of the workload.

To determine a VM instance type that is optimized for a workload, the optimization service may have generated a predefined set of workload categories that generally represent or group the workloads supported by the service provider network into categories based on the "shape" of the utilization characteristics of the workloads. The shape of utilization characteristics can refer to the amount of usage across each different compute dimension—processing, memory, storage, networking, and optionally graphics processing—which may be visualized as a plot having a number of axes corresponding to the number of compute dimensions. The plotting of utilization along each axis can result in a specific shape, for example a quadrilateral or other polygon formed by connecting the plotted points. This may be a static shape representing an average or mean utilization, a set of shapes representing minimum, maximum, average, or other statistical analyses of utilization over time, or a dynamic shape representing utilization across the compute dimensions over time. Certain utilization shapes (or ranges of similar utilization shapes) may be determined (manually or by application of suitable machine learning analysis) to represent particular types of workloads. For example, the optimization service may have collected resource-utilization data for workloads that are supported by the service provider network, and based on the resource-utilization characteristics (or "resource-consumption characteristics") of the workloads, performed techniques, such as clustering, to group the workloads into categories based on the shape of their resource utilization. To illustrate, one predefined workload category may be a "database workload category" and generally correspond to the resource-utilization characteristics for database workloads (e.g., low compute consumption, high storage consumption, etc.). Another predefined workload category may be a "compute heavy category" and generally correspond to the resource-utilization characteristics for computationally-biased workloads.

Each of the workload categories may be defined by a respective resource-utilization model that indicates that shape of the resource-utilization characteristics for the workloads represented by the workload category. The resource-utilization models may indicate amounts of the different types of resources consumed by the representative workloads (e.g., amounts of CPU, storage, memory, networking throughput, GPU, etc.), and or combinations of the different types of resources consumed by the representative workloads. The workload categories may further be associated with the VM instance types that are optimized for the resource-utilization characteristics of the represented workloads. In this way, when resource-utilization characteristics are obtained from a description provided by a new user, or through actual utilization data throughout the life of a workload, the resource-utilization characteristics may be mapped to the "closest" resource-utilization model of a predefined workload category, and the associated VM instance types for that workload category may be provided as recommendations to optimize performance of the workload.

In addition to utilizing resource-utilization characteristics to determine an optimized VM instance type for a workload, the optimization service may further take into account the performance of the underlying physical computing devices. Service provider networks may manage large amounts of computing resources, and in some examples, may include computing devices with hardware differences. The service provider network may include computing devices that have different chip set generations, different vendors, and/or different hardware architectures such that actual performance of the computing devices varies based on the hardware differences. For example, a computing device that has a chip set from a newer generation may perform better, or have more data throughput, than a computing device with a chip set from an older generation of chip sets. Thus, even if a VM instance is provided with, for example, the same number of virtual central processing units (vCPUs) when provisioned on two different computing devices, the performance for one of the VM instances hosting a workload may be better due to hardware differences (or improvements) in the physical resources of the computing devices. To help account for performance differences that result from physical hardware differences, the optimization service may map utilization data back to the underlying physical computing resource that is consumed to get a performance metric for that computing device. In this way, performance metrics may be assigned to the underlying computing device on which a VM instance is provisioned to help determine an optimized VM instance type based on the computing device that is to be utilized. In an example where a workload is migrated from a less compute-performant device onto a more compute-performant device, the optimization service may select a new VM instance type based in part on a ratio of the performance between the two devices. In this way, the optimization service may select a new VM instance type that may not need be allocated as much compute power of the more compute-performance computing device.

Additionally, the optimization service may be configured to collect various data regarding an application stack of the workload and/or an operating system of the VM instance, and determine modifications to make to configuration parameters of the application stack and/or operating system to help optimize the performance of the workload. For example, the optimization service may infer various configuration data about the workload based on utilization characteristics, such as inferring that the workload is a database based on the utilization characteristics of the workload mapping to a workload category for databases. In some instances, the optimization service may, with permission from the user account, install a software agent locally to the VM instance(s) that support the workload, and collect configuration data using the software agent. The optimization service may receive configuration data indicating information about the application stack and/or operating system, such as what processes are running, what binary backs the processes, what repositories those binaries are sourced from, what operating system and/or version is running, what configuration parameters are defined for the operating system, disk subsystem, database stack, etc., and/or any other configuration data. The optimization service may then determine modifications for a parameter of at least one of the application stack and/or operating system to optimize performance of the workload, and provide recommendations indicating the modifications for the parameter. The user may then utilize their user account and accept or deny the proposed modifications to optimize their workload.

In addition to selecting a VM instance type that is optimized for the workload, the optimization system may also intelligently place the VM instance type on a computing device based on computational biases of the VM instance types. As noted above, the different types of VM instance types may have different computational biases based on the workloads they support, such as CPU biases, memory biases, network throughput biases, and so forth. Rather than placing virtual machines with similar computational biases on the same physical computing devices, the optimization service may determine complimentary combinations of VM instance types based on their computational biases, and place those complimentary combinations on the same servers. For example, the optimization service may place a VM instance type that utilizes high CPU resources, but low memory resources, on the same computing device as another VM instance type that utilizes low CPU resources, but high memory resources. In some examples, the optimization service may store indications of complimentary pairs, or complimentary combinations, of VM instance types that are determined to be complimentary based on the resource-utilization models of the workload categories to which the VM instance types are associated or belong. In this way, the underlying computing resources of the computing devices may be more efficiently and effectively utilized by intelligently hosting different VM instance types that are complimentary in how they utilize computing resources.

Although the techniques described herein are described primarily with respect to determining a VM instance type for a workload, and provisioning a VM instance to support the workload, the techniques are equally applicable for any number of VM instances and/or workloads. For example, a workload may be supported by a VM instance, by multiple VM instances, and/or by a fleet of VM instances. In some examples, one or more workloads may be supported by a fleet of VM instances that are scalable to support increases and decreases in use, and may be placed behind one or more load balancing devices of the service provider network. In such examples, the techniques described herein may be applicable to all VM instances in a fleet that support various instances of the same workload.

To provide users more control over their workloads and VM instance types, the optimization service may simply provide recommendations via user accounts that the users should consider new VM instance types and/or configuration parameters to optimize performance of their workload. However, in some examples the optimization service may be configured to automate the migration of workloads to new VM instance types, and/or implementation of new configuration parameters. For example, the users may select an option, or "opt in," to give the optimization service permission to automate the migration of workloads to new VM instance types.

In some examples, prior to recommending or automating the migration of workloads to new VM instance types, or the modification of configuration parameters, the optimization service may test the recommended changes on one or more "test" VM instances. That is, the optimization service may designate, or spin up, a VM instance type that is determined to be more optimized for a workload than a current VM instance type. The optimization service may then cause a workload to be hosted or supported by the proposed VM instance type and monitor the health or performance of the workload. If the workload does in fact perform better on the proposed VM instance type compared to the current VM instance type, then the optimization service may move forward with providing a recommendation to a user account, and/or automating the migration of the workloads for the user to the new VM instance type.

This application describes techniques that increase the overall utilization of computing resources provided by servers or other hardware devices, such as CPU, GPU, memory, disk, and/or network availability. The optimization service may determine VM instance types that are more appropriately tailored, or allocated a more appropriate amount of computing resources, to support for workloads. In this way, the techniques described herein help prevent underutilization of computing resources of a service provider network, which reduces the amount of computing resources that are (i) allocated or reserved for VM instances, but (ii) sit idle or unused because the VM instances are oversized for the workload they support. Additionally, the techniques improve the performance of workloads by intelligently placing workloads on VM instance types that are computationally biases or optimized to support the workloads. The optimization service may place the workloads on VM instances to help ensure that the workloads have sufficient amounts of computing resources available, of the types of computing resources needed, to help avoid over constrained VM instance types and workloads.

Although the techniques described herein are with reference to virtual machines or VM instances and virtual machine types, in some examples, the techniques are applicable to any type of virtual computing resource. For example, the techniques are generally applicable to any type of virtual computing resource that is allocated underlying portions of physical computing resources and executes within a virtual machine, or independently executes on the physical computing resources. Such virtual computing resources can include a container executing on a physical resource, a virtual machine instance running one or more containers, processes, software, and/or any other executable that is allocated portions of physical computing resources.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which an optimization service of a service provider network determines VM instance types that are optimized to support workloads on behalf of users.

As illustrated, a service provider network 102 may be operated and/or managed by a service provider 104. The service provider network 102 may provide various services to users 105 to fulfil their computing resource needs, such as cloud-based computing resources. For example, the service provider network 102 may provide cloud-based, scalable, and network accessible compute power services, storage services, database services, and/or other services. Users 105 may utilize user devices 108 to subscribe for use of the computing resources and/or services provided by the service provider network 102. The service provider network 102 may include an optimization service 106 that is configured to select VM instance types to support workloads of the users 105 which optimize performance of the workloads, and refrain from underutilization or overutilization of the computing resources that support the VM instances and workloads.

The service provider network 104 may span across different geographic regions, and include or be associated with a computing resource network 110 that includes clusters of managed computing devices 112 (e.g., servers) stored in data centers located across the different geographic regions. In this way, users 105 who have subscribed for use of the network-based services supported by computing resources in the data centers 116 need not invest in and maintain the computing infrastructure required to implement the various services that they may need. In some examples, users 105 of the service provider network 102 may access or utilize computing resources of the computing devices 112 in the data centers located in different geographic regions such that users 105 located in these different geographic regions are provided with access these resources and services.

Generally, the computing devices 112 may provide various types of computing resources, such as compute (CPU) resources (e.g., central processing units (CPUs) for processing data), memory resources (e.g., physical devices capable of storing information such as RAM or ROM), storage resources (e.g., disk storage or drive storage used to store data by various electronic, magnetic, optical, or mechanical changes to a surface layer of one or more rotating disks), graphics compute (GPU) resources (e.g., graphics processing units (GPUs)), and/or network throughput resources (e.g., average or measured rate of bit transmission per second over networks). The computing devices 112 may be various types of computing devices, such as devices that have different chip set generations, are from different vendors, have different hardware architectures, and so forth.

Thus, the computing resources of the computing-resource network 110 provided by the computing devices 112 can include, for example, any hardware computing device resources, such as processor computing power/capacity, read-only and/or random-access memory, data storage and retrieval systems, device interfaces such as network or peripheral device connections and ports, and the like. In some embodiments, these resources may be dispersed among multiple discrete hardware computing devices (e.g., servers), and these hardware computing devices 112 may implement or communicate with a virtualization layer and corresponding virtualization systems (e.g., a hypervisor on a server), whereby the compute resources are represented by, and made accessible as, virtual computing resources, such as instances of virtual machine or "VM instances." A virtual computing resource may be a logical construct, such as a data volume, data structure, file system, and the like, which corresponds to certain compute resources. Non-limiting examples of virtual computing resources include virtual machines and containers (as described below), logical data storage volumes capable of storing files and other data, software programs, data processing services, and the like.

As illustrated, the computing devices 112 may each support VM instances that may be different types of VM instances provided by the service provider network 102. For instance, computing devices 112(1) may support one or more VM instances 114(1)-114(N) that are of a first VM instance type, and computing devices 112(2) may support one or more VM instances 116(1)-116(N) that are of a second VM instance type. Rather than allocating all the computing resources of an entire computing device 112 to support a workload for the user 105, the service provider network may include a virtualization layer (e.g., containing one or more hypervisors) that includes instances of "virtual" computing resources (also referred to interchangeably herein as "virtual machines" or "VM instances") that represent the allocated portions of the physical computing resources of the computing devices 112. These VM instances 114/116 may emulate computing devices 112 to operate and support workloads, and may have their own operating systems, processing capabilities, storage capacity, and network connections or interfaces.

Users 105 may create user accounts with the service provider 104 to utilize the resources and services of the service provider network. The users 105 may utilize their user devices 108 to communicate over one or more networks 118 (e.g., WANs, PANs, LANs, etc.) with the service provider network 102. The user devices 106 may comprise any type of computing device configured to communicate over network(s) 118, such as mobile phones, tablets, laptop computers, desktop computers, televisions, servers, and/or any other type of computing device. The users 105 may desire that the service provider network 102 host or support workloads on the computing resource network 110 that is managed by the service provider 104. Accordingly, the users 105 may, via their user account, request that a workload be launched on their behalf, and provide workload data 120 via one or more user portals 122 (e.g., web console, command line interface (CLI), application programming interface (API), etc.). The user portals 122 may provide the workload data 120 to the optimization service 106 which includes a recommendation engine 124, an optimization component 126, and a VM instance type library 128 storing indications of different VM instance types 130(1)-130(N) offered by the service provider network.

As described herein, a workload 136 may generally include a designated collection or grouping of computing resources (e.g., compute, memory, storage, networking, etc.) in the computing-resource network 110, and the code or logic that performs functionality using the computing resources. The service provider network 102 may support a wide variety of workloads 136, such as web servers, databases, customer-facing applications, distributed data stores, batch processing, machine/deep learning training and/or inference, online gaming, video encoding, memory caching, and/or any other type of workload that can be supported by computing resources of the computing-resource network 110.

The user 105 may provide workload data 120 that generally indicates one or more resource-utilization characteristics of the workload 136 that is to be hosted or supported on behalf of the user's account. In some instances, the optimization service 106 may provide a wizard that is accessible to the user 105 via their user account and presents, via the user portal(s) 122, user interfaces to the user device 108 that are configured to receive the workload data 120 that defines that user's workload 136. The wizard may present user interface(s) that include text-input fields to receive a textual description of a workload from a user, or fields with a drop-down menu that include answers for a question regarding the workload of the user, such that a user can answer high-level questions about their workloads. Further description of the wizard is found below with respect to at least FIG. 3.

In other examples, the user 105 may have previously hosted their workload 136 using on-premise computing resources, or other managed computing resources, and obtain actual resource-utilization characteristics that indicate the amount and types of computing resources utilized by the workload 136. In such examples, the user 105 may provide the actual resource-utilization data as part of the workload data 120 to the service provider network 102.

The optimization service 106 includes the optimization component 126 that is configured to determine one or more VM instance types 130 that are optimized to support the workload 136 on behalf of the user 105. The service provider 102 may offer a wide variety of VM instance types 130 that differ based on (i) the amounts of physical computing resources allocated for use by the VM instance type 130, and/or (ii) the combinations of the types of physical computing resources allocated for use by the VM instance type 130. In some instances, there may be at least five high-level categories or types of computing resources included in the computing-resource network 110 and provided by the computing devices 112, which are CPU, GPU, memory, storage, and network throughput. The different VM instance types 130 are allocated different amounts and/or combinations of these, and potentially other, computing resources. For example, the VM instance types 130 may be allocated use of larger or smaller amounts of the different resource types to be computationally biased or optimized support workloads 136 with various computing resource utilization characteristics.

For example, the VM instance types 130 can include compute optimized types, memory optimized types, accelerated optimized types, storage optimized types, and/or network throughput optimized types. As a specific example, a VM instance type 130 that is compute optimized may be allocated use of 4 vCPUs of 3.0 GHz processors where each core can run at up to 3.5 GHz, but only be allocated 8 gibibytes (GiB) of memory. Conversely, a VM instance type 130 that is memory optimized may be allocated 32 GiB of memory, but only run on a 3.1 GHz processor with 2 vCPUs.

In addition to biasing the VM instance types 130 by varying the amounts or ratios of computing resource types allocated for use by the different VM instance types 130, the service provider 104 may further include different sizes of VM instance types 130 for workloads 136 that require more or less computing resources at various ratios. For example, a smaller VM instance type 130 that is computationally biased may be allocated 2 vCPUs of a 3.0 GHz processor and 4 GiB of memory, and an extra-large VM instance type 130 that is computationally biased may be allocated 72 vCPUs on the 3.0 GHz processor and 144 GiB of memory (e.g., 36x the vCPUs and memory allocation of the smaller type).

Accordingly, the service provider 104 may offer a wide selection of VM instance types 130 that are included in a VM instance type library 128 in which a user 105 can search and select a desired VM instance type 130 for their workload 136. Traditionally, the users 105 would have to mentally map out the computing resource needs of their workload 136 and peruse the library 128 offering of VM instance types 130 to locate a VM instance type 130 that seems appropriate for their needs. However, not only is this time consuming, but it may also result in users 105 having their workloads hosted on VM instance types 130 that are either overutilized and resource constrained, or underutilized and resulting in computing resources that may be unused and sitting idle.

The optimization component 126 may be configured to determine one or more VM instance types 130 that are optimized to host or support the workload 136. For example, the optimization component 126 may generally map the workload data 120 (e.g., resource-utilization data, description of the workload 136, etc.) to one or more VM instance types 130 that are computationally biases, or optimized, to support the resource utilization of the workload 136. In some examples, and described in more detail with respect to FIG. 2, the optimization component 126 may generate predefined workload categories or groups that generally represents higher-level categories of workloads 136 commonly hosted on the computing-resource network 110. For example, one workload category may be a database category and represent different database workloads supported by the computing-resource network 110. Another category may be a web-server category and represent the different web-server workloads supported by the computing-resource network 110. The optimization component 126 may analyze the different types of workloads 136 supported across the computing-resource network 110 on behalf of the user accounts and define (e.g., machine learning, clustering, etc.) a set of workload categories that are generally representative of the different workloads 136 supported by the computing-resource network 110.

Further, the optimization component 126 may determine one or more resource-utilization models for each workload category that represent the general "shape" or characteristics of the resource utilization by the workloads 136 represented in each category. That is, each workload category may be associated with one or more resource-utilization models that are generally representative of the resource consumption by workloads 136 in the workload category. The optimization component 126 may further determine, based on the resource-utilization models (or by user account selection) which of the VM instance types 130 are computationally biased or optimized for the different workload categories. As an example, VM instance type 130 that are compute optimized may be associated with a high-performance web server workload category, whereas a VM instance type 130 that is memory optimized may be associated with a higher-performance database category. In this way, workload categories may be generated or predefined that are representative of the resource-utilization characteristics for the workloads 136 that are supported by the computing-resource network, and also indicate the VM instance types 130 that are optimized or biased to support the workloads for each workload category.

The optimization component 126 may map the workload data 120 to at least one of the predefined workload categories in various ways. For instance, the workload data 120 may include one or more words that describe the resource-utilization data of the workload 136, such as "web server," "database," "compute heavy," and so forth. In some examples, the optimization component 126 may simply map actual utilization data of the workload 136 to a workload category in instances where the user 105 is migrating the workload 136 from a remote computing-resource network onto the computing-resource network 110. After the optimization component 126 maps the workload data 120 to one of the predefined workload categories, the recommendation engine 124 may provide recommendation data 132 to the user device 108 that includes at least a recommendation of a VM instance type 130 that is optimized to support their workload 136.

The recommendation engine 124 may determine one or more of the VM instance types 130 associated with the workload category, and may further rank the VM instance types 130 based on how strongly the workload data 120 corresponds to one of the VM instance types 130 for that workload category. Depending on the size (e.g., amount of resources), and/or the combination of computing resources, for the workload 136, the recommendation engine 124 may provide a ranked listing of VM instance types 130 that are recommended for the workload data 120. In some examples, the recommendation engine 124 may further provide suitability data that indicates how suitable the recommended VM instance types 130 are for supporting the workload 136, such as indicating a number of stars out of five stars, percentages indicating how suitable out of one-hundred percent, and/or any other suitability score or indicator. Further, the recommendation engine 124 may provide a textual explanation regarding why the VM instance types 130 are optimized to support the workload 136 such that the user 105 may make a more intelligent decision as to which of the VM instance types 130 they would like to launch their workload 136 on. The VM instance recommendations 142 may be presented in a dashboard 140 accessible via the user portal(s) 122, and the user 105 may select the VM instance type 130 on which they would like to launch their workload 136.

The optimization service 106 may receive input data indicating a selection of the a recommended VM instance type 130, and provide a compute-management service 134 an instruction to launch the workload 136 on one or more (e.g., a fleet) of VM instances 114 that correspond to the VM instance type 130 that the user 105 selected. In some examples, the workload 136 may include code provided by the user 105, and/or generated by the service provider network 102, to implement functionality of the desired workload 136. For example, the service provider network 102 may provide services that generate code for the workload 136, including an application stack and/or other programs, to implement the workload 136. The workload 136 may be supported by one VM instance 114, and/or a fleet of VM instances 136. In some examples, one or multiple VM instances 114 in a fleet of VM instances 114 may support respective workloads 136 on behalf of the user account of the user 105. The compute-management service 134 may further deploy one or more load balancers in front of the fleet of VM instances 114 to scale the workload(s) 136, and other configurations or devices (e.g., security groups) to support the workload. In this way, the optimization service 106 may help a user 105 select, configure, and utilize a VM instance type 130 that is optimized to support a new workload 136 for the user's 105 account.

In some examples, the optimization service 106 may further monitor the workload 136 for the life of the workload 136, and provide additional recommendation data 132 upon detecting events that result in a different VM instance type 130 being more optimized to support the workload than the current VM instance type 130 to which the VM instance 114 corresponds. For instance, the user 105 may provide an indication to the optimization service 106 that the workload 136 has undergone a configuration change (e.g., update, software change, traffic change, etc.) that will likely result in a change in the resource-utilization characteristics of the workload 136. In other examples, the optimization service 106 may periodically, or continuously, collect resource-utilization data 138 from the VM instance 114 that indicates a change in the resource-utilization characteristics of the workload 136.

In light of such modifications or changes, the optimization service 106 may continually, or periodically, analyze the resource-utilization data 138 of the workload 136 and determine if resource consumption has changed such that a new VM instance type 130 is more appropriate for the workload 136 than the current VM instance type 130 (e.g., VM instance 114). In other examples, the service provider 102 may develop and offer new VM instance type(s) 130 to increase the offerings of VM instance types 130 for users 105. The optimization service 106 may use various techniques, such as workload simulation, to determine that the new VM instance type 130 is more optimized for the workload 136 (or workload category to which the workload 136 belongs) than the currently utilized VM instance type 130. For such reasons, and potentially other reasons, the optimization service 106 may provide the user account of the user 105 with additional recommendation data 132 that includes a recommendation for the user 105 migrate their workload 136 from the current VM instance type 130 (e.g., VM instance 114) to be hosted by a different VM instance type 130 (e.g., VM instance 116) that is more optimized for the resource consumption/utilization of the workload 136.

In such examples, the optimization service 106 may provide an instruction to the compute-management service 134 to migrate the workload 144 to be hosted on one or more VM instances 116(1)-(N) that correspond to the VM instance type 130 that was determined to be more optimized for the workload 136.

Generally, the optimization service 106, and components thereof, may comprise software, firmware, and/or other logic that is supported one computing device, or across more computing devices in the service provider network 102. Additionally, the optimization service 106 may comprise a system of other devices, such as software agents stored locally on VM instances 114/116.

Figure 2:
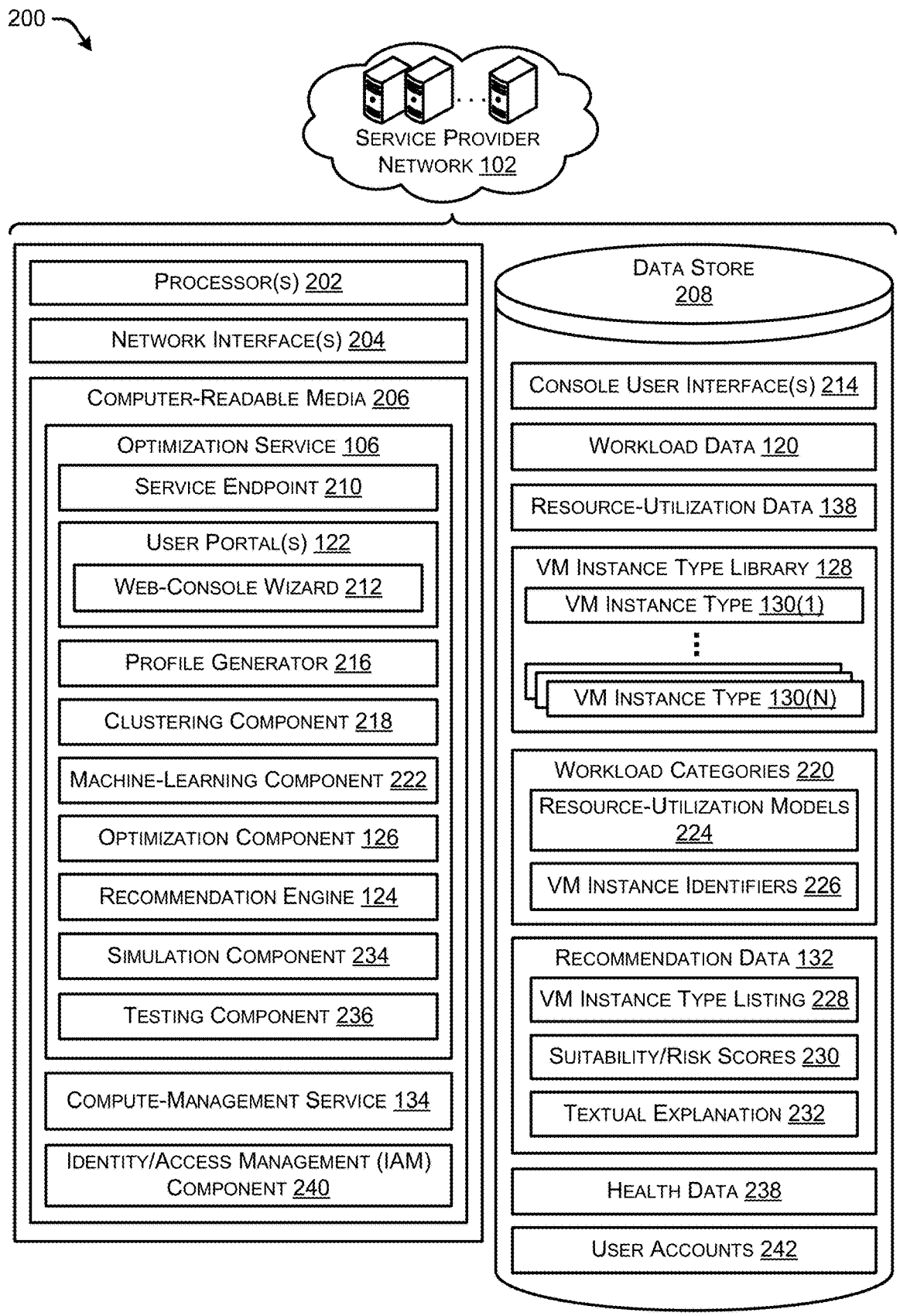
FIG. 2 illustrates a component diagram of example components of a service provider network that help optimize the selection, configuration, and utilization of VM instance types to support workloads on behalf of users.

FIG. 2 illustrates a component diagram 200 of example components of a service provider network 102 that help optimize the selection, configuration, and utilization of VM instance types 130 to support workloads 130 on behalf of users 105.

As illustrated, the service provider network 102 may include one or more hardware processors 202 (processors), one or more devices, configured to execute one or more stored instructions. The processor(s) 202 may comprise one or more cores. Further, the service provider network 102 may include one or more network interfaces 204 configured to provide communications between the service provider network 102 and other devices, such as the user device(s) 108, computing devices 112, and/or other systems or devices in the service provider network 102 and/or remote from the service provider network 102. The network interfaces 204 may include devices configured to couple to personal area networks (PANs), wired and wireless local area networks (LANs), wired and wireless wide area networks (WANs), and so forth. For example, the network interfaces 204 may include devices compatible with Ethernet, Wi-Fi, and so forth.

The service provider network 102 may also include computer-readable media 206 that stores various executable components (e.g., software-based components, firmware-based components, etc.). In addition to various components discussed in FIG. 1, the computer-readable-media 206 may further store components to implement functionality described herein. While not illustrated, the computer-readable media 206 may store one or more operating systems utilized to control the operation of the one or more devices that comprise the service provider network 102. According to one embodiment, the operating system comprises the LINUX operating system. According to another embodiment, the operating system(s) comprise the WINDOWS SERVER operating system from MICROSOFT Corporation of Redmond, Wash. According to further embodiments, the operating system(s) can comprise the UNIX operating system or one of its variants. It should be appreciated that other operating systems can also be utilized.

Additionally, the service provider network 102 may include a data store 208 which may comprise one, or multiple, repositories or other storage locations for persistently storing and managing collections of data such as databases, simple files, binary, and/or any other data. The data store 208 may include one or more storage locations that may be managed by one or more database management systems.

The computer-readable media 206 may store portions, or components, of the optimization service 106 described herein. For instance, the computer-readable media 206 may store a service endpoint 210 that may include a stack that supports internet routable APIs to describe, generate, delete, and make recommendations using resource-utilization data 138 or characteristics. Generally, this service stack of the service endpoint 210 may support APIs, CLI, consoles, SDKs, and/or any other function through which the components of the optimization service call, and/or the user devices 108.

The computer-readable media 206 may further store the user portal(s) 122 through which users 105 can provide input via their user accounts and user devices 108. In some examples, the user portal(s) 122 include an interface through which users 105 can upload resource-utilization data 138 from on-premise or other remote computing systems that hosted their workload 136. Additionally, the user portal(s) 122 may include the web-console wizard 212 which presents one or more console user interface(s) 214 (or UIs 214) through which the users 105 may provide workload data 120 that defines or describes their workloads 136. The service endpoint 210 may receive calls from APIs, CLIs, SDKs, and/or other electronic means or methods.

The computer-readable media 206 may further store a profile generator 216 that generates a snapshot of profiling data, such as a resource-utilization characteristic included in the resource-utilization data 138, at regular intervals. The profile generator 216 may then utilize these snapshots to create a resource fingerprint for a workload 136, which generally represents the resource consumption of the workload 136. These fingerprints or profiles may be included in the resource-utilization data 138 and be mapped to VM instance types 130 and/or workload categories for the workload 136. The profile generator 216 may further accumulate and average all resource-utilization data 138 for a fleet of VM instances 114/116 in order to generate a consumption fingerprint for a fleet of VM instances 114/116.

The computer-readable media 206 may further store a clustering component 218 configured to create or generate the workload categories 220. As described in more detail with respect to FIG. 4, the clustering component 218 may obtain historical (or near-real time) utilization data 138 and cluster the workloads 136 for some or all of the user accounts of the service provider network 102 to generate the workload categories 220 that are generally representative of all the workloads 136 in the service provider network 102.

The computer-readable media 206 may further store a machine-learning (ML) component 222 configured to generate the resource-utilization models 224 for each of the workload categories 220. The ML component 222 may perform various techniques, and utilize various ML algorithms, to train one or more resource-utilization models 224 that represent resource-utilization characteristics representative of the workloads 136 in each workload category 220. In this way, when a new workload 136 needs to be categorized for purposes of identifying optimized VM instance types 130, the resource-utilization data 138 for the new workload 136 may be mapped to the resource-utilization model 224 that is "closest" or "most near" (e.g., neural network models) the fingerprint of the resource-utilization data 138 for the new workload 136. The ML component 222 may utilize any type of ML algorithm or technique to train the resource-utilization models 224.

The computer-readable media 206 may further store the optimization component 126 configured to perform techniques described above for mapping resource-utilization data 138 to the appropriate workload categories 220, such as machine-learning methods or ruled based methods. For example, the optimization component 126 may compare utilization by the workload 136 for one or more dimensions of compute (e.g., CPU, GPU, memory, disk, and/or network throughput) with the resource-utilization models 224 to identify closest match across the one or more dimensions of compute. The optimization component 126 may further determine which of the VM instance identifiers 226 are associated with the workload categories 220, and provide the user(s) 106 with indications of the optimized VM instance types 130 that are optimized for their workload 136.

The computer-readable media 206 may further store the recommendation engine 124 that is configured to generate and provide recommendation data 132 to the user device 108 to recommend VM instances 114 on which to initially launch workloads 136, and also to continue to monitor the workload 136 for the life of the workload 136 and determine if other VM instance types 130 are more optimized for the workload 136. The recommendation engine 124 may generate recommendation data 132 including a VM instance type listing 228 (e.g., ranked list of VM instance types 130 based on suitability for the workload 136), suitability/risk scores 230 that indicate how suitable or optimized a VM instance type 130 is for the workload 136, and/a textual explanation 232 that details why a VM instance type 130 is optimized for the workload 136. The recommendation engine 124 may, if the user 105 opts in for a recommendation, provide recommendation data 132 to the user devices 108 to help users 105 select a VM instance type 130 on which to initially launch a new workload 136, and/or as the workload 136 becomes more suitable to be supported by different VM instance types 130 throughout the life of the workload 136.

The suitability/risk scores 230 may indicate various data regarding how suitable a VM instance type 130 is to support a workload 136. For example, the suitability/risk scores 230 may indicate only how suitable a VM instance type 130 is to support a workload 136 using various numeric, text-based, and/or other scoring means. In some examples, the suitability/risk scores 230 may only indicate how risky a VM instance type 130 is to support a workload 136 using a scoring means (e.g., risk of bottlenecks). In some examples, there may be multiple suitability/risk scores 230 indicating risk and suitability. In further examples, the suitability/risk scores 230 may be a single score indicated a weighting between risk and suitability to indicate an overall appropriateness of the VM instance type 130 for supporting a workload 136.

The computer-readable media 206 may further store a simulation component 234 that simulates workloads 136 on VM instances 114. For instance, rather than using historical resource-utilization data 138, the simulation component 234 may simulate consumption by different workloads 136 on different VM instance types 130 in order to determine what workloads 136 are optimized for what VM instance types 130 (e.g., throughput compared to allocated computing resources). Additionally, the simulation component 234 may simulate workloads 136 on new VM instance types 130 that have been introduced by the service provider 104 for use by the users 105. For example, the simulation component 234 may simulate the consumption of different workloads 136 on the new VM instance types 130, and determine performance metrics that indicate throughput of data for amounts of computing resources input into the new VM instances 114. In this way, when a new VM instance type 130 is offered to users 105, the optimization service 106 may still determine what workload categories 220, and thus what workloads 136, would benefit from being migrated and/or launched on the new VM instance type 130.

The computer-readable media 206 may further store a testing component 236 configured to test workloads 136 on VM instances 114 prior to migrating the workloads 136. For example, the optimization service 106 may allocate computing devices 112 to support test VM instances 114. Using these test VM instances 114, the testing component 236 may determine whether a workload 136 actually performs well, or is further optimized, when placed on a new VM instance 116 as compared to a current VM instance 114. For example, the testing component 236 may "spin up" or provision a VM instance 116 corresponding to a VM instance type 130 that the optimization component 126 has determined is optimized for a workload 136. Prior to recommending the new VM instance type 130 to a user 105, the testing component 236 may first test the workload 136 on the test VM instance 116 and receive health data 238 indicating how well the workload 136 is performing. Based on the health data 238, the testing component 236 can provide insight to the optimization component 126 regarding whether or not the new VM instance type 130 is in fact optimized compared to the current VM instance type 130 for the workload 136.

The computer-readable media 206 may further store code for the compute-management service 134, which may be implemented by one, or multiple, computing devices 112 of the service provider network 102. Generally, the compute-management service 134 may be a service of the service provider network 102 that provides secure, resizable compute capacity and manages the computing resources of the computing-resource network 110. In some examples, the compute-management service 134 may perform various functions for managing the computing-resource network 110, such as provisioning VM instances 114, migrating workloads 136 between VM instances 114/116, providing auto-scaling for fleets of VM instances 114, configuring VM instances 114 and/or workloads 136, and/or performing any other functions for managing the computing-resource network 110. In some instances, the compute-management service 134 may receive commands from the optimization service 106 for managing the workloads 136 and/or VM instances 114/116 for users 105 of the service provider network 102.

In some examples, the compute-management service 134 may include an auto-scaling component that, when executed by the processor(s) 202, scales up or down the number of instances 114 available to support one or more workloads 136. For example, the auto-scaling component may provide a fast, efficient, and accurate way to match fleet capacity to usage. In some examples, the auto-scaling component may track the fleet's hosting metrics and determine when to add or remove instances 114 based on a set of guidelines, called policies. The auto-scaling component can adjust capacity in response to changes in demand to help ensure that the fleet of instances 114 has availability for bursts without maintaining an excessive amount of idle resources.

To utilize the services provided by the service provider network 102, users 105 may register for an account with the service provider network 102. For instance, users 105 may utilize a user device 108 to interact with an identity and access management (IAM) component 240 that allows the users 105 to create user accounts 242 with the service provider network 102. Generally, the IAM component 240 may enable the users 105 to manage their workloads 136 and other computing resources securely. Using the IAM component 240, the users 105 may manage their VM instances 114 as described herein. Additionally, users 105 may perform various operations for interacting with the optimization service 106 via their user accounts 242, such as providing workload data 120, receiving recommendation data 132, proving input data indicating selections of VM instance types 130, and/or other interactions may be authorized via credentials required to access the user accounts 242.

The computer-readable media 206 may be used to store and retrieve information, such as program modules, data structures, or other data. It should be appreciated by those skilled in the art that computer-readable storage media is any available media that provides for the non-transitory storage of data and that can be accessed by the service provider network 102. In some examples, the operations performed by the service provider network 102, and or any components included therein, may be supported by one or more server devices. Stated otherwise, some or all of the operations performed by the service provider network 102, and or any components included therein, may be performed by one or more computer devices operating in a cloud-based arrangement.

By way of example, and not limitation, computer-readable storage media 206 can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

FIG. 3 illustrates a graphical user interface (GUI) 300 through which a user 105 of a service provider network 102 can define a workload 136 to launch on a VM instance 114.

The GUI 300 may be presented on a user device 108, and accessible via a user account 242 and a console 122. In some examples, the GUI 300 may be part of the web-console wizard 212 that assists the user 105 in selecting an optimized or appropriate VM instance type 130 for a new workload 136. The web-console wizard 212 may provide the users 105 with enough information for them to make a decision regarding a VM instance type 130 that is appropriate for their workload 136.

The GUI 300 may include a name option 302 through which the user 105 may provide tagging information in the form of a name of the workload, or other unique identifier for the workload 130. In this case, the name option 302 indicates that the name is "My Workload," which may be any terminology used by the user to identify their workload and may be used by the optimization component 126 to label resource groups associated with the workload. The GUI may further include a description portion 304, such as a text field in which the user 105 may provide a brief description of the workload 130 and its intended purpose. Again, this text may be provided to assist the user with recognizing this particular workload among a group of their workloads, and/or may be utilized by the optimization component 126 to map the workload data 120 to a predefined workload category 220, and thus a set of VM instance IDs 226 to recommend.

The GUI 300 may further include a workload-type field 306, which may include drop-down selections of predefined answers that help the optimization component 126 select an appropriate workload category 220. In this case, the selected predefined answer in the workload-type field 306 is "Web Server," which narrows the workload 130 to a web server. The GUI 300 may additionally include one or more workload questions 308, and fields for answers, that help narrow-down the workload 130 of the user 105. In this example, the questions may prompt the user 105 for information they may know, without requiring that the user 105 has technical or computing-resource knowledge. For example, the workloads questions 308 can include asking how many visitors are expected in a day, what length of time is acceptable for a webpage to load, and so forth. With these types of questions, unsophisticated users 105 can provide valuable information in terms that make sense to them, rather than having them sort through VM instance types 130 with more complex terminology. For example, these types of workload questions 308 may replace questions including terminology such as "what kind of network bandwidth will your workload need," "what kind of storage requirements do you need to support your webpage," or "what kind of latency requirements do you have for your webpage?". However, the answers to these types of questions may map the workload data 120 to appropriate workload categories 220 and/or VM instance type 130 sizes (e.g., amount of allocated computing resources).

Further, the GUI 300 may include an environment option 310 where the user 105 can indicate whether the workload 130 is production, or pre-production, as well as a list of account IDs 312 over which the workload 130 spans (e.g., existing user accounts 242 the workload 130 is usable and/or configurable by). Once the user 105 has finished with the step-by-step process provided by the web-console wizard 212, the user 105 may select the define workload option 314 and generate the workload data 120. The workload data 120 may then be provided to the optimization service 106 via the user portal(s) 122, such as the console.

It should be understood that the GUI 300 is merely illustrative and any type of user interface, or combination of user interfaces, may be utilized to prompt a user 105 for information that describes or defines their workload 130. Additionally, any type of input mechanism may be used to receive input data (e.g., workload data 120) that can be used to define a workload 130 in addition to text-input fields or drop-down selections.

Figure 4:
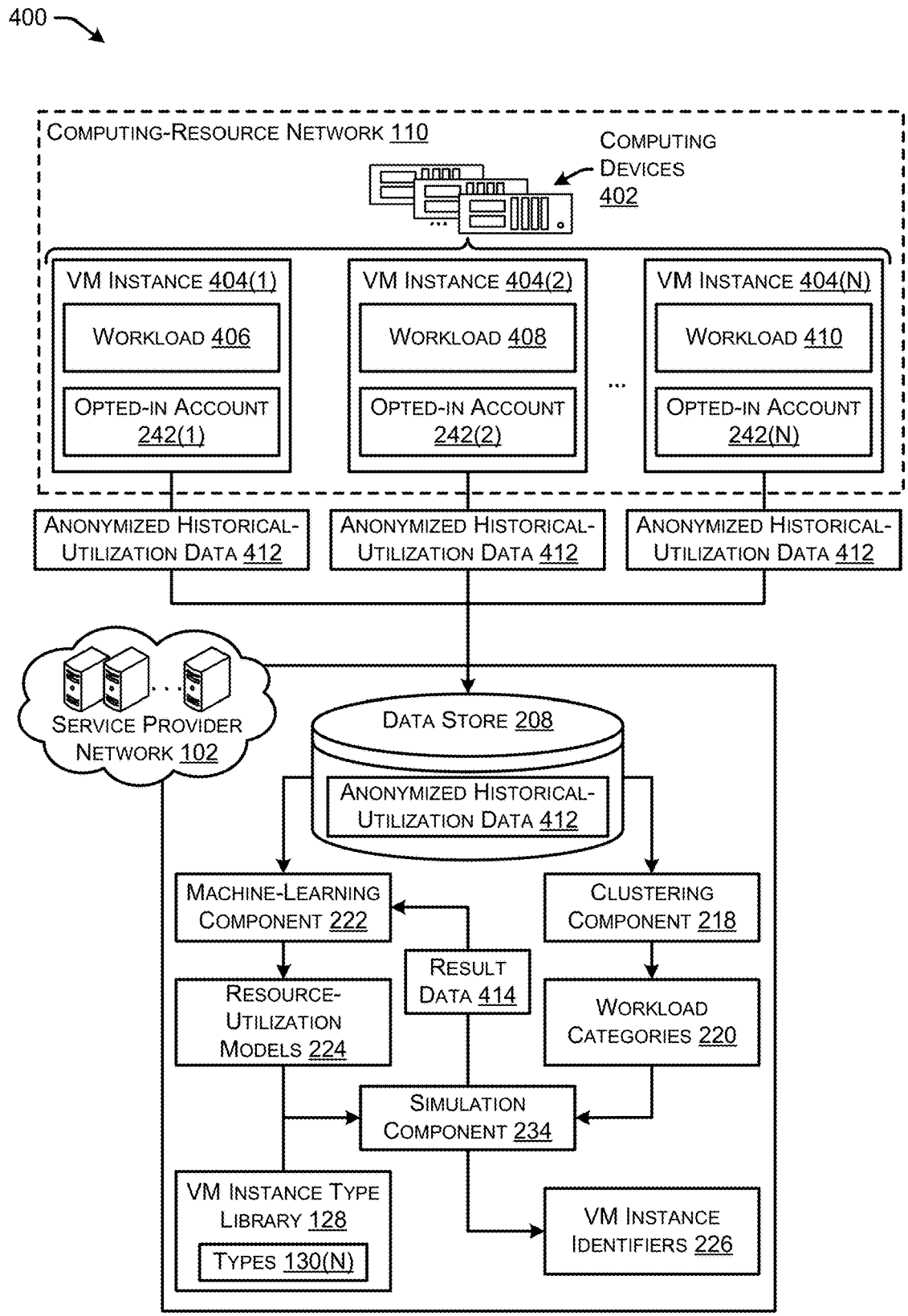
FIG. 4. illustrates a system-architecture diagram of a service provider network that utilizes historical-utilization data from VM instances and workloads across user accounts to generate workload categories and resource-utilization models.

FIG. 4. illustrates a system-architecture diagram 400 of a service provider network 102 that utilizes anonymized historical-utilization data from VM instances and workloads across user accounts to generate workload categories and resource-utilization models. According to the examples described herein, the anonymized historical-utilization data 412 is collected from workloads that are hosted on behalf of user accounts 242 that have "opted-in" to allow the service provider network 102 to collect the data. For instance, the opted-in accounts 242(1)-(N) may have all expressly allowed or opted-in to give permission to the service provider network 102 to collect utilization data from their workloads to help improve the optimization service 106 described herein. Additionally, the utilization data collected may be anonymized to generate anonymized historical-utilization data 412 that does not indicate from which opted-in account 242 the data is associated with. In this way, not only are the opted-in accounts 242 aware that their utilization data is being harnessed, but the utilization data is anonymized using various techniques to generate the anonymized historical-utilization data 412 that prevents the opted-in accounts 242 from being identified based on the anonymized historical-utilization data 412, thereby protecting the privacy of opted-in accounts 242. Thus, not only do the accounts opt-in, but their identities are protected by using anonymized historical-utilization data 412.

The computing-resource network 110 may include a plurality of computing devices 402 interconnected by various networks. In some examples, the computing devices 402 may be positioned in data centers located across different geographic regions (e.g., servers in datacenters) and provide computing resources that are allocated amongst different VM instances 404(1)-(N) (where "N" is any integer greater than 2 as described in this application). Many different users may have created user accounts 242(1)-(N) and requested that the service provider network 102 provision and/or deploy various VM instances 404(1)-(N) on the computing resources 402 to support different types of workloads 406(1)-(N). For example, each user account 242 may have at least one workload 406 supported on at least one VM instance 404 per workload 406. The workloads 406 may comprise a wide variety of workloads 406 as described above, and may be provisioned on a wide variety of VM instance types 130. Accordingly, the service provider network 102 has large amounts of workloads 406, hosted or supported on a wide variety of VM instances 404 of different VM instance types 130, and supporting a wide variety of workloads 406 with different resource-consumption characteristics.

The service provider network 102 may determine to utilize anonymized historical-utilization data 412 from the VM instances 404 and the workloads 406(1)-(N) to generate the workload categories 220 and resource-utilization models 224, and/or assign VM instance identifiers 226 to workload categories 220 for which the corresponding VM instance types 130 are optimized. In such examples, the service provider network 102 may collect the anonymized historical-utilization data 412 in a data store 208, such as one or more repositories or storage locations. To determine or generate the workload categories, the service provider network 102 may utilize the clustering component 218 to cluster the wide variety of workloads 406 based on the anonymized historical-utilization data 412. More specifically, the clustering component 218 may analyze the anonymized historical-utilization data 412 to cluster the different types of workloads 406 into workload categories 220 based on similarities between the anonymized historical-utilization data 412 for the different workloads 406.

The clustering component 218 may generate or determine the workload categories 220 using various clustering or classification techniques. The clustering techniques performed by the clustering component 218 may be unsupervised clustering techniques, supervised clustering techniques, partially supervised clustering techniques, and/or any combination thereof. For example, the clustering component 218 may cluster in time series where individual time series of the anonymized historical-utilization data 412 is grouped based on similar time series into a same cluster. As a specific example, game-hosting servers may scale more during the day, or certain hours of the day, such as evenings when players are no longer working. More broadly, workloads 406 that have spikes and lulls in particular types of computing resources (e.g., CPU, memory, disk, network bandwidth, GPU, etc.) may be clustered into the same workload categories 220. The clustering component 218 may determine a number of clusters (e.g., based on the number of workload types), and utilize a clustering method, such as k-means clustering, to cluster types of the workloads 406 into the workload categories 220 until a sufficient amount of the workloads 406 have been assigned to a workload category 220 such that the workload categories are substantially representative of the different types of workloads 406 supported by the service provider network 102. The clustering component 218 may then be utilized to assign names to the workload categories 220 based on, for example, tagging data associated with the workloads 406. For example, a workload category 220 representing workloads 406 that often have a name assigned to them via the GUI 300 that includes "website" may be called a "website" cluster. In some examples, the workload category 220 may be assigned a name based on the anonymized historical-utilization data 412 for the represented workloads 406. For instance, a workload category 220 that represents workloads 406 with heavy CPU consumption may be named "compute-heavy." In this way, the clustering component 218 may create, generate, or otherwise define workload categories 220 that are representative of different types of workloads 406 across the computing-resource network 110.

The ML component 222 may be configured to generate the resource-utilization models 224 for each of the workload categories 220. The ML component 222 may perform various techniques, and utilize various ML algorithms, to train one or more resource-utilization models 224 that represent resource-utilization characteristics representative of the workloads 406 in each workload category 220. For instance, when the workload categories 220 have been generated, the ML component 222 may analyze the anonymized historical-utilization data 412 for the workloads 406 in each workload category 220 and determine a resource-utilization model 224 for that workload category 220 that generally represents the included workloads 406.

The ML component 222 may utilize various machine learning techniques or algorithms to generate the resource-utilization models 224. As a specific example, the ML component 222 may represent or normalize the dimensions of compute for the anonymized historical-utilization data 412 of each of the workloads 406 and create feature data representing the anonymized historical-utilization data 412. Specifically, the ML component 222 may generate feature vectors that represent the anonymized historical-utilization data 412 across the dimensions of compute (e.g., CPU, GPU, memory, disk, and network throughput) for each workload 406. The ML component 222 may then utilize the feature data of the anonymized historical-utilization data 412 as input into an ML algorithm, such as a neural network, regression algorithms, classification algorithms, and/or any other ML algorithm, and train the resource-utilization models 224. In this way, the ML component 222 may generate resource-utilization models 224 for each workload category 220 using anonymized historical-utilization data 412 for workloads 406 hosted by VM instances 404 across the computing-resource network 110. The resource-utilization models 224 may be representative of resource-utilization data 138 for the workloads 406 that are included in the workload categories 220. In this way, when a new workload 136 needs to be categorized for purposes of identifying optimized VM instance types 130, the resource-utilization data 138 for the new workload 136 may be mapped to the resource-utilization model 224 that is "closest" or "most near" the fingerprint of the resource-utilization data 138 for the new workload 136. In some examples, the ML component 222 may utilize other types of data to train the resource-utilization models 224, such as infrastructure supporting the workloads 406-410, health status checks for the workloads 406-410, and/or other types of data indicating performance for the workloads 406-410 on the different VM instances 404(1)-404(N). In some examples, the infrastructure supporting the workload may include information regarding network topology, network security groups (e.g., protocols and port ranges), network traffic patterns, presence and configuration of load balancers, and scaling triggers for auto scaling groups to learn more about workloads 406-410. Some, or all, of this infrastructure information associated with infrastructure supporting the workloads 406-410 may be utilized to train the resource-utilization models 224.

The simulation component 234 may then analyze various data to determine the VM instance identifiers 226 that are to be assigned to the workload categories 220 as being optimized or computationally biased to support the workloads 406 in the categories 220. For instance, the simulation component 234 may simulate various workloads on VM instances 404 in order to collect performance data indicating how well the simulated workloads performed on the various VM instances 404. In some examples, the simulation component 234 may simulate consumption of computing resources by mimicking utilization similar to that of the resource-utilization models 224 assigned to each workload category 220 on the VM instances 404. The simulation component 234 may then collect simulation data that represents performance (e.g., data throughput compared to computing resources allocated to the VM instance 404 supporting a simulated workload), and determine which VM instances 404 perform well, or are optimized, for the different resource-utilization models 224. The simulation component 234 may then assign VM instance types 130 to workload categories 220 based on how well the VM instance types 130 perform when supporting the simulated workloads 406 for those categories 220. The simulation component 234 may assign VM instance identifiers 226 to workload categories based on the VM instance types 130 determined to be optimized for the workload categories 220. The simulation component 234 may further provide result data 414 back to the ML component 222 to utilize to further train the resource-utilization models 224. The result data 414 may include the simulation results for the simulation component 234 simulating the different workloads on the different VM instance types 130 to determine resource-utilization data for simulated workloads.

Thus, resource-utilization data 138 for workloads 136 may be mapped to, or matched to, workload categories 220 that are associated with resource-utilization models 224 that have the most similar resource-utilization characteristics. The workloads 136 may then be categorized as belonging to the workload category 220 that is associated with the most similar resource-utilization model(s) 224. Once assigned to a workload category 220, the optimization component 126 may determine, based on the associated VM instance identifiers 226, which of the VM instance types 130 are optimized to support the workload 136. In some examples, the ML component 222 may train the resource-utilization models 224 using only the anonymized historical-utilization data 412, only the result data 414 from the simulation component 234, a combination thereof, and/or any other data.

Figure 5:
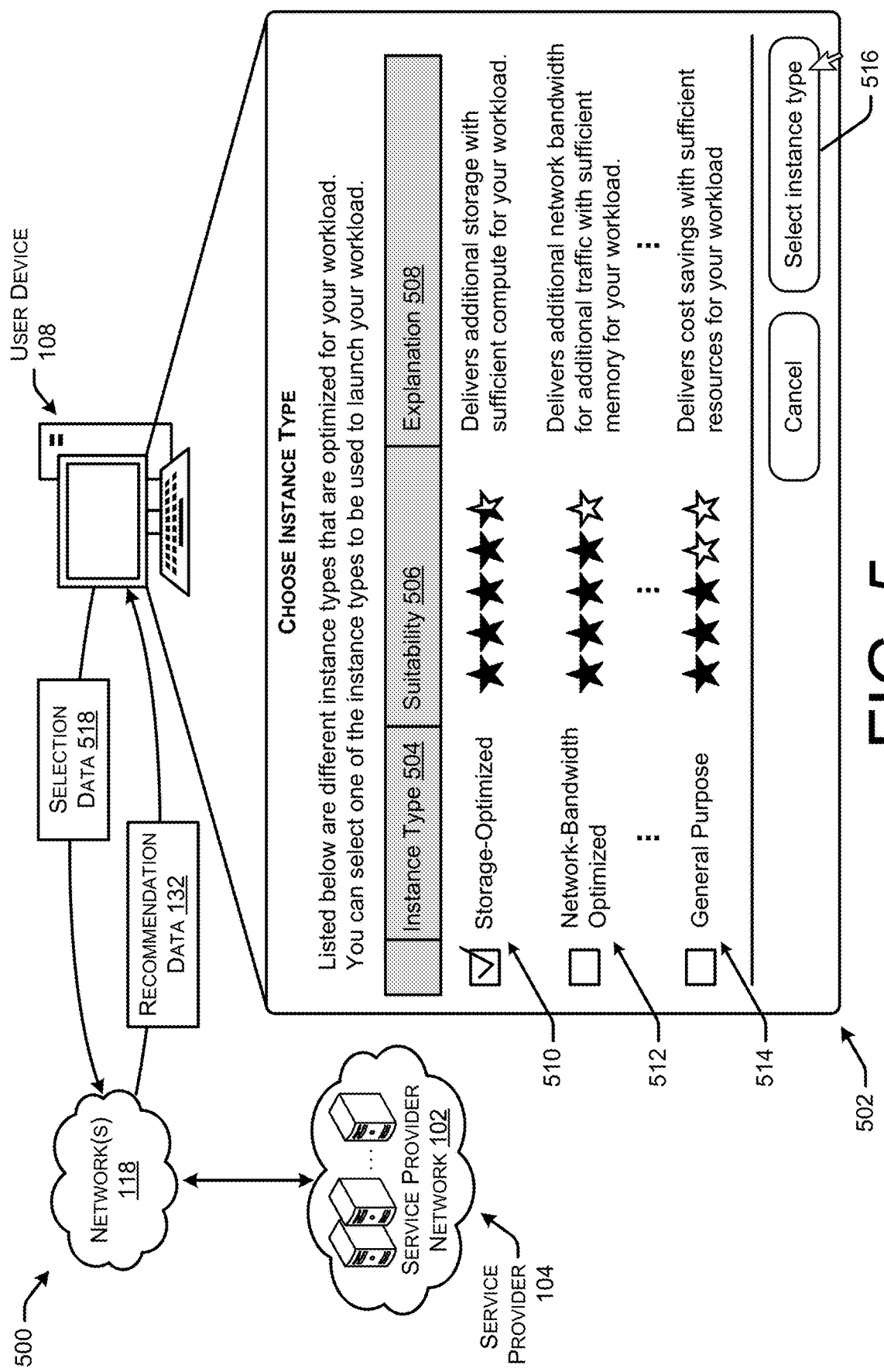
FIG. 5 illustrates a graphical user interface through which a user of a service provider network can review recommendations regarding VM instance types that are optimized to support their workload.

FIG. 5 illustrates an example architecture 500 including a graphical user interface 502 through which a user 105 of a service provider network 102 can review recommendations regarding VM instance types 130 that are optimized to support their workload 130. In some examples, the GUI 502 may present data received as part of the recommendation data 132 from the service provider network 102. Additionally, the GUI 502 may be presented on the user device 108, and accessible via a user account 242 and the console 122. In some examples, the GUI 502 may be part of the web-console wizard 212 that assists the user 105 in selecting an optimized or appropriate VM instance type 130 for launching a new workload 136.

The GUI 502 may comprise options through which a user 105 can select or choose a VM instance type 130. The GUI 502 may list different VM instances types 130 that have been determined by the optimization service 106 as being optimized for the workload 130 associated with the user account 242 through which the console 122 is accessed. The GUI 502 may allow the user 102 to select one of the VM instance types 130 to launch their workload 130 in an automated fashion.

As shown, the GUI 502 may present instance type 504, suitability 506, and explanations 508 for the recommended VM instance types 130. In the illustrated example, a first VM instance 510 may be storage optimized, have a suitability 506 of 4.5 out of 5 stars, and have an explanation 508 indicating that the VM instance type 510 delivers additional storage with sufficient compute for the workload 130. Similarly, a second VM instance 512 may be network-bandwidth optimized, have a suitability 506 of 4 out of 5 stars, and have an explanation 508 indicating that the VM instance type 512 delivers additional network bandwidth for additional traffic with sufficient memory for the workload 130. Finally, a third VM instance 514 may be general purpose, have a suitability 506 of 3 out of 5 stars, and have an explanation 508 indicating that the VM instance type 514 delivers cost saving with sufficient resources for the workload 130.

Using this recommendation data 132, the user 105 can make a more informed decision as to what VM instance type 130 to utilize to support their workload 130, check a box next to the VM instance type 130 they desire, and further provide input into a select instance type control 516. Upon selecting the instance type, selection data 518 may be sent from the user device 108, over the network(s) 118, to the service provider network 102 to indicate that the user 105 is requesting to have their workload 130 launched or supported by the first VM instance type 510.

It should be understood that the GUI 502 is merely illustrative, and any type of user interface, or combination of user interfaces, may be utilized to receive input data indicating a selection of a recommended VM instance type 130. Additionally, any type of input mechanism may be used to receive input data (e.g., selection data 518) that can be used to select a VM instance type 130 than that described and illustrated.

FIGS. 6A, 6B, 7, 8, 11-13, 15, 16, 18, 19, and 24-26 illustrate flow diagrams of example methods 600, 700, 800, 1100, 1200, 1300, 1500, 1600, 1800, 1900, 2400, 2500, and 2600 that illustrate aspects of the functions performed at least partly by the service provider network 102 as described in this disclosure. The logical operations described herein with respect to FIGS. 6A, 6B, 7, 8, 11-13, 15, 16, 18, 19, and 24-26 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 6A, 6B, 7, 8, 11-13, 15, 16, 18, 19, and 24-26 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 6A:
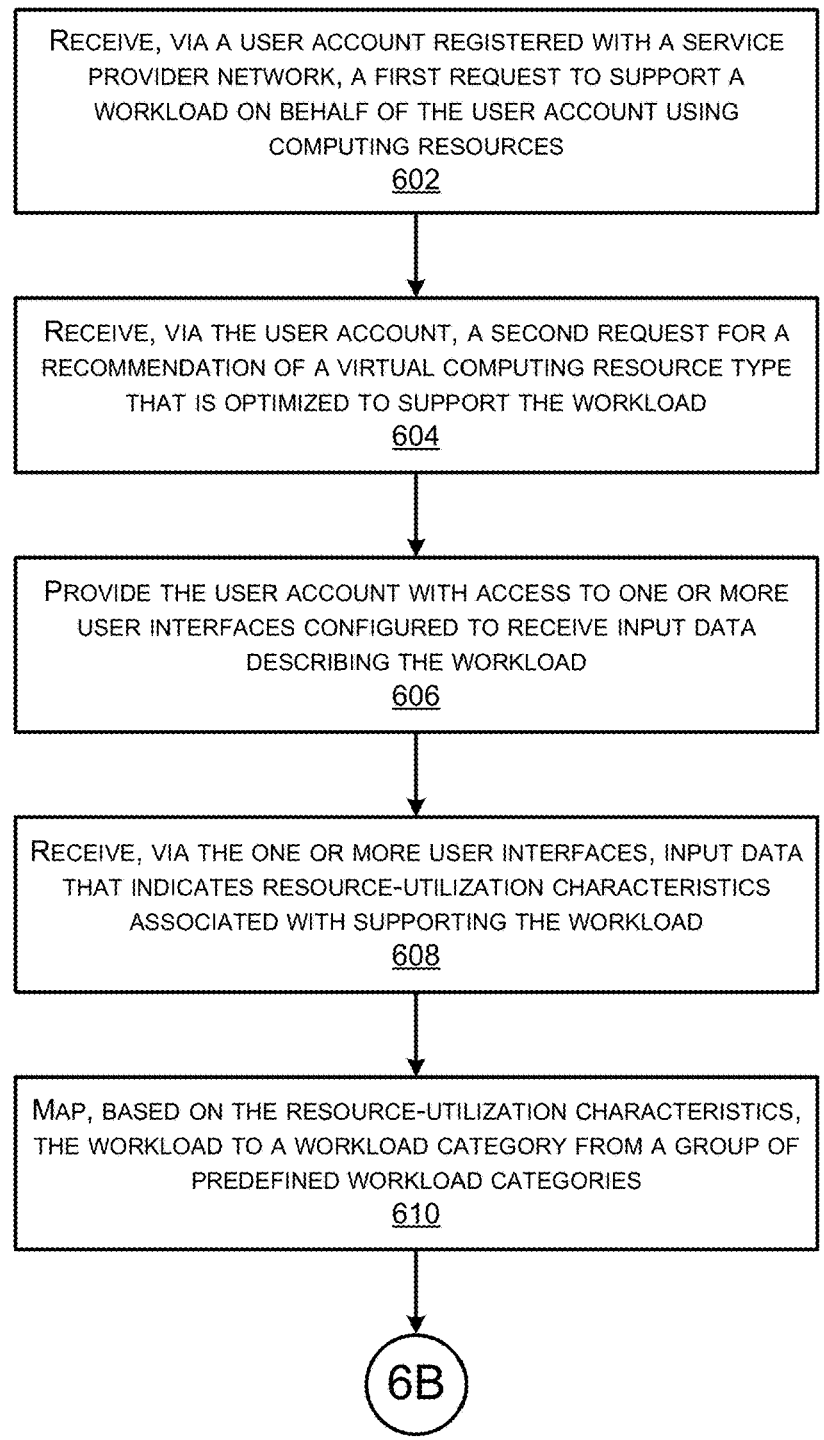
FIGS. 6A and 6B collectively illustrate a flow diagram of an example method for a service provider network to receive a definition of a workload from a user account through one or more user interfaces, mapping the workload to a predefined workload category, and provide the user account with a recommendation as to a VM instance type to support their workload.
Figure 6B:
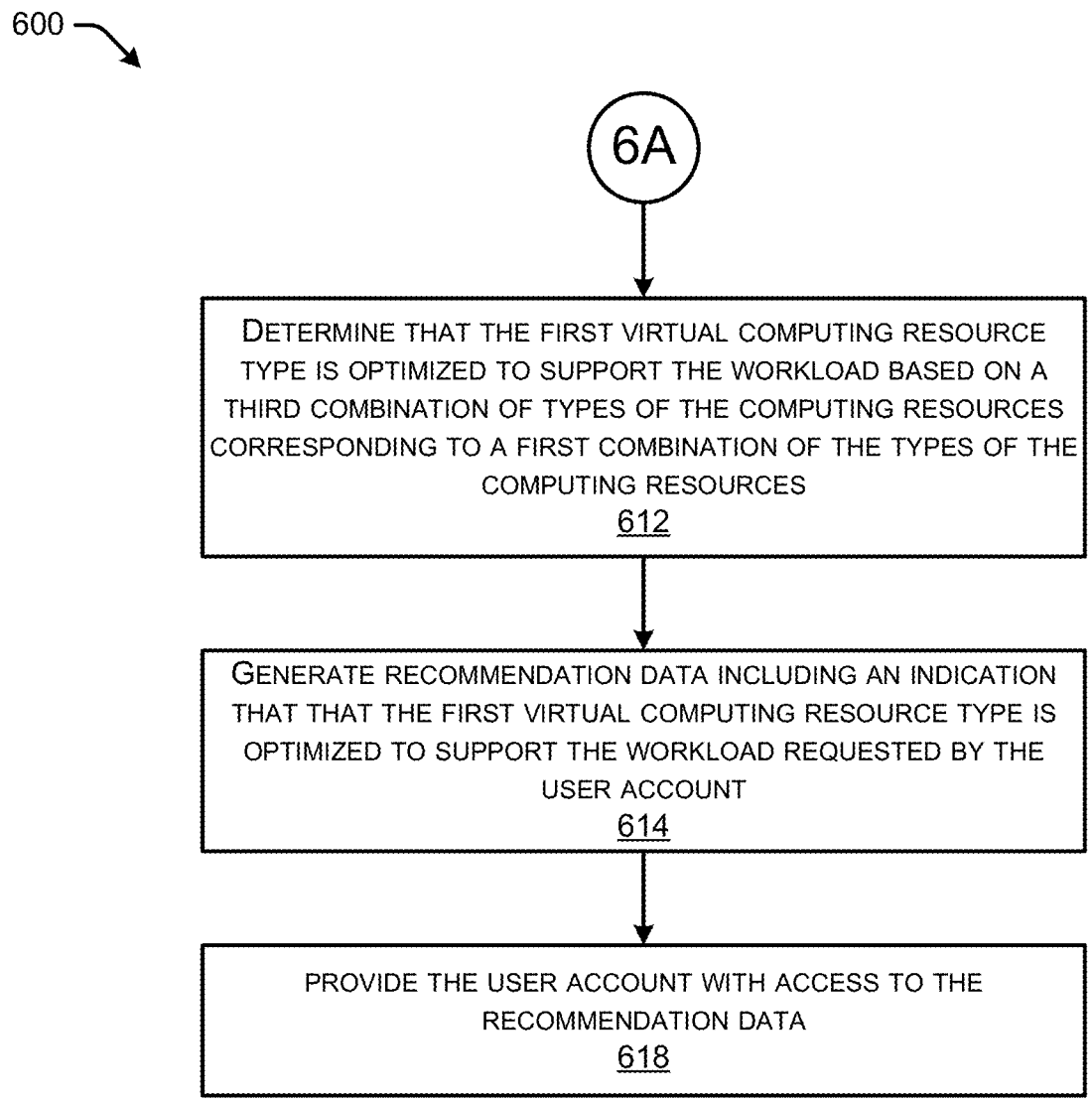

FIGS. 6A and 6B collectively illustrate a flow diagram 600 of an example method for a service provider network 102 to receive a definition of a workload 136 from a user account 242 through one or more user interfaces, mapping the workload 136 to a predefined workload category 220, and provide the user account 242 with a recommendation 132 as to a VM instance type 130 to support their workload 136. As described herein, a virtual computing resource may comprise one or more of a VM instance 114, a virtual container, a program, and/or any other virtual representation.

In some examples, the techniques of method 600 are performed using a system that includes a computing resource network 110 of a service provider network 102 that is managed by a service provider 104. The computing resource network 110 may be configured to support at least a first virtual machine (VM) instance type 130 configured to utilize a first combination of types of the computing resources to support workloads 136, and a second virtual computing resource type 130 configured to utilize a second combination of the types of the computing resources to support workloads 136.

In some examples, the techniques of method 600 may be performed by a optimization service 106 that includes one or more processors 202 and one or more computer-readable media 206 storing computer-executable instructions that, when executed by the one or more processors, cause the one or more processors to perform the operations of method 600.

At 602, the optimization service 106 may receive, via a user account 242 registered with the service provider network 102, a first request to support a workload 136 on behalf of the user account 242 using the computing resources of the computing-resource network 110. For example, the user account 242 may be utilized by a user 105, via their user device 108, to interact with the user portal 122 to request that a workload 136 be hosted in the computing-resource network 110.

At 604, the optimization service 106 may receive, via the user account 242, a second request for a recommendation of a virtual computing resource type 130 that is optimized to support the workload 136. For instance, the user 105 may indicate via their user account 242 that they would like to opt-in for use of the optimization service 106 to provide them with a recommendation of a virtual computing resource type 130 that is optimized to support their workload 136.

At 606, the optimization service 106 may provide the user account 242 with access to one or more user interfaces 214 configured to receive input data describing the workload 136. For example, the web-console wizard 212 may present one or more GUIs 300 that help the user 105 input data that defines the workload 136 using language or input mechanisms that comes natural to the user 105.

At 608, the optimization service 106 may receive, via the one or more user interfaces 214, input data that indicates resource-utilization characteristics associated with supporting the workload 136. For example, the user 105 may input, via the GUI(s) 300, workload data 120 that indicates resource-utilization characteristics of the workload 136.

At 610, the optimization service 106 may map, based on the resource-utilization characteristics, the workload 136 to a workload category 220 from a group of predefined workload categories 220. In some examples, the workload category 220 represents workloads supported by a third combination of the types of the computing resources. Stated otherwise, the workload category 220 may be associated with a resource-utilization model 224 that represents amounts and/or combinations of types of the computing resources that are utilized to support the representative workloads 136 of that workload category 220.

At 612, the optimization service 106 may determine that the first virtual computing resource type 130 is optimized to support the workload 136 based on the third combination of the types of the computing resources corresponding to the first combination of the types of the computing resources. Stated otherwise, the optimization service 106 may determine that the amount and/or combination of types of computing resources indicated by the workload data 120 for the workload 136 may correspond to a virtual computing resource 130 that is optimized for those resource-utilization characteristics.

At 614, the optimization service 106 may generate recommendation data 132 including an indication that that the first virtual computing resource type 130 is optimized to support the workload 136 requested by the user account 242. For example, the optimization service 106 may generate recommendation data 132 that includes a virtual computing resource type listing 228 of one or more of the virtual computing resource identifiers 226 for the workload category 220.

At 616, the optimization service 106 may provide the user account 242 with access to the recommendation 132. For example, the user 105 may log into their user account 242 and access the user portal 122 (e.g., console) to view the GUI 502 that includes a listing of optimized virtual computing resource types 130.

In some examples, the recommendation data 122 may further include suitability data 230 indicating a measure of suitability for the first virtual computing resource type 130 to support the workload 136 requested by the user account 232, and text data including a textual explanation 508 regarding the suitability of the first virtual computing resource type 130 for supporting the workload 136.

In some examples, the types of computing resources may include at least two of a central processing unit (CPU) resource type, a memory resource type, a storage resource type, or a network availability resource type. In such examples, the first combination of the types of the computing resources utilized by the first virtual computing resource type comprises a first amount of a first type of the types of the computing resources, and a second amount of a second type of the types of the computing resources. Further, the second combination of the types of the computing resources utilized by the second virtual computing resource type comprises a third amount of the first type of the types of the computing resources, and a fourth amount of the second type of the types of the computing resources.

In some instances, the input data comprises first input data, and the optimization service 106 comprises further computer-executable instructions that, when executed by the one or more processors, cause the one or more processors to receive, from the user account 242, second input data indicating a selection of the first virtual computing resource type 130 to support the workload 136, and cause a virtual computing resource 114 corresponding to the first virtual computing resource type 130 to be provisioned in the computing resource network 110 to support the workload 136 on behalf of the user account 242. For example, the user 105 may utilize their user account 242 to access GUI 502 and select an instance type 504 and utilizing the select instance type control 516.

Figure 7:
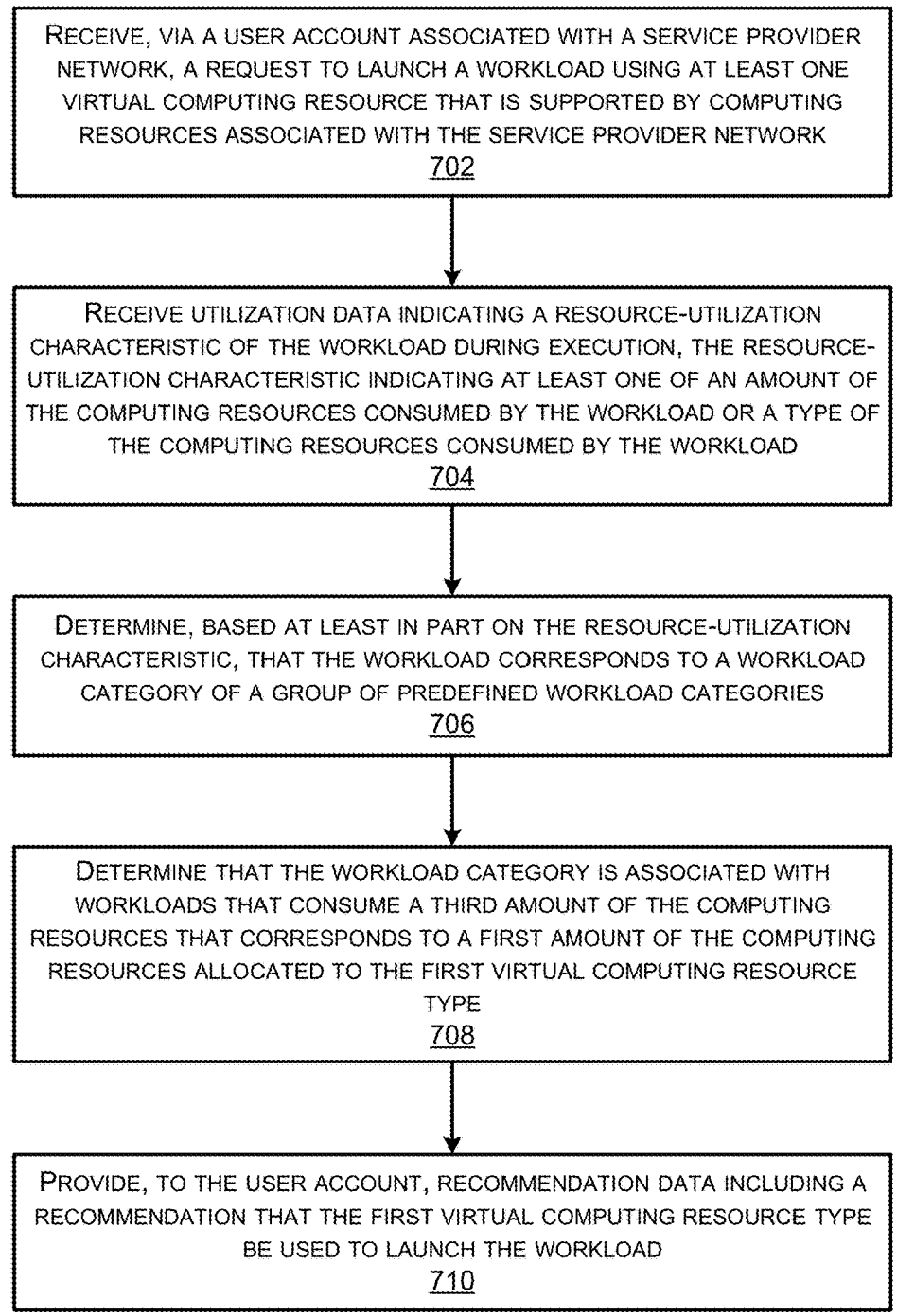
FIG. 7 illustrates a flow diagram of an example method for a service provider network to receive a resource-utilization characteristic for a workload, and provide a recommendation to a user account of a VM instance type that is to be used to launch the workload.

FIG. 7 illustrates a flow diagram 700 of an example method for a service provider network 102 to receive a resource-utilization characteristic 138 for a workload 136, and provide a recommendation 132 to a user account 242 regarding a virtual computing resource type 130 that is to be used to launch the workload 136.

At 702, the optimization service 106 may receive, via a user account 242 associated with the service provider network 102, a request to launch a workload 136 using at least one virtual machine (VM) instance 114 that is supported by computing resources associated with the service provider network. In some examples, the computing resources support at least a first virtual computing resource type 130 that is allocated a first amount of the computing resources, and a second virtual computing resource type 130 that is allocated a second amount of the computing resources.

At 704, the optimization service 106 may receive utilization data 138 indicating a resource-utilization characteristic of the workload 136 during execution. The resource-utilization characteristic may indicate at least one of an amount of the computing resources consumed by the workload 126 or a type of the computing resources consumed by the workload 136.

At 706, the optimization service 106 may determine, based at least in part on the resource-utilization characteristic 138, that the workload 136 corresponds to a workload category 220 of a group of predefined workload categories 220. For example, the optimization component 126 may determine that the resource-utilization characteristic (e.g., CPU, GPU, memory, disk, network throughput, etc.) may at least partly correspond or match to a resource-utilization model 224 for the workload category 220.

At 708, the optimization service 106 may determine that the workload category 220 is associated with workloads 136 that consume a third amount of the computing resources that at least partly corresponds to the first amount of the computing resources. For example, the optimization service 106 may determine that the workload category 220 is associated with virtual computing resource identifiers 226 that represents virtual computing resource types 130 that consume third amounts of the computing resources that correspond the first amount of computing resources consumed by the workload 136.

At 710, the optimization service 106 may provide, to the user account 242, recommendation data 132 including a recommendation that the first virtual computing resource type 130 be used to launch the workload 136. For instance, the user device 108 may receive the recommendation data 132, and present the GUI 502 that indicates that the first virtual computing resource type 130 be used to launch the workload 136.

In some instances, the user 105 may have been hosting or supporting their workload 136 using computing resources of a remote computing resource network. In such examples, the optimization service 106 may receive, from the user account 242, an indication the workload 136 is being migrated from being supported by second computing resources included in a computing resource network remote from the service provider network 102. Further, the optimization service 106 may provide the user account 242 with an interface configured to receive resource consumption data associated with consumption of the second computing resources by the workload 136. For example, the user 105 may provide historical computing resources for their workload 136 being hosted on remote computing resources. In such examples, receiving the utilization data 138 includes receiving, via the interface, the resource consumption data.

In some examples, the method 700 may further include receiving, from the user account 242, input data indicating a selection of the first virtual computing resource type 130 to be used to launch the workload 136. For example, the user 105 may provide input to the select instance type control 516 to select the first virtual computing resource type 130. Further, the optimization service 106 may cause the workload 136 to be launched at least partly using a virtual computing resource 114 corresponding to the first virtual computing resource type 130 that is supported by the computing resources. For example, the optimization service 106 may send an instruction to the compute-management service 134 to launch the workload 136.

Figure 8:
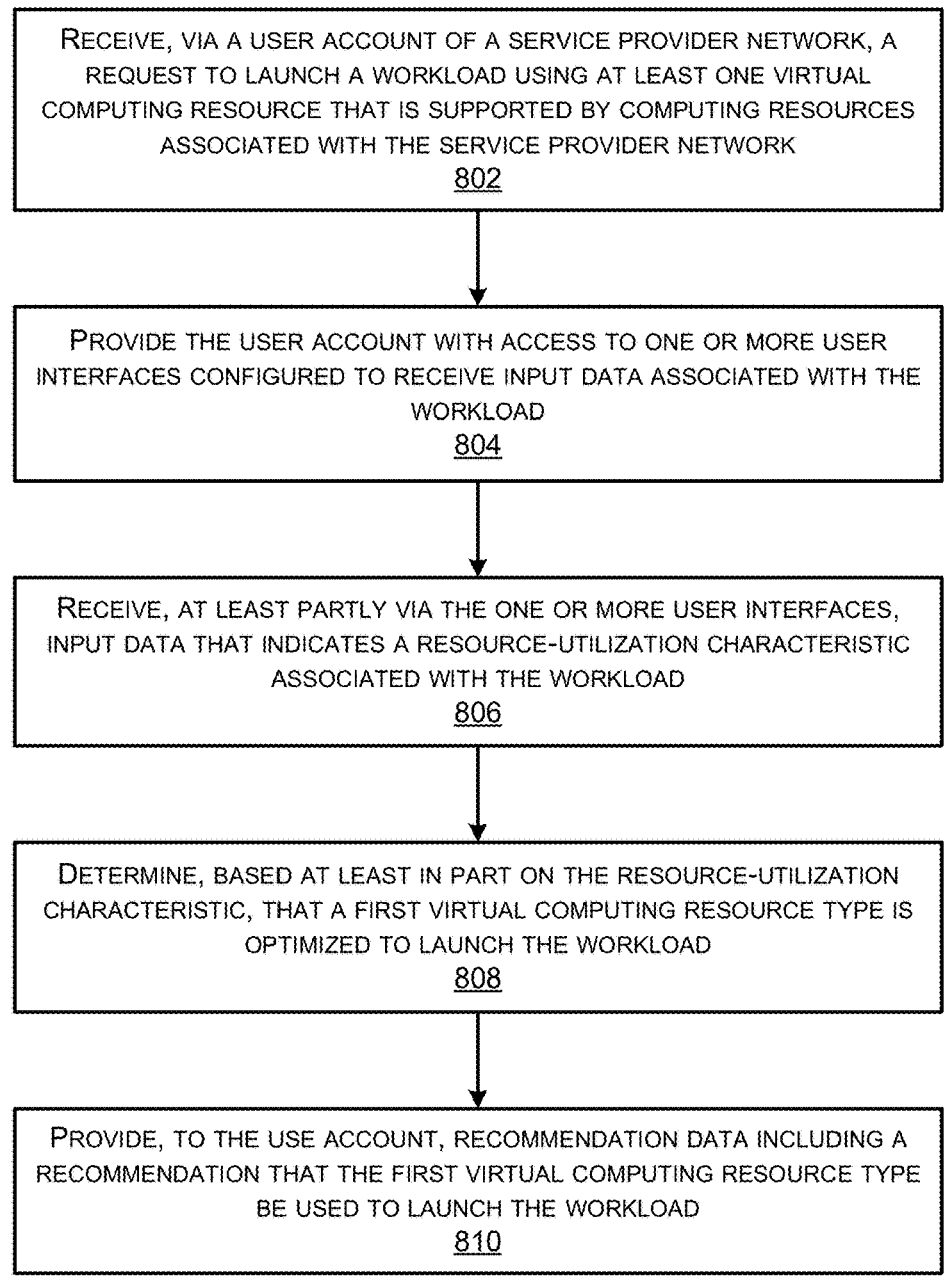
FIG. 8 illustrates a flow diagram of an example method for a service provider network to receive input via one or more user interfaces that indicates a resource-utilization characteristic associated with a workload, determines a VM instance type based on the resource-utilization characteristic, and provides a recommendation to a user account for the VM instance type to support the workload.

FIG. 8 illustrates a flow diagram of an example method 800 for a service provider network 102 to receive input via one or more user interfaces that indicates a resource-utilization characteristic associated with a workload, determines a virtual computing resource type based on the resource-utilization characteristic, and provides a recommendation to a user account for the virtual computing resource type to support the workload.

At 802, the service provider network 102 may receive, via a user account, a request to launch a workload using at least one virtual machine (VM) instance that is supported by computing resources associated with the service provider network. The computing resources support at least a first virtual computing resource type that is allocated a first amount of the computing resources, and a second virtual computing resource type that is allocated a second amount of the computing resources.

At 804, the service provider network 102 may provide the user account with access to one or more user interfaces configured to receive input data associated with the workload. At 806, the service provider network 102 receive, at least partly via the one or more user interfaces, input data that indicates a resource-utilization characteristic associated with the workload.

At 808, the service provider network 102 may determine, based at least in part on the resource-utilization characteristic, that the first virtual computing resource type is optimized to at least one of launch or execute the workload. Further, at 810, the service provider network 102 may provide, to the user account, recommendation data including a recommendation that the first virtual computing resource type be used to at least one of launch or execute the workload.

Figure 9:
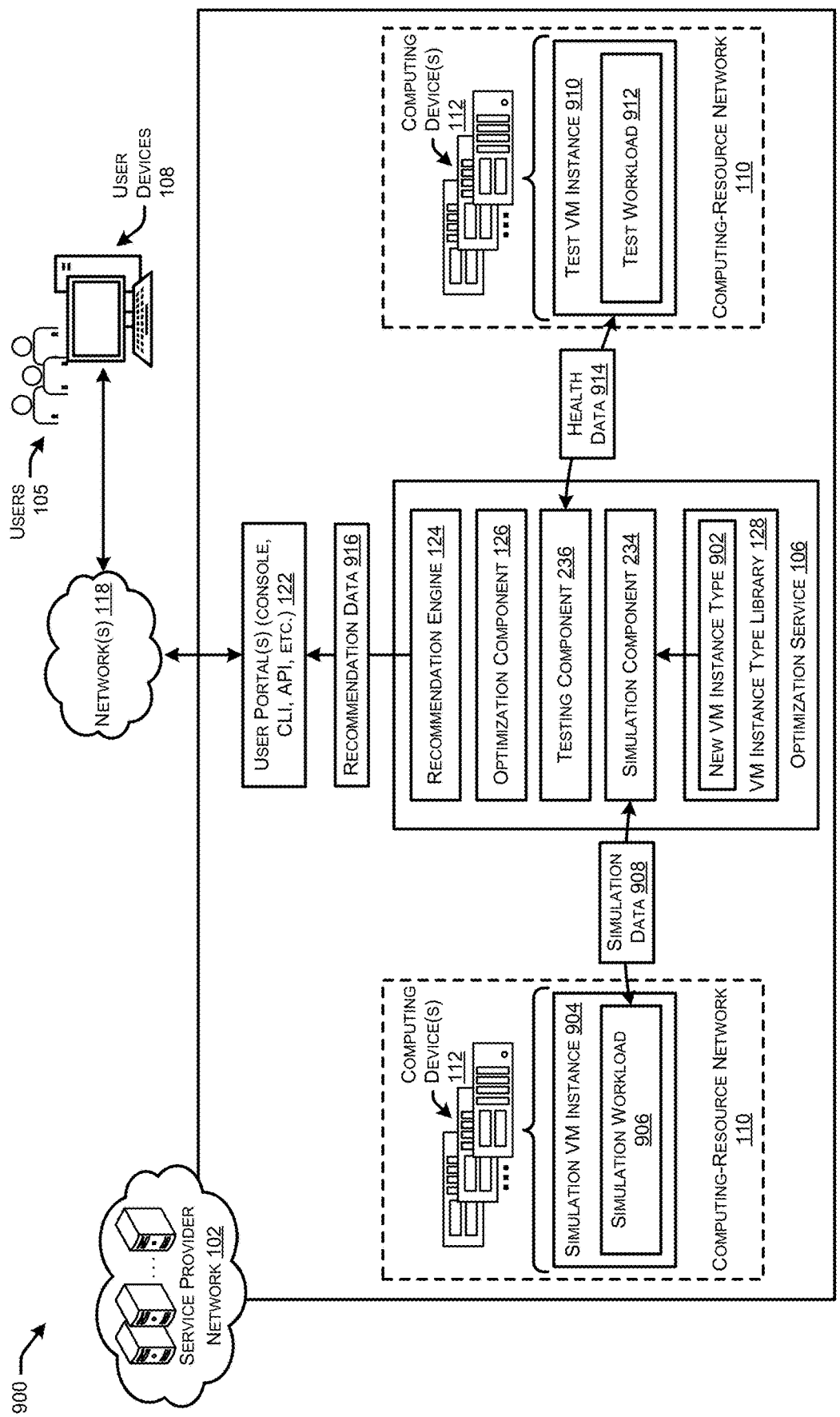
FIG. 9 illustrates a system-architecture diagram of a service provider network that simulates workloads on new VM instance types to determine performance of the new VM instance type, and tests workloads on VM instances before migrating fleets of workloads onto new VM instance types.

FIG. 9 illustrates a system-architecture diagram 900 of a service provider network 102 that simulates workloads on new VM instance types to determine performance of the new VM instance type, and tests workloads on VM instances before migrating fleets of workloads onto new VM instance types.

To provide additional functionality and a wider variety of VM instance types 128, the service provider 104 may continue to introduce new VM instance types 902 for use by the users 105. To determine whether the new VM instance type 902 is optimized for various workloads 136 and/or workload categories 220 without having to actually have users 105 be "guinea pigs" and test the new VM instance type 902, the optimization service 106 may utilize the simulation component 234 to determine the computational bias(es) of the new VM instance type 902.

The simulation component 234 may utilize one or more simulation VM instances 904 on one or more computing devices 112 to simulate the different workloads 136 using simulation workloads 906. The simulation component 234 may provision, deploy, and monitor the simulation VM instance 904 that corresponds to the new VM instance type 902, and simulate various workloads using a simulation workload 906. In some examples, the simulation workload 906 may be a simulator program that is configured to consume designated amounts of computing resources such that the simulation component 234 can mimic actual workloads 136 and workload categories 220. The simulation component 234 can then receive the simulation data 908 in order to determine what workloads 136 are optimized for the new VM instance type 902 (e.g., throughput compared to allocated computing resources). Thus, the simulation component 234 may simulate the consumption of different workloads 136 (e.g., simulation workload 906) using a simulation program on the new VM instance types 902, and determine performance metrics that indicate throughput data for amounts of computing resources input into the new VM instance type 902.

The simulation component 234 may comprise at least one process that is configurable to consume different amounts of computing resources of the computing devices 112. For instance, the simulation component 234 may drive compute utilization that is equivalent to how different workloads 906 look or consume. The simulation component 234 may scale the consumption of the different compute dimensions by scaling up or down the amount of computing resources consumed. For example, the simulation workload 906 may read or write an amount of data to disk, consume CPU and memory using processes, send data over networks, and so forth to simulate target consumption to test various workloads 136.

The simulation component 234 may then determine which workloads 136 and/or workload categories 220 for which the new VM instance type 902 is optimized, and then assign VM instance identifiers 226 corresponding to the new VM instance type 902 to the workload categories 220. In this way, user accounts 242 with workloads 136 that may be optimized on the new VM instance type 902 may be provided with recommendation data 132 indicating that migrating their workloads 136 to the new VM instance type 902 may be advantageous.

In some examples, the optimization service 106 may test workloads 136 on VM instances 114 before migrating fleets of workloads 136 onto new VM instance types 902 and/or existing VM instance types 130. For instance, the testing component 236 may utilize test VM instances 910 to support test workloads 912 that correspond to workloads 136 of users 105. The optimization service 106 may allocate computing devices 112 to support test VM instances 910 and the testing component 236 may use these test VM instances 910 and test workloads 912 to determine whether a workload 136 actually performs well, or is further optimized, when placed on a new VM instance type 902 and/or an existing VM instance type 130 as compared to a current VM instance 114. For example, the testing component 236 may "spin up" or provision a test VM instance 910 corresponding to a VM instance type 130 and/or new VM instance type 902 that the optimization component 126 has determined is optimized for a workload 136. Prior to recommending the VM instance type 130/912 to a user 105, the testing component 236 may first test the test workload 912 on the test VM instance 910 and receive health data 914 indicating how well the test workload 912 is performing. Based on the health data 914, the testing component 236 can provide insight to the optimization component 126 regarding whether or not the new VM instance type 130/902 is in fact optimized compared to the current VM instance type 130 for the workload 136 (e.g., determine throughput compared to allocated computing resources). Based on the results of the simulation component 234 and/or the testing component 236, the recommendation engine 124 may generate and send recommendation data 916 to the users 105 that have workloads 136 associated with their user accounts 242 that may be more optimized on a different VM instance type 130/902. Generally, the testing component 236 may utilize the test workload 912 in an environment where it is allowed to fail, such as a workload 136 environment where the workloads 136 are redundant (e.g., batch process).

Figure 10:
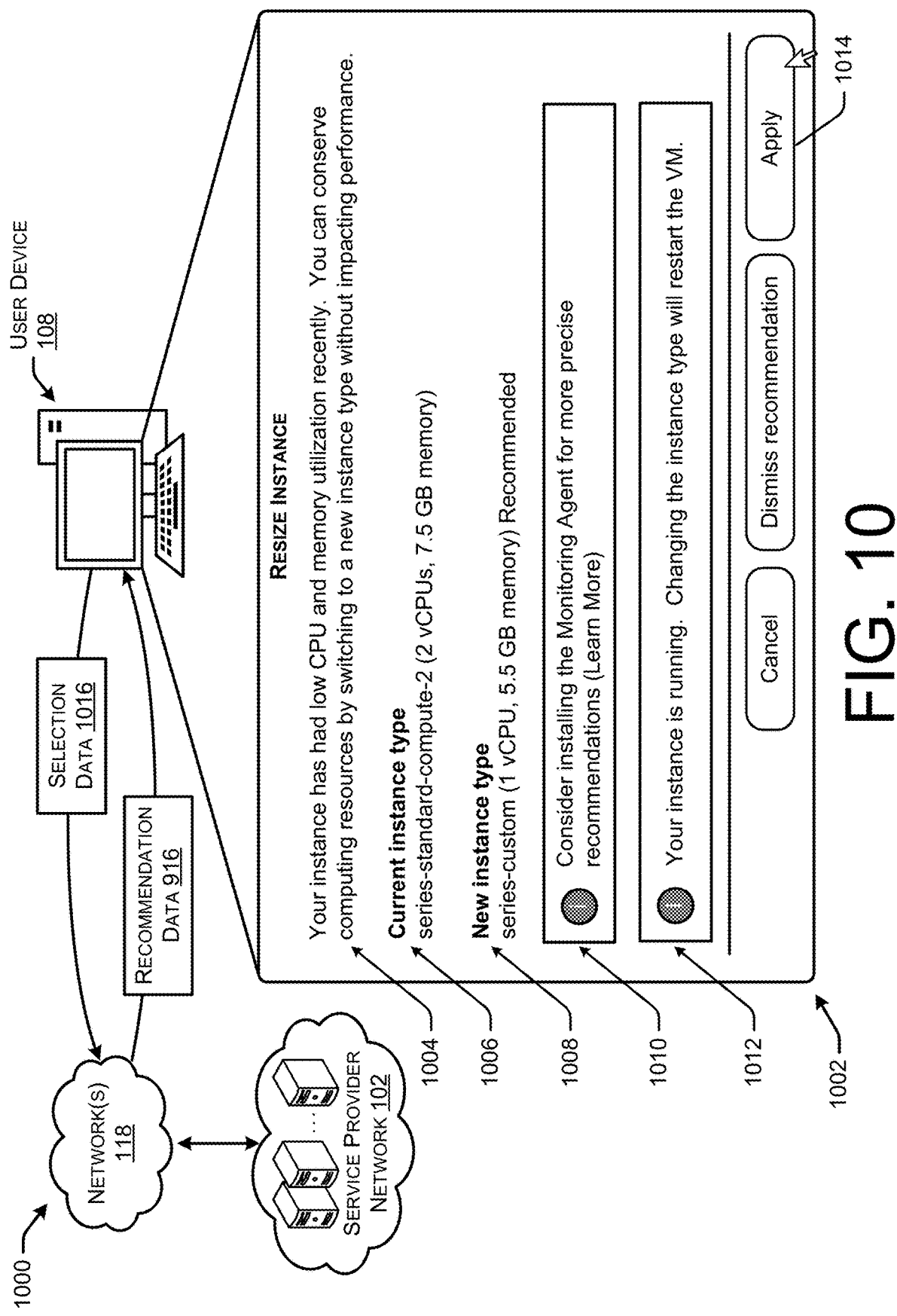
FIG. 10 illustrates graphical user interface through which a user of a service provider network can review recommendations to migrate their workload to a new VM instance type that is optimized to support their workload.

FIG. 10 illustrates an example architecture 1000 including a graphical user interface (GUI) 1002 through which a user 105 of a service provider network 102 can review recommendations to migrate their workload 136 to a new VM instance type 130 that is optimized to support their workload 136. The GUI 1002 may be presented on the user device 108, and accessible via a user account 242 and the console 122. In some examples, the GUI 1002 may be part of the web-console wizard 212 that assists the user 105 in selecting an optimized or appropriate VM instance type 130 for resizing an existing workload 136.

The GUI 1002 can include a textual explanation 1004 that the user 105 should migrate their workload 136 due to lower resource utilization recently, and that the smaller VM instance type 130 will not sacrifice performance. The GUI 1002 may further include an indication of the current instance type 1006, and an indication of the recommended new instance type 1008. Further, the GUI 1002 may recommend that the user 105 consider installing a monitoring agent on their VM instances 114 in order to get more precise recommendations, as described in more detail in FIGS. 14-16. Additionally, the GUI 1002 can let the user 105 know that their VM instance 114 is running, and that changing the VM instance types 130 will restart the VM instance 114.

Using this recommendation data 916 presented in the GUI 1002, the user 105 can make a more informed decision as to what VM instance type 130 to utilize to support their workload 130, and further provide input into an apply control 1014. Upon selecting the apply control 1014, selection data 1016 may be sent from the user device 108, over the network(s) 118, to the service provider network 102 to indicate that the user 105 is requesting to have their workload 130 migrated to the new VM instance type 130.

It should be understood that the GUI 1002 is merely illustrative, and any type of user interface, or combination of user interfaces, may be utilized to receive input data indicating a selection of a recommended VM instance type 130. Additionally, any type of input mechanism may be used to receive input data (e.g., selection data 1016) that can be used to migrate to a new VM instance type 130 than that described and illustrated.

Figure 11:
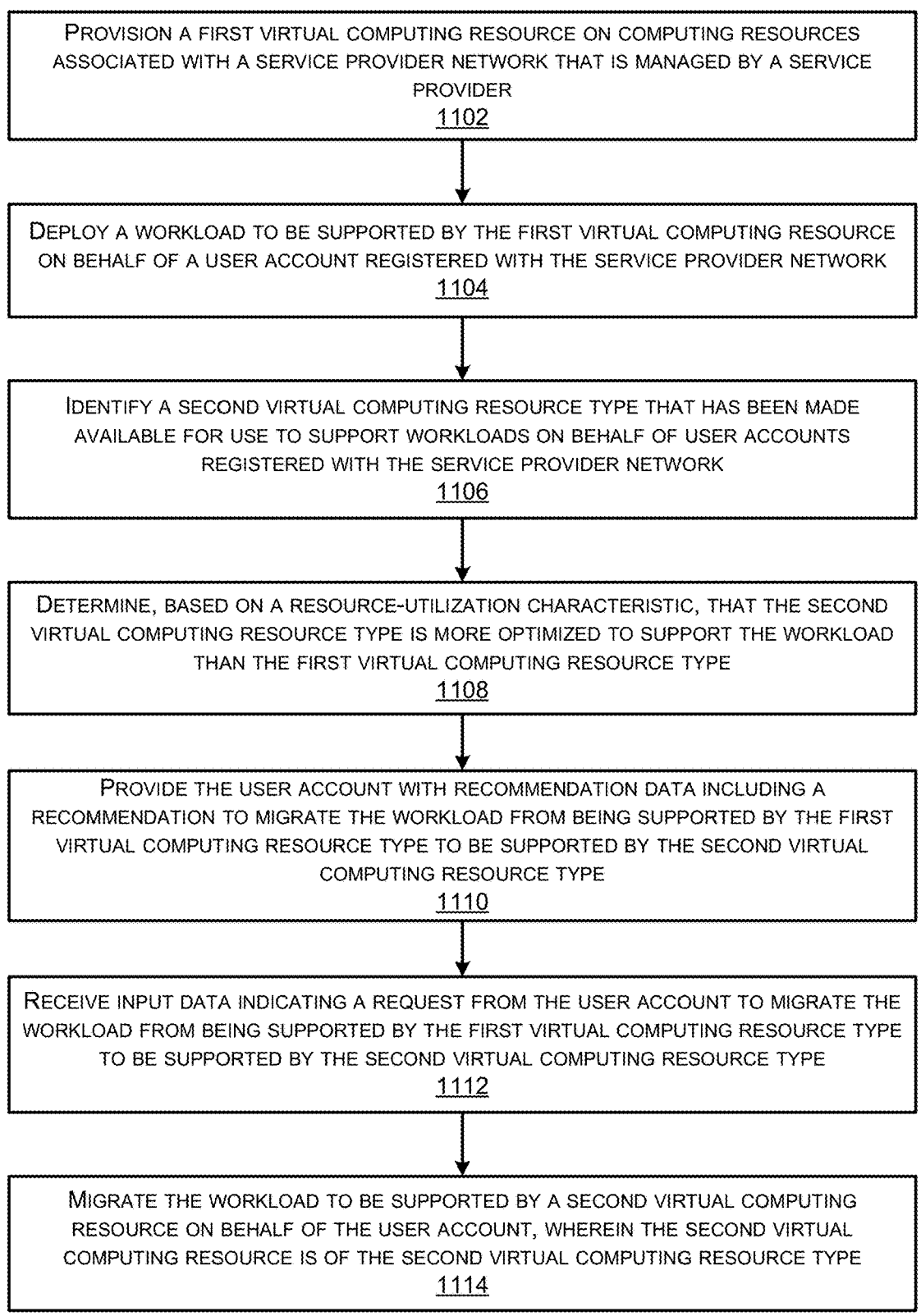
FIG. 11 illustrates a flow diagram of an example method for determining that a new VM instance type is more optimized to support a workload than a current VM instance type, recommending the new VM instance type to a user account associated with the workload, and migrating the workload to the new VM instance type.

FIG. 11 illustrates a flow diagram of an example method 1100 for determining that a new virtual computing resource type is more optimized to support a workload than a current virtual computing resource type, recommending the new virtual computing resource type to a user account associated with the workload, and migrating the workload to the new virtual computing resource type. As described herein, a virtual computing resource may comprise one or more of a virtual computing resource 114, a virtual container, a program, and/or any other virtual representation.

At 1102, the service provider network 102 may provision a first virtual machine (VM) instance on computing resources associated with the service provider network that is managed by a service provider, wherein the first virtual computing resource is of a first virtual computing resource type that is allocated a first amount of the computing resources for utilization.

At 1104, the service provider network 102 may deploy a workload to be supported by the first virtual computing resource on behalf of a user account registered with the service provider network, wherein the workload is associated with a resource-utilization characteristic indicating utilization of the computing resources by the workload.

At 1106, the service provider network 102 may identify a second virtual computing resource type that has been made available for use to support workloads on behalf of user accounts registered with the service provider network, wherein the second virtual computing resource type is allocated a second amount of the computing resources for utilization.

At 1108, the service provider network 102 may determine, based on the resource-utilization characteristic, that the second virtual computing resource type is more optimized to support the workload than the first virtual computing resource type.

At 1110, the service provider network 102 may provide the user account with recommendation data including a recommendation to migrate the workload from being supported by the first virtual computing resource type to be supported by the second virtual computing resource type.

At 1112, the service provider network 102 may receive input data indicating a request from the user account to migrate the workload from being supported by the first virtual computing resource type to be supported by the second virtual computing resource type.

At 1114 service provider network 102, the migrate the workload to be supported by a second virtual computing resource on behalf of the user account, wherein the second virtual computing resource is of the second virtual computing resource type.

Figure 12:
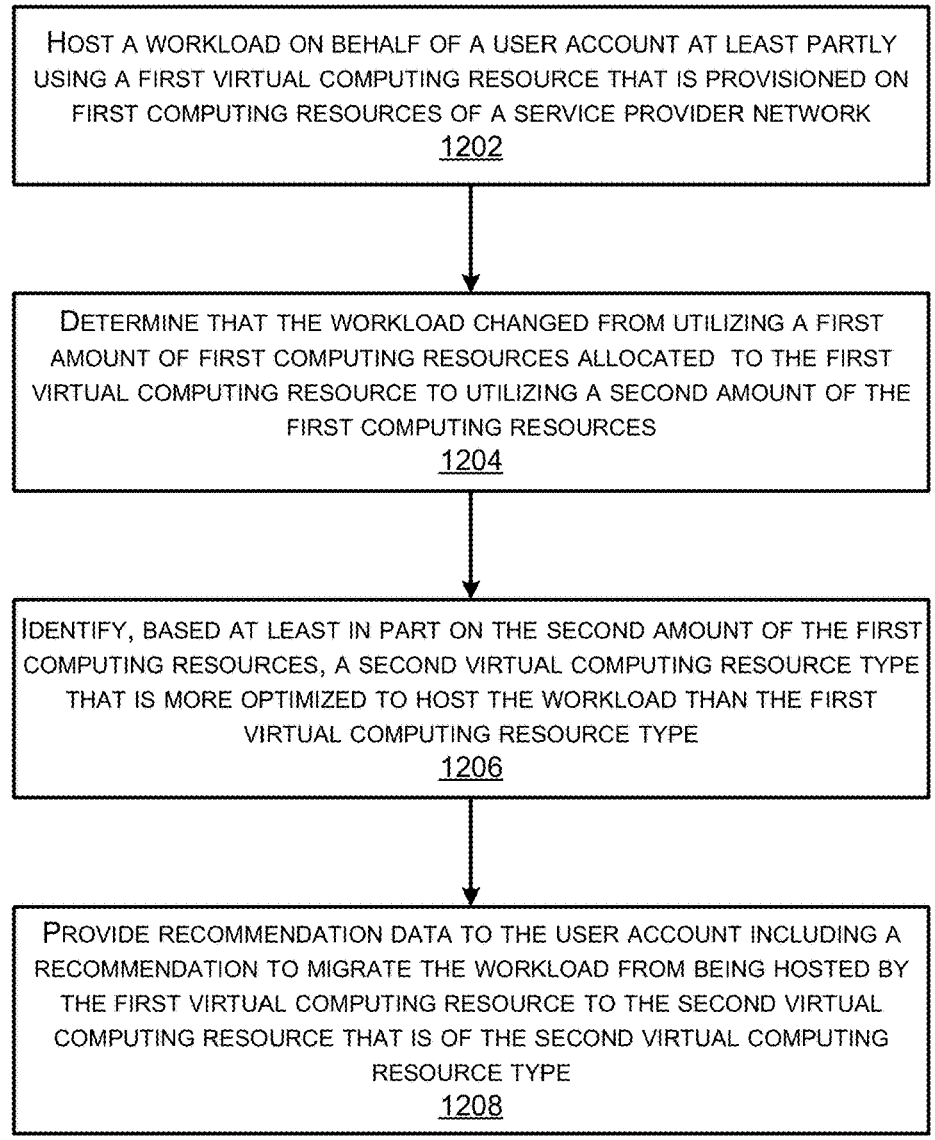
FIG. 12 illustrates a flow diagram of an example method for determining that the resource utilization of a workload changed, identifying a new VM instance type that is more optimized to host the workload, and providing a user account with a recommending to migrate the workload to the new VM instance type.

FIG. 12 illustrates a flow diagram of an example method 1200 for determining that the resource utilization of a workload changed, identifying a new virtual computing resource type that is more optimized to host the workload, and providing a user account with a recommending to migrate the workload to the new virtual computing resource type.

At 1202, the service provider network 102 may host a workload on behalf of a user account at least partly using a first virtual machine (VM) instance that is provisioned on first computing resources of a service provider network, wherein the first virtual computing resource is of a first virtual computing resource type that is allocated the first computing resources for utilization.

At 1204, the service provider network 102 may determine that the workload changed from utilizing a first amount of the first computing resources to utilizing a second amount of the first computing resources.

At 1206, the service provider network 102 may identify, based at least in part on the second amount of the first computing resources, a second virtual computing resource type that is more optimized to host the workload than the first virtual computing resource type, wherein the second virtual computing resource type is allocated second computing resources for utilization. In some examples, the service provider network 102 may determine that a difference between the first amount of the computing resources and the second amount of the computing resources is greater than a threshold difference, and identify the second virtual computing resource type is performed based at least in part on the difference being greater than the threshold difference. For instance, the service provider network 102 may determine that the optimization is great enough or "worth it" to migrate the workload.

At 1208, the service provider network 102 may provide recommendation data to the user account including a recommendation to migrate the workload from being hosted by the first virtual computing resource to a second virtual computing resource that is of the second virtual computing resource type.

In some examples, the method of 1200 may further comprise collecting, from the first virtual computing resource at a first time, a first utilization value indicative of the first amount of the first computing resources, determining that a period of time has elapsed from the first time, wherein the period of time is associated with a frequency at which the user account modifies the workload, and collecting, from the first virtual computing resource at a second time, a second utilization value indicative of the second amount of the first computing resources. Stated otherwise, the service provider network 102 may collect the utilization values according to frequency or period of time.

In some examples, the method of 1200 may determine that the second virtual computing resource is associated with an optimization value that is greater by a threshold amount than an optimization value of the first virtual computing resource.

FIG. 13 illustrates a flow diagram of an example method 1300 for determining that a new virtual computing resource type is more optimized to support a workload than a current virtual computing resource type, and recommending the new virtual computing resource type to a user account associated with the workload.

At 1302, service provider network 102, the service provider network 102 host a workload on behalf of a user account at least partly using a first virtual machine (VM) instance that is provisioned on first computing resources of a service provider network, wherein the first virtual computing resource is of a first virtual computing resource type that is allocated the first computing resources for utilization.

At 1304, the service provider network 102 may identify a second virtual computing resource type that has been made available for use to host workloads on behalf of user accounts associated with the service provider network, wherein the second virtual computing resource type is allocated second computing resources for utilization.

At 1306, the service provider network 102 may receive a resource-utilization characteristic indicating utilization of the first computing resources by the workload. At 1308, the service provider network 102 may determine, based on the resource-utilization characteristic, that the second virtual computing resource type is more optimized to host the workload than the first virtual computing resource type.

At 1310, the service provider network 102 may provide the user account with recommendation data including a recommendation to migrate the workload from being hosted by the first virtual computing resource to be hosted by a second virtual computing resource that is of the second virtual computing resource type.

Figure 14:
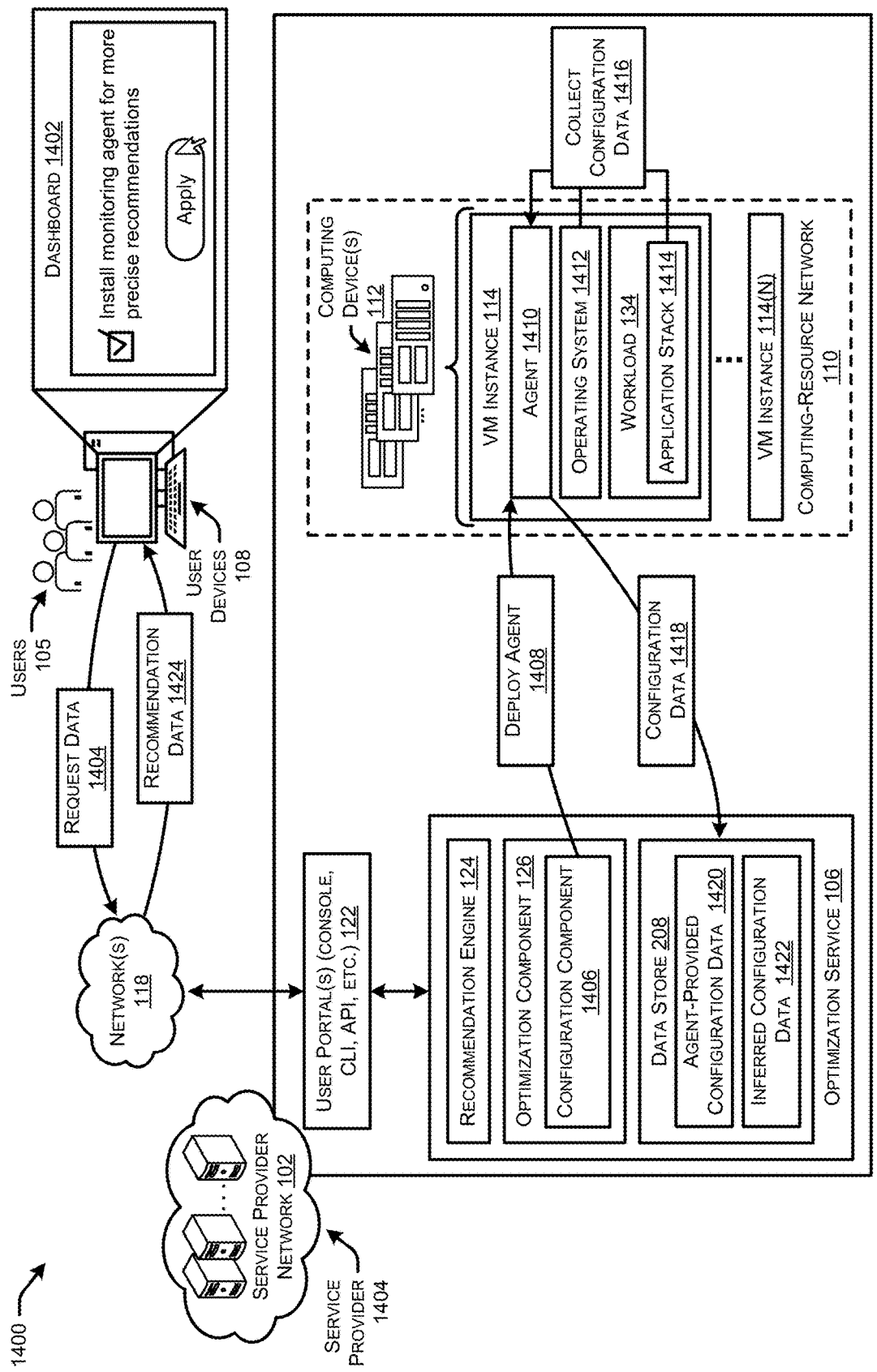
FIG. 14 illustrates a system-architecture diagram of an example environment in which an optimization service of a service provider network receives configuration data from an agent executing on a VM instance that supports a workload, and recommends that modifications be made to a configuration parameter of the workload or operating system.

FIG. 14 illustrates a system-architecture diagram 1400 of an example environment in which an optimization service 106 of a service provider network 102 receives configuration data from an agent executing on a VM instance that supports a workload, and recommends that modifications be made to a configuration parameter of the workload or operating system.

In some examples, a user 105 may access a dashboard 1402 using their user account 242 and indicate that they would like to install a monitoring agent for more precise recommendations regarding their workloads 136 beyond recommending a VM instance type 130 on which to host the workloads 136. The user devices 108 may transmit the request data 1404 to the optimization service 106 indicating the request for more detailed recommendations. In such examples, the configuration component 1406 may, at 1408, deploy an agent 1410 onto the VM instance 114.

The optimization component 126 may include a configuration component 1406 that determines modifications to make to configuration parameters of an application stack of a workload 136, or an operating system of a VM instance 114, to optimize performance of the workload 136 and/or VM instance 114. To collect the data required to determine the modifications to make to the configuration parameters, the configuration component 1406 may deploy or install the agent 1410 to the VM instance 114 that is configured to collect configuration data indicating parameters of the operating system 1412 on the VM instance 114, and/or the application stack 1414 of the workload 134 on the VM instance 114. As illustrated, the agent 1410 may perform one or more steps to collect configuration data 1416, and provide configuration data 1418 to the data store 208 associated with the optimization service 106. The data store 208 may store the agent-provided configuration data 1420 (e.g., configuration data 1418), as well as inferred configuration data 1422.

The agent 1410 may collect configuration data 1418 such as memory utilization by processes running inside the VM instance 114, configurations for processes running on the VM instance 114, what versions of the software and/or operating system 1412, how much memory is configured for the application stack 1414, how many threads are running, the connection timeouts for the application stack 1414, and/or other types of configuration data 1418. Additionally, various parameters or configuration data may be obtained for the operating system 1412, such as what version of the operating system 1412, the CPU usage by the OS 1412, how many concurrent file handles are allowed, what the network stack configure is (e.g., buffer size), and/or other parameters. Additional types of configuration data 1418 may include parameters for a disk subsystem, such as if customers are using RAID, what their backing is (e.g., EBS), and so forth.

In some examples, the configuration component 1406 may collect the inferred configuration data 1422 without the help of the agent 1410. For instance, the configuration component 1406 may observe security groups for the VM instance 114 to determine inbound traffic types and ports, identify auto-scaling groups for a fleet of VM instances 114 to determine scaling policies, customer CPU utilization goals, determine a machine image used for the VM instance 114 which indicates the operating system 1412 and version, VM instance 114 tagging data indicating useful information about the VM instance 114, and/or other data.

The configuration component 1406 may determine modifications to make to a parameter for at least one of the operating system 1412 and/or application stack 1414 using the configuration data 1418 and/or inferred configuration data 1422. The configuration component 1406 may utilize rules-based analysis to generate parameter tuning suggestions for attributes like kernel, network stack, file system, memory management, application parameters, and so forth. The configuration component 1406 may have predefined configuration parameters that are optimized for the operating system 1412 and application stack 1414 for the different VM instances 114 and/or workloads 134. In this way, the configuration component 1406 may determine a modification to at least one configuration parameter of at least one of the operating system 1412 or the application stack 1414 based on differences between optimized configuration parameters and the parameters indicated in the agent-provided configuration data 1420 and/or the inferred configuration data 1422.

The recommendation engine 124 may generate recommendation data 1424 that indicates the modification to the configuration parameter that optimized the at least one of the application stack 1414 or the operating system 1412 and provide the recommendation data 1424 to the user device 108 over the network(s) 118. The user 105 may determine whether they want to apply the modifications, and send a request back to the optimization service 106 to implement the modification to the configuration parameter. In some instances, the user 105 may opt-in to allow the configuration component 1406 to automatically modify configuration parameters to optimize the application stack 1414 and/or operating system 1412. The configuration component 1406 may then make the modification to the configuration parameter if the user 105 has indicated they would like to have the modification made to optimize performance of the application stack 1414 and/or the operating system 1412 to support the workload 136.

Figure 15:
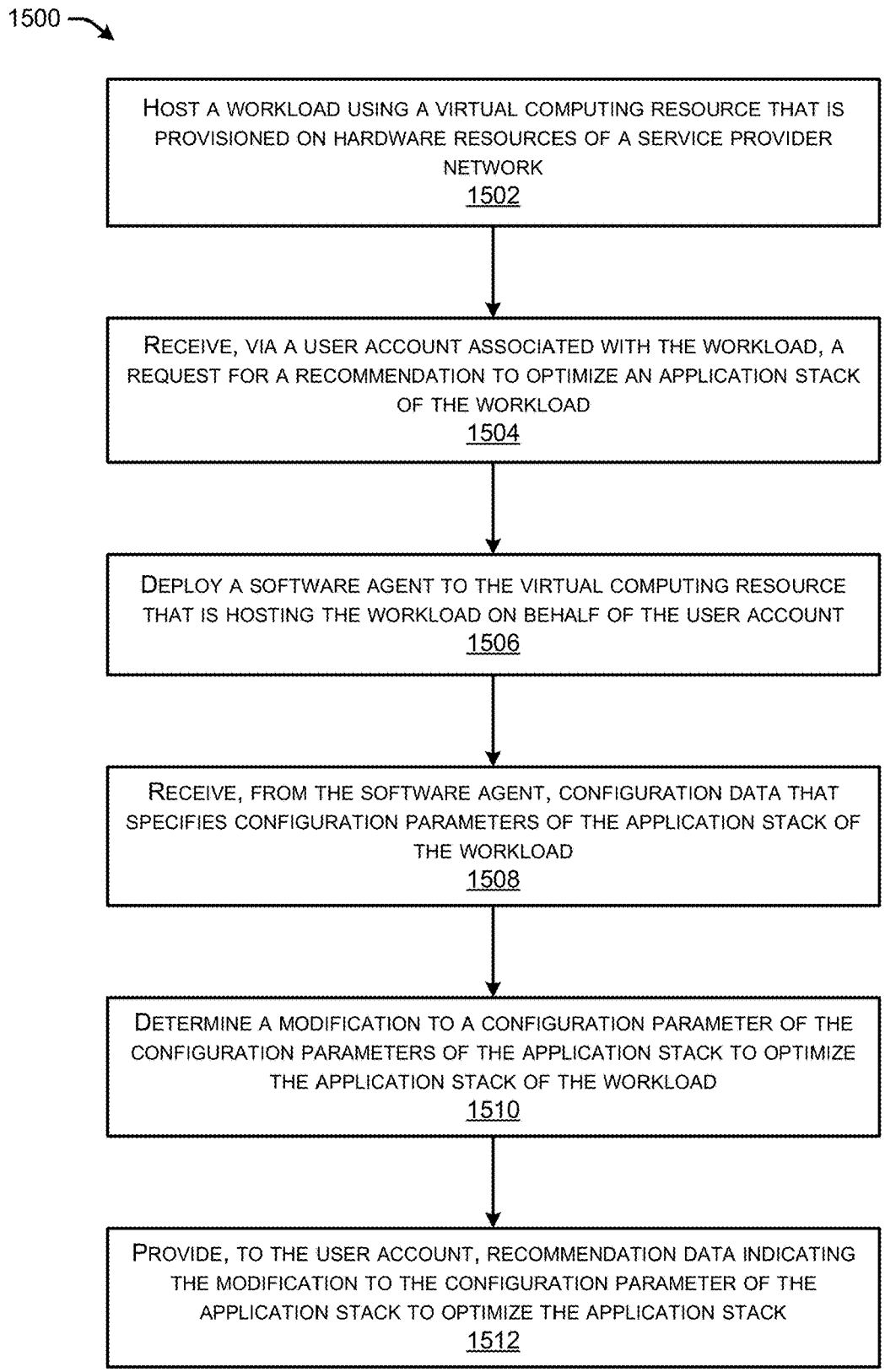
FIG. 15 illustrates a flow diagram of an example method for deploying a software agent to a VM instance that is hosting a workload, receiving configuration data from the agent, and providing a recommendation to a user account indicating a modification to be made to a configuration parameter of an application stack of the workload.

FIG. 15 illustrates a flow diagram of an example method 1500 for deploying a software agent to a virtual computing resource that is hosting a workload, receiving configuration data from the agent, and providing a recommendation to a user account indicating a modification to be made to a configuration parameter of an application stack of the workload. As described herein, a virtual computing resource may comprise one or more of a VM instance 114, a virtual container, a program, and/or any other virtual representation.

At 1502, the service provider network 102 may host a workload using a virtual machine (VM) instance that is provisioned on hardware resources of the service provider network.

At 1504, the service provider network 102 may receive, via a user account associated with the workload, a request for a recommendation to optimize an application stack of the workload.

At 1506, the service provider network 102 may deploy a software agent to the virtual computing resource that is hosting the workload on behalf of the user account. At 1508, the service provider network 102 may receive, from the software agent, configuration data that specifies configuration parameters of the application stack of the workload. At 1510, the service provider network 102 may determine a modification to a configuration parameter of the configuration parameters of the application stack to optimize the application stack of the workload. At 1512, the service provider network 102 may provide, to the user account, recommendation data indicating the modification to the configuration parameter of the application stack to optimize the application stack.

In some examples, determining the modification of the configuration parameter to optimize the application stack of the workload may be based at least in part on receiving utilization data indicating an amount of the hardware resources utilized to host the workload. For instance, the utilization data may indicate a workload category for the workload. The resource-utilization models 224 may indicate optimized configuration parameters for at least one of the workload category or the workload itself. The service provider network 104 may determine that the configuration parameter of the application stack is different than the optimized configuration parameters for application stacks of the resource-utilization model, and determine the modification based on the difference. The simulation component 234 may have been utilized to determine, by simulating workloads 136 with different configuration parameters across difference instance types, the optimized configuration parameters for the different workloads 136 and/or workload types 130. In this way, modifications to the configuration parameters may be determined based on the optimized configuration parameters that help optimize performance, such as throughput, of the application stacks of the workloads 136 and/or operating systems of the VM instances 114.

Figure 16:
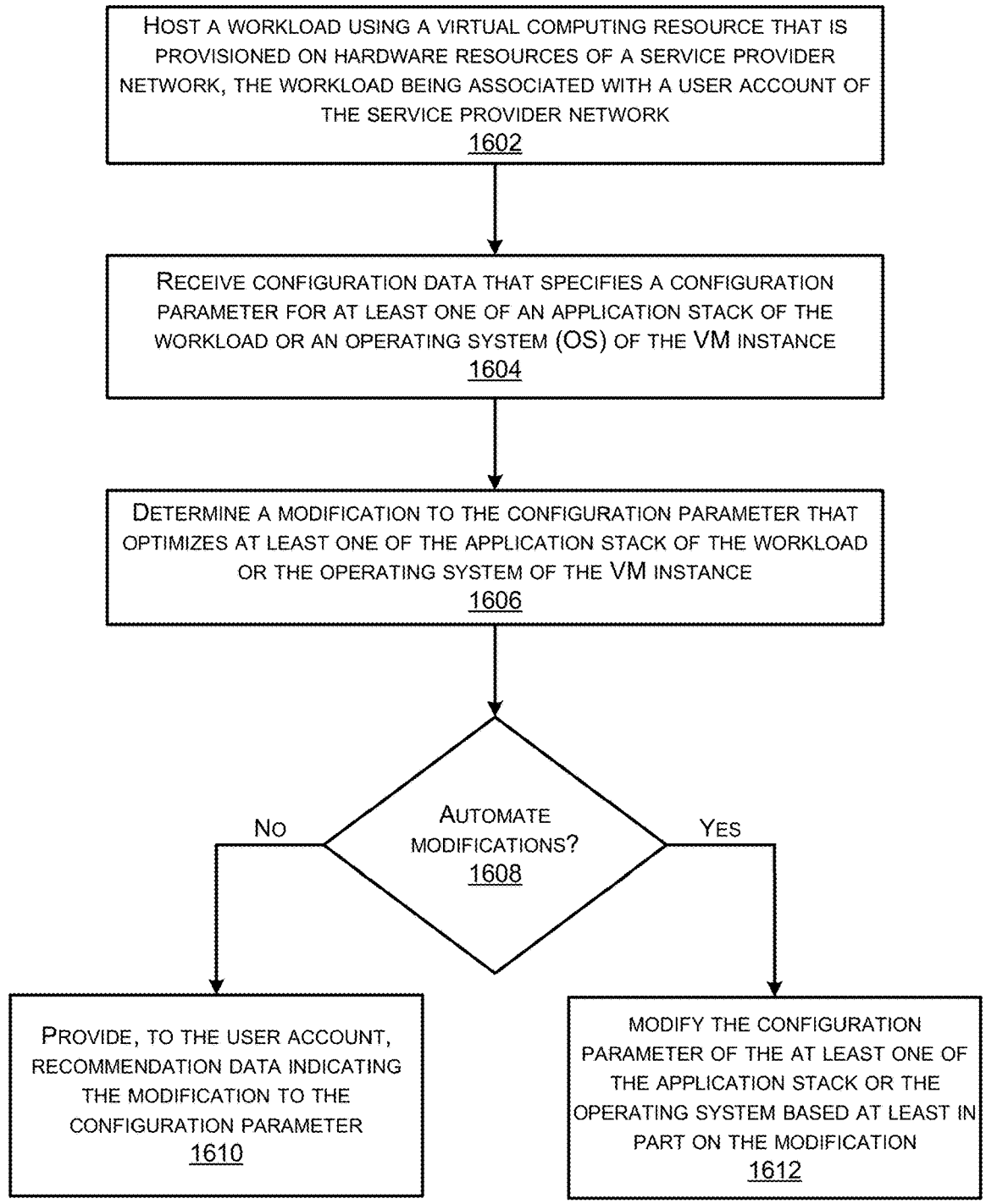
FIG. 16 illustrates a flow diagram of an example method for receiving configuration data that specifies a configuration parameter of at least one of an application stack or an operating system, and either providing a recommendation to a user account indicating a modification to be made to a configuration parameter or automatically modifying the configuration parameter.

FIG. 16 illustrates a flow diagram of an example method 1600 for receiving configuration data that specifies a configuration parameter of at least one of an application stack or an operating system, and either providing a recommendation to a user account indicating a modification to be made to a configuration parameter or automatically modifying the configuration parameter.

At 1602, the service provider network 102 may host a workload using a virtual machine (VM) instance that is provisioned on hardware resources of a service provider network. At 1604, the service provider network 102 may receive configuration data that specifies a configuration parameter for at least one of an application stack of the workload or an operating system (OS) of the virtual computing resource.

At 1606, the service provider network 102 may determine a modification to the configuration parameter that optimizes at least one of the application stack of the workload or the operating system of the virtual computing resource.

At 1608, the service provider network 102 may provide, to a user account associated with the workload, recommendation data indicating the modification to the configuration parameter that optimizes the at least one of the application stack of the workload or the operating system of the virtual computing resource.

Figure 17:
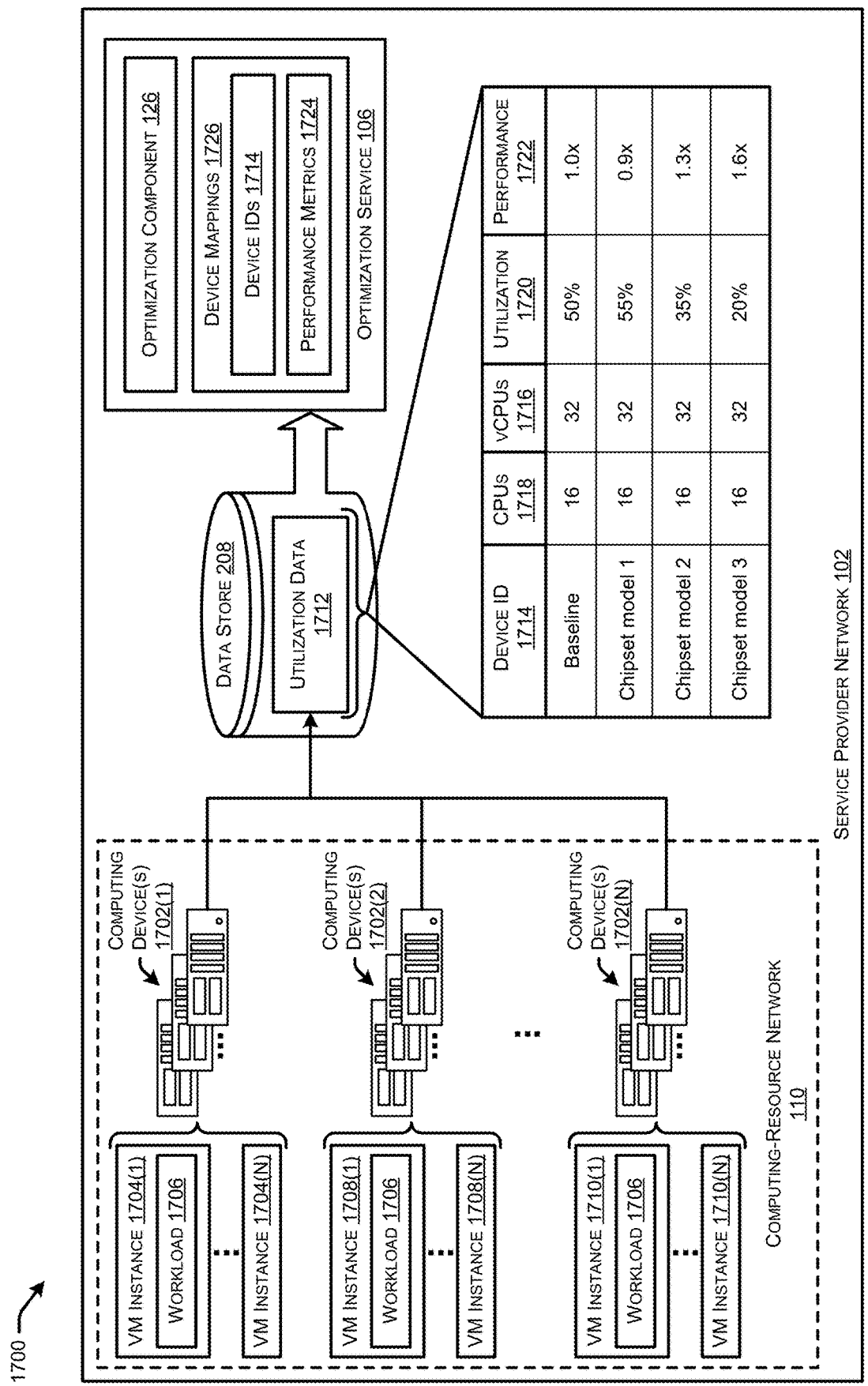
FIG. 17 illustrates a system-architecture diagram of an example environment in which an optimization service of a service provider network receives utilization data indicating resource consumption by workloads on different computing devices, and maps the computing devices to physical resource consumed to determine performance metrics for the computing devices.

FIG. 17 illustrates a system-architecture diagram 1700 of an example environment in which an optimization service 106 of a service provider network 102 receives utilization data indicating resource consumption by workloads on different computing devices, and maps the computing devices to physical resource consumed to determine performance metrics for the computing devices.

Generally, different computing devices 1702(1)-(N) may each support one or more VM instances 1704(1)-(N) that host workloads 1706, one or more VM instances 1708(1)-(N) that host the workloads 1706, and one or more VM instances 1710(1)-(N) that host the workloads 1706. Generally, the computing devices 1702(1)-(N) may be different models, generations, manufactures, and so forth. For example, the utilization data 1712 may indicate resource consumption by different VM instance types 1704, 1708, 1710 that run on different computing devices 1702, but host the same workload 1706.

In addition to utilizing resource-utilization data 1712 to determine an optimized VM instance type 130 for the workload 1706, the optimization service 106 may further take into account the performance of the underlying physical computing devices 1702(1)-(N). The performance may vary based on the hardware differences of the different computing devices 1702(1)-(N), such as different generations, models, and/or vendors of the chipset(s) in each of the computing devices 1702(1)-(N), such that actual performance of the computing devices 1702(1)-(N) varies based on the hardware differences. For example, a computing device 1702(1) that has a chipset from a newer generation may perform better, or have more data throughput, than a computing device 1702(2) with a chipset from an older generation of chipsets. Thus, even if VM instance 1704 is provided with, for example, the same number of vCPUs when provisioned on the different computing devices 1702(1) and 1702(2), the performance for the VM instance 1704 hosting the workload 1706 may be better on the computing device 1702(1) compared to 1702(2) due to hardware differences (or improvements) in the physical resources of the computing devices 1702(1) and 1702(2). To help account for performance differences that result from physical hardware differences, the optimization service 106 may map utilization data 1712 back to the underlying physical computing resource that is consumed to get a performance metric for the computing devices 1702(1)-(N).

For example, the utilization data 1712 may be placed into a chart where the device ID 1714 for different chipsets may be associated with or mapped to their utilization and performance. For example, the device IDs 1714 may include a baseline ID indicating a benchmark of performance, and chipset models 1, 2, and 3 indicating different models, vendors, and/or generations of chipsets. Each chipset model may be associated with the number of CPUs 1718 for the chipset models, as well as the number of vCPUs 1716 being utilized by the VM instances 1706, 1708, and 1710 on the different chipset models. Additionally, utilization data 1720 (in this case, CPU usage) is associated with the different chipsets and is in turn used to determine performance 1722. As illustrated, chipset model 1 is less performant than the baseline, but chipset model 2 and 3 increase in performance. In this way, even if the same number of CPUs and vCPUs are being utilized the performance by the chipset models may differ due to the underlying hardware being more or less performant for the throughput of data. To determine performance 1722, the optimization service 106 may compare throughput of data, such as overall utilization 1720) for the respective compute type (e.g., CPU, memory, disk, GPU, network throughput, etc.), versus the baseline and/or across the different chipset models. In this way, the optimization service 106 may determine how performant one chipset model is compared to another chipset model.

Although illustrated as being CPU usage, the performance 1722 may be determined for one or more of the dimensions of compute (e.g., CPU, memory, disk, GPU, and network throughput) for the different chipset models and/or device IDs 1714. For example, the optimization service 106 may further determine, based on the utilization data 1712, how performant each chipset model is (or other hardware device) for the different dimensions of compute, and map back the performance for those additional dimensions of compute to the respective chipset models. In this way, the performance 1722 for one or more dimensions of compute for the underlying physical hardware may be determined using the utilization data 1712 in order to determine how to achieve best fit sizing for VM instances and/or workloads 1706.

Once the performance 1722 is determine, the optimization service 106 may generate device mappings 1726 which generally map the device IDs 1714 of the underlying hardware resources back to the performance metrics 1724 for one or more dimensions of compute. Thus, when the optimization service 106 is selecting a VM instance 114 and underlying hardware resource to place a workload 136, the optimization service 106 may select the VM instance 114 at least partly based on the performance metrics 1724.

As a specific example, a user account 242 may be hosting their workload 1706 on a first VM instance type 130(1) that is supported by a first chipset model 1714. However, that workload 1706 may be consuming too much CPU (and/or other computing resource) compared to a utilization goal or preference. The optimization service 106 may determine that a second VM instance type 130(2) that is supported by a second chipset model 1714 is more appropriate to host the workload 136 to achieve the utilization goal because, even if the second chipset model and second VM instance type 130(2) have less CPUs 1718 and/or vCPUs 1716, the ratio of performance metrics 1724 between the first and second chipset models 1714 may indicate that the second chipset model 1714 will still achieve lower utilization, and the same or higher throughput, to support the workload 1706. The optimization service 106 may select VM instance types 130 based at least in part on the performance metrics 1724 for the underlying computing resources of the supporting devices.

In this way, performance metrics 1724 may be assigned to the underlying computing device 112 (or other computing resource) on which a VM instance 116 is provisioned to help determine an optimized VM instance type 130 based on the computing device that is to be utilized. In an example where a workload 136 is migrated from a less compute-performant device 112 onto a more compute-performant device 112, the optimization service 106 may select a new VM instance type 130 based in part on a ratio of the performance between the two devices 112. In this way, the optimization service 106 may select a new VM instance type 130 that may not need be allocated as much compute power of the more compute-performance computing device 112, and drive down utilization.

Figure 18:
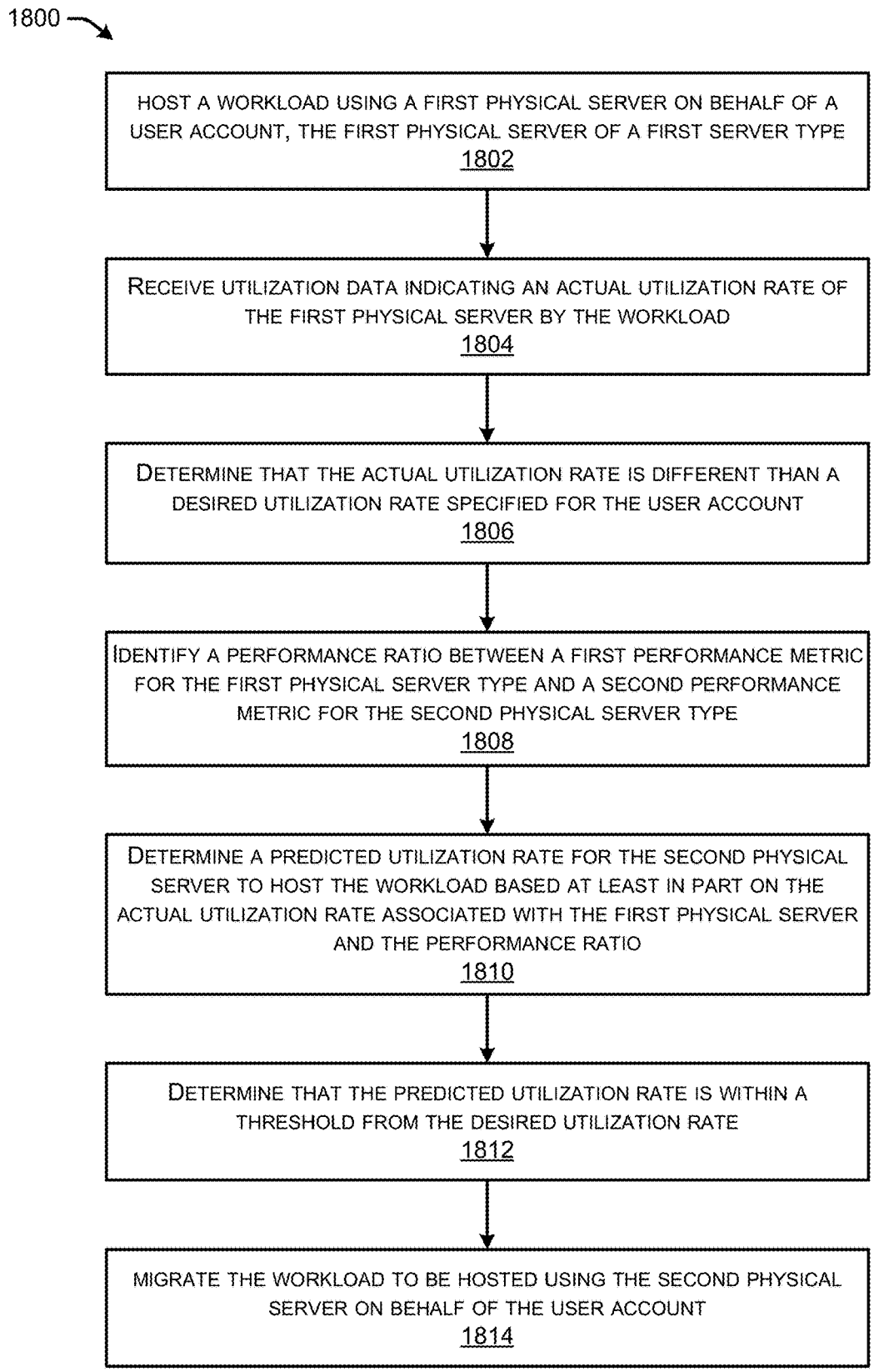
FIG. 18 illustrates a flow diagram of an example method for using a performance ratio between computing devices to determine that a computing device has performance metrics such that, if a workload is hosted on the computing device, the resulting resource utilization rate of the workload will be within a desired utilization rate.

FIG. 18 illustrates a flow diagram of an example method 1800 for using a performance ratio between computing devices to determine that a computing device has performance metrics such that, if a workload is hosted on the computing device, the resulting resource utilization rate of the workload will be within a desired utilization rate.

In some examples, the method 1800 may be performed by a system comprising a computing resource network of a service provider network that is managed by a service provider, where the computing resource network comprises a first physical server of a first server type, and a second physical server of a second server type.

At 1802, the service provider network 102 may host a workload using the first physical server on behalf of a user account. At 1804, the service provider network 102 may receive utilization data indicating an actual utilization rate of the first physical server by the workload.

At 1806, the service provider network 102 may determine that the actual utilization rate is different than a desired utilization rate specified for the user account. At 1808, the service provider network 102 may identify a performance ratio between a first performance metric for the first physical server type and a second performance metric for the second physical server type. In some examples, the first performance metric indicates an efficiency of the first physical server for hosting the workload, and the second performance metric indicates an efficiency of the second physical server for hosting the workload.

At 1810, the service provider network 102 may determine a predicted utilization rate for the second physical server to host the workload based at least in part on the actual utilization rate associated with the first physical server and the performance ratio. For instance, the actual utilized rate may be multiplied by a ratio of the performance metrics for the first and second physical servers.

At 1812, the service provider network 102 may determine that the predicted utilization rate is within a threshold from the desired utilization rate. At 1814, the service provider network 102 may migrate the workload to be hosted using the second physical server on behalf of the user account.

In some instances, the predicted utilization rate may be further determined based on details regarding the selected VM instance type 130. For instance, a difference in the number of vCPUs allocated to VM instance types 130 may be different for the first and second physical servers, and that may be factored in as a ratio for performance to determine the predicted utilization rate.

Figure 19:
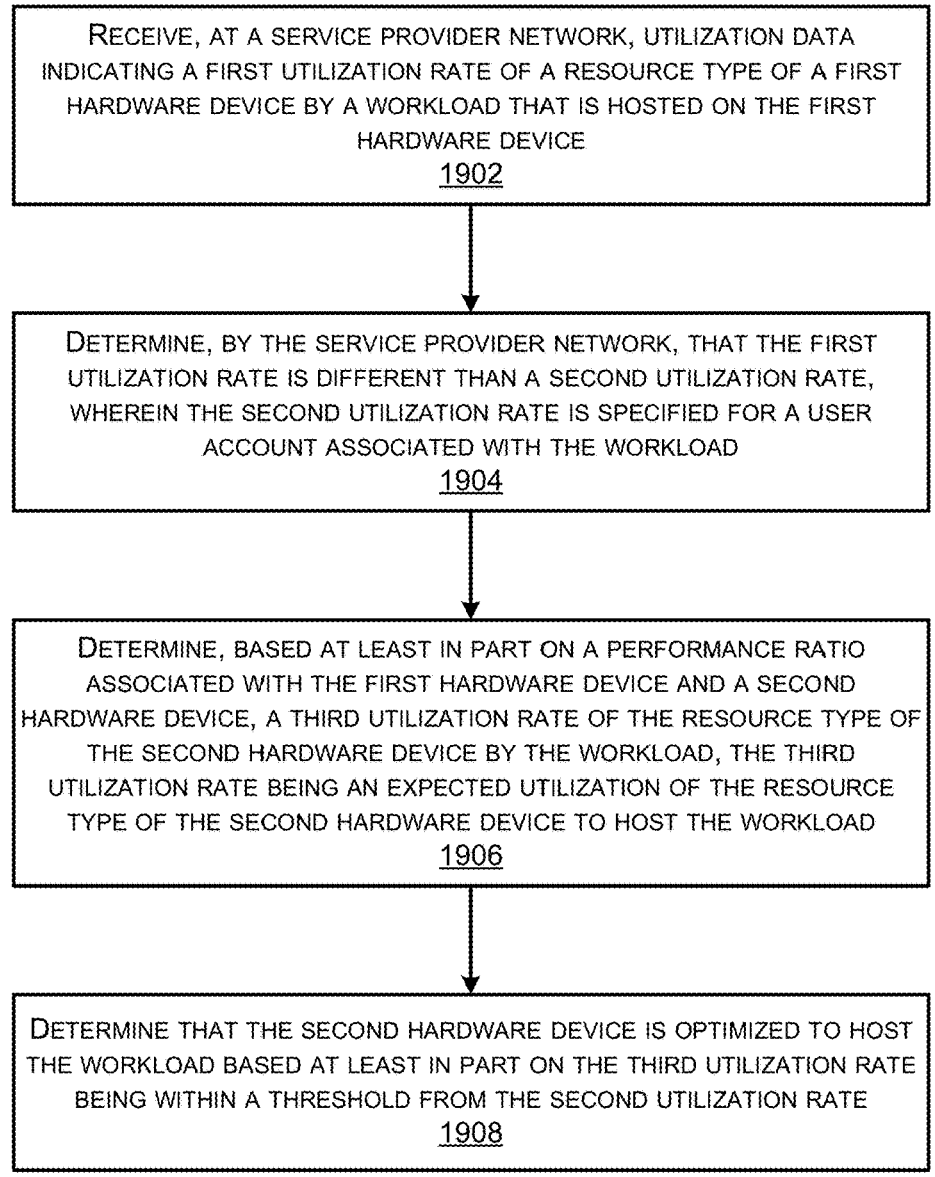
FIG. 19 illustrates a flow diagram of an example method for determining a hardware device has performance metrics such that the hardware device is optimized to host a workload.

FIG. 19 illustrates a flow diagram of an example method 1900 for determining a hardware device has performance metrics such that the hardware device is optimized to host a workload.

At 1902, the service provider network 102 may receive utilization data indicating a first utilization rate of a resource type of a first hardware device by a workload that is hosted on the first hardware device.

At 1904, the service provider network 102 may determine that the first utilization rate is different than a second utilization rate, wherein the second utilization rate is specified for a user account associated with the workload.

At 1906, the service provider network 102 may determine, based at least in part on a performance ratio associated with the first hardware device and a second hardware device, a third utilization rate of the resource type of the second hardware device by the workload, the third utilization rate being an expected utilization of the resource type of the second hardware device to host the workload.

At 1908, the service provider network 102 may determine that the second hardware device is optimized to host the workload based at least in part on the third utilization rate being within a threshold from the second utilization rate.

Figure 20:
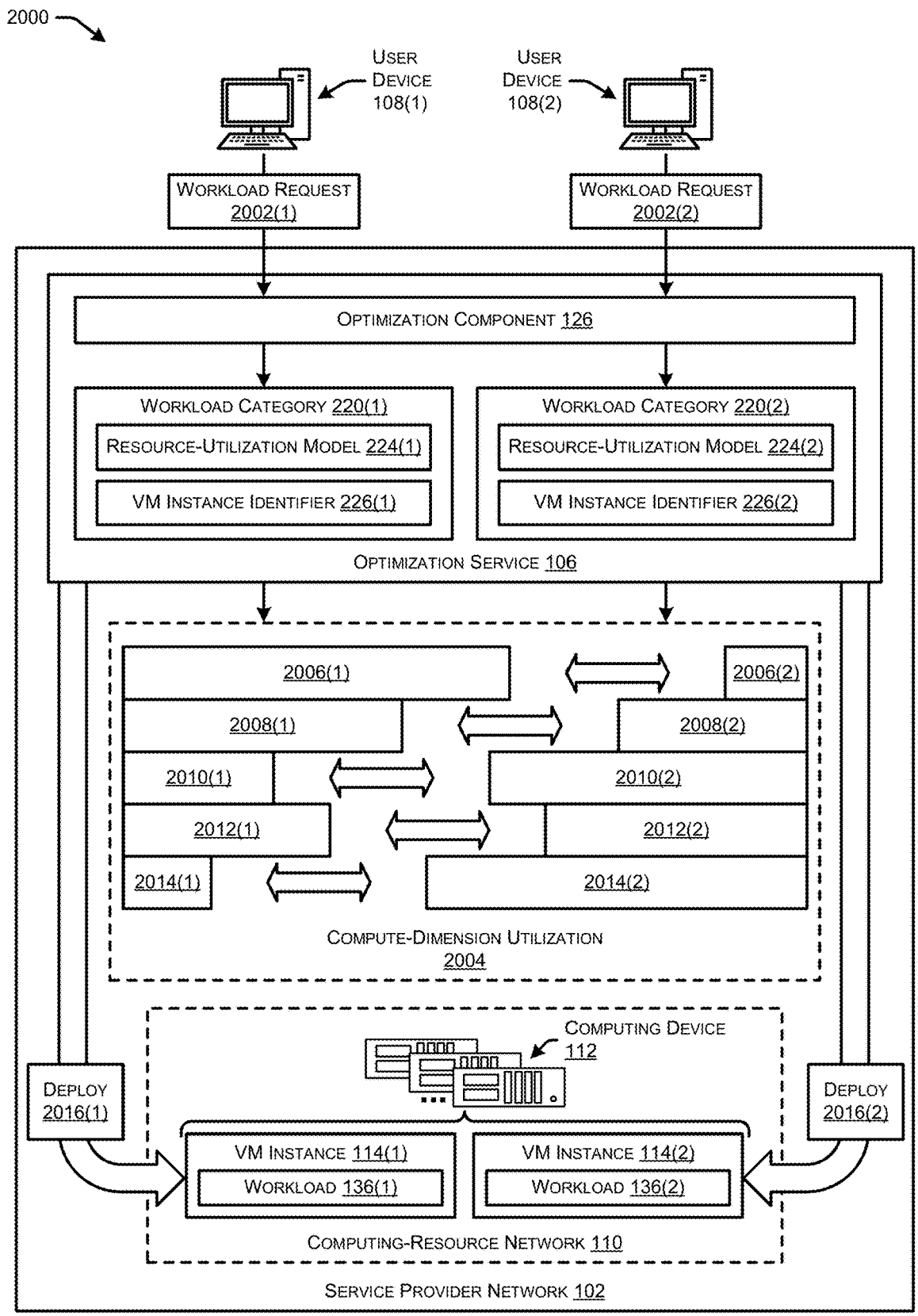
FIG. 20 illustrates a system-architecture diagram of an example environment in which an optimization service of a service provider network determines computationally compatible VM instance types, and deploys the computationally compatible VM instance types on a same computing device.

FIG. 20 illustrates a system-architecture diagram 2000 of an example environment in which an optimization service 106 of a service provider network 102 determines computationally compatible VM instances 114, and deploys the computationally compatible VM instances 114 on a same computing device 112.

As illustrated, user devices 108(1) and 108(2) may submits respective workload requests 2002(1) and 2002(2) to have workloads hosted in the computing-resource network 110. In some examples, the workload requests 2002(1) and 2002(2) may be associated with a same user account 242, or with different user accounts 242. The optimization component 126 may then map the workload requests 2002(1)-(2) to respective workload categories 220(1) and 220(2) using the resource-utilization models 224(1) and 224(2).

The optimization component 126 may then determine that the computational biases of the corresponding VM instances 114(1) and 114(2), and/or the workload categories 220(1) and 220(2), are computationally complimentary such that it is advantageous to have a same computing device 112 host the two VM instances 114(1) and 114(2). For example, and as illustrated, the compute-dimension utilizations 2004 for each of the resource-utilization models 224(1) and 224(2) may be compatible such that the dimensions of compute utilized by workloads in the two workload categories 220(1) and 220(2) combine well to maximize the use of the resources provided by the computing device 112. As shown, five dimensions of compute 2006, 2008, 2010, 2012, 2014 may complement each other such that one dimension of compute 2006(1) for the resource-utilization model 224(1) may be relatively high, but the same dimension of compute 2006(2) for the resource-utilization model 224(2) may be relatively low.

As a specific example, the workload category 220(1) may utilize high CPU resources 2006(1), but low memory resources 2014(1), whereas the workload category 220(2) may utilize low CPU resources 2006(2), but high memory resources 2014(2), resulting in them being a complimentary combination to share resources provided by the computing device 112. If two VM instances 114 were placed on a computing device 112 that each has high CPU usage by low memory usage, then the computing device 112 would max out on CPU used by the VM instances 114 while a large portion of memory sat idle and unused.

Accordingly, the optimization component 126 may identify and store indications of workload categories 220 that have compute-dimension utilization 2004 indicating that they are complimentary combinations. Additionally, or alternatively, the optimization component 126 may store indications of VM instance types 130 that are computationally complimentary, and/or store indications of workloads 136 that are computationally complimentary in different examples.

In this way, when a VM instance 114(1) is to be placed on a computing device 112, the optimization component 126 may identify a computing device 112 that already has a computationally complimentary VM instance 114(2) located thereon and place the VM instance 114(1) on that computing device 112 to maximize the overall resource consumption. Although the compute-dimension utilization 2204 shows some or all of the compute dimensions 2006-2014 being complimentary, in some instances, the workload categories 220 and/or VM instance types 130 need only be complimentary in one of the compute dimensions to warrant placement on a same computing device 112. In the illustrated example, the optimization service 106 may cause the VM instances 114(1) and 114(2) to be deployed 2016(1)-(2) on the same computing device 112 to help maximize resource consumption for at least one dimension of compute.

Generally, computationally compatible workloads 136 and/or VM instance types 130 may be based on how well the compute-dimension utilization 2004 matches up for at least one of the compute dimensions 2206-2014 (e.g., one compute dimension, two compute dimensions, five compute dimensions, etc.). In some examples, computationally compatible workloads 136 and/or VM instance types 130 may include combinations of workloads 136 and/or VM instance types 130 that, in combination, (i) achieve maximum utilization of the underlying computing device 112, (ii) achieve a desired or goal utilization of the underlying computing device 112, and/or (iii) achieve a desired oversubscription of the underlying computing device 112 to ensure efficient utilization of the underlying resources of the computing device 112.

Figure 21:
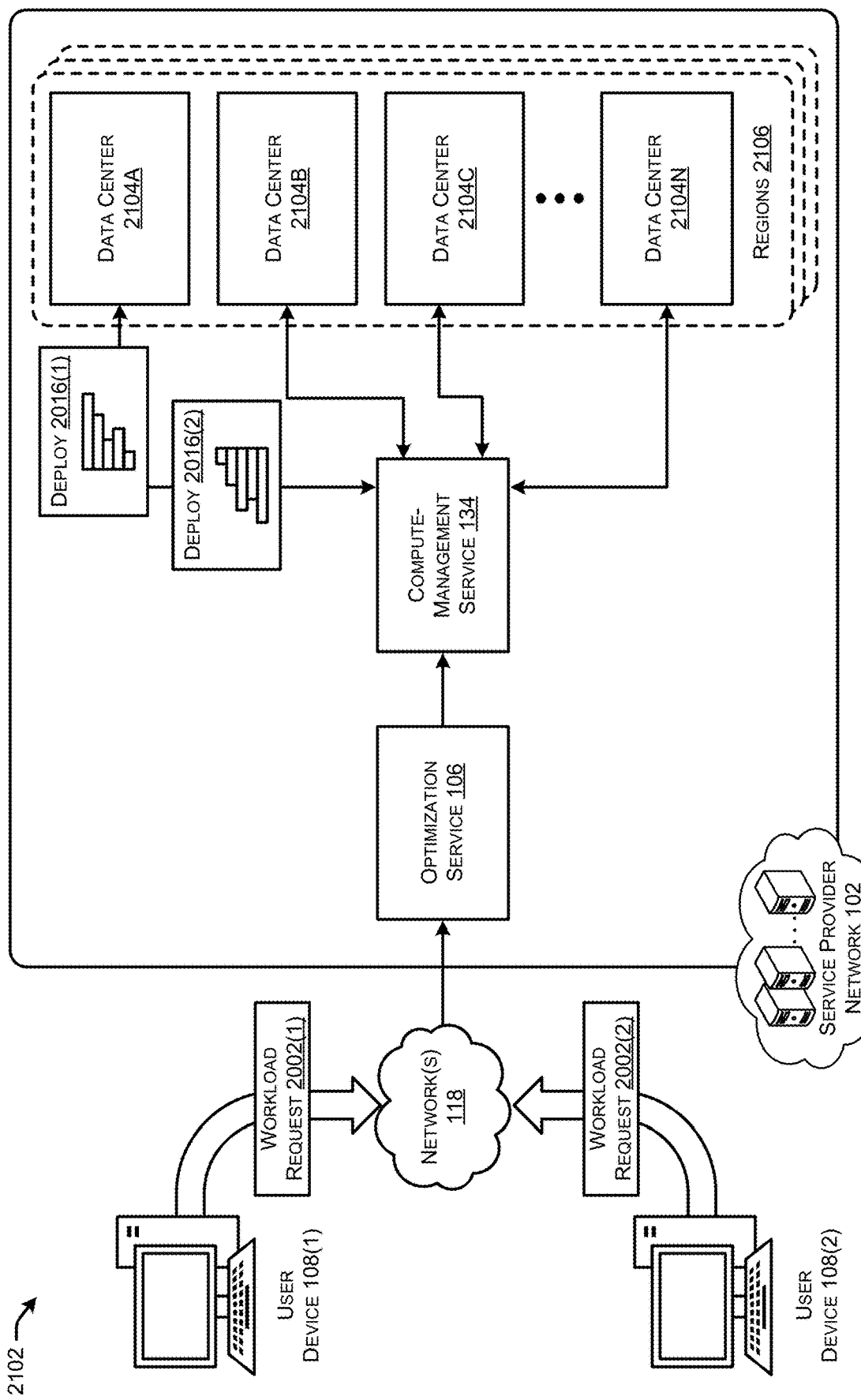
FIG. 21 is a system and network diagram that shows an illustrative operating environment that includes data centers of a service provider network that can be configured to implement aspects of the functionality described herein.

FIG. 21 is a system and network diagram that shows an illustrative operating environment that includes data centers a service provider network 102 that can be configured to implement aspects of the functionality described herein. The service provider network 102 can provide computing resources, like VM instances and storage, on a permanent or an as-needed basis. Among other types of functionality, the computing resources 120 provided by the service provider network 102 may be utilized to implement the various services described above. As also discussed above, the computing resources provided by the service provider network 102 can include various types of computing resources, such as data processing resources like VM instances, data storage resources, networking resources, data communication resources, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 2104A-2104N (which might be referred to herein singularly as "a data center 2104" or in the plural as "the data centers 2104"). The data centers 2104 are facilities utilized to house and operate computer systems and associated components. The data centers 2104 typically include redundant and backup power, communications, cooling, and security systems. The data centers 2104 can also be located in geographically disparate locations, or regions 2106. One illustrative embodiment for a data center 2104 that can be utilized to implement the technologies disclosed herein will be described below with regard to FIG. 22.

The users 105 of the user devices 108 that utilize the service provider network 102 may access the computing resources provided by the service provider network 102 over any wired and/or wireless network(s) 118, which can be a wide area communication network ("WAN"), such as the Internet, an intranet or an Internet service provider ("ISP") network or a combination of such networks. For example, and without limitation, a user device 108 operated by a user 105 of the service provider network 102 may be utilized to access the service provider network 102 by way of the network(s) 118. It should be appreciated that a local-area network ("LAN"), the Internet, or any other networking topology known in the art that connects the data centers 2104 to remote clients and other users can be utilized. It should also be appreciated that combinations of such networks can also be utilized.

In some examples, the user devices 108(1)-(2) may submit their workload requests 2002(1)-(2) to the service provider network 102. The optimization service 106 may determine that the workloads 136 are computationally complimentary, and instruct the compute-management service 134 to place or deploy 2016(1)-(2) the workloads 136 on a computing device 112 in the same data center 2104A.

Figure 22:
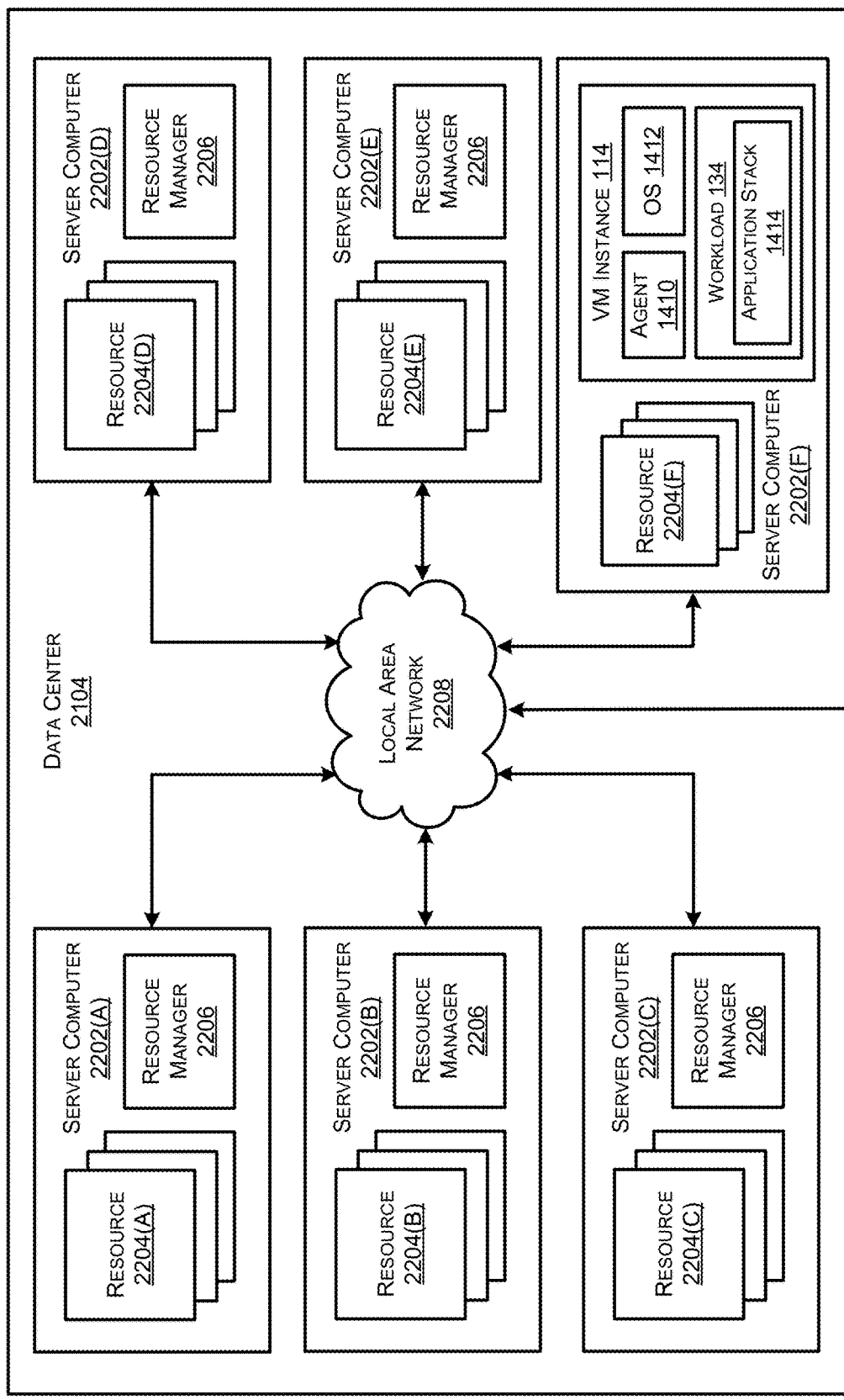
FIG. 22 is a computing system diagram illustrating a configuration for a data center that can be utilized to implement aspects of the technologies disclosed herein.

FIG. 22 is a computing system diagram 2200 that illustrates one configuration for a data center 2104 that implements aspects of the technologies disclosed herein. The example data center 2104 shown in FIG. 22 includes several server computers 2202A-2202F (which might be referred to herein singularly as "a server computer 2202" or in the plural as "the server computers 2202") for providing computing resources 2204A-2204E. In some examples, the resources 2204 and/or server computers 2202 may include, be included in, or correspond to, the computing devices 112 described herein.

The server computers 2202 can be standard tower, rack-mount, or blade server computers configured appropriately for providing the computing resources described herein (illustrated in FIG. 22 as the computing resources 2204A-2204E). As mentioned above, the computing resources provided by the service provider network 102 can be data processing resources such as VM instances or hardware computing systems, database clusters, computing clusters, storage clusters, data storage resources, database resources, networking resources, and others. Some of the servers 2202 can also be configured to execute a resource manager 2206 capable of instantiating and/or managing the computing resources. In the case of VM instances, for example, the resource manager 2206 can be a hypervisor or another type of program configured to enable the execution of multiple VM instances on a single server computer 2202. Server computers 2202 in the data center 2104 can also be configured to provide network services and other types of services.

In the example data center 2104 shown in FIG. 22, an appropriate LAN 2208 is also utilized to interconnect the server computers 2202A-2202F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 2104A-2104N, between each of the server computers 2202A-2202F in each data center 2104, and, potentially, between computing resources in each of the server computers 2202. It should be appreciated that the configuration of the data center 2104 described with reference to FIG. 22 is merely illustrative and that other implementations can be utilized.

The data center 2104 shown in FIG. 22 also includes a server computer 2202F that can execute some or all of the software components described above. For example, and without limitation, the server computer 2202F (and the other server computers 2202) can generally be included in to the computing devices 112 of FIG. 1 and be configured to execute components, including the components of the optimization service 106, the compute-management service 134, the computing-resource network 110, and/or the other software components described above. The server computer 2202F can also be configured to execute other components and/or to store data for providing some or all of the functionality described herein. In this regard, it should be appreciated that the services illustrated in FIG. 22 as executing on the server computer 2202F can execute on many other physical or virtual servers in the data centers 2204 in various embodiments.

Figure 23:
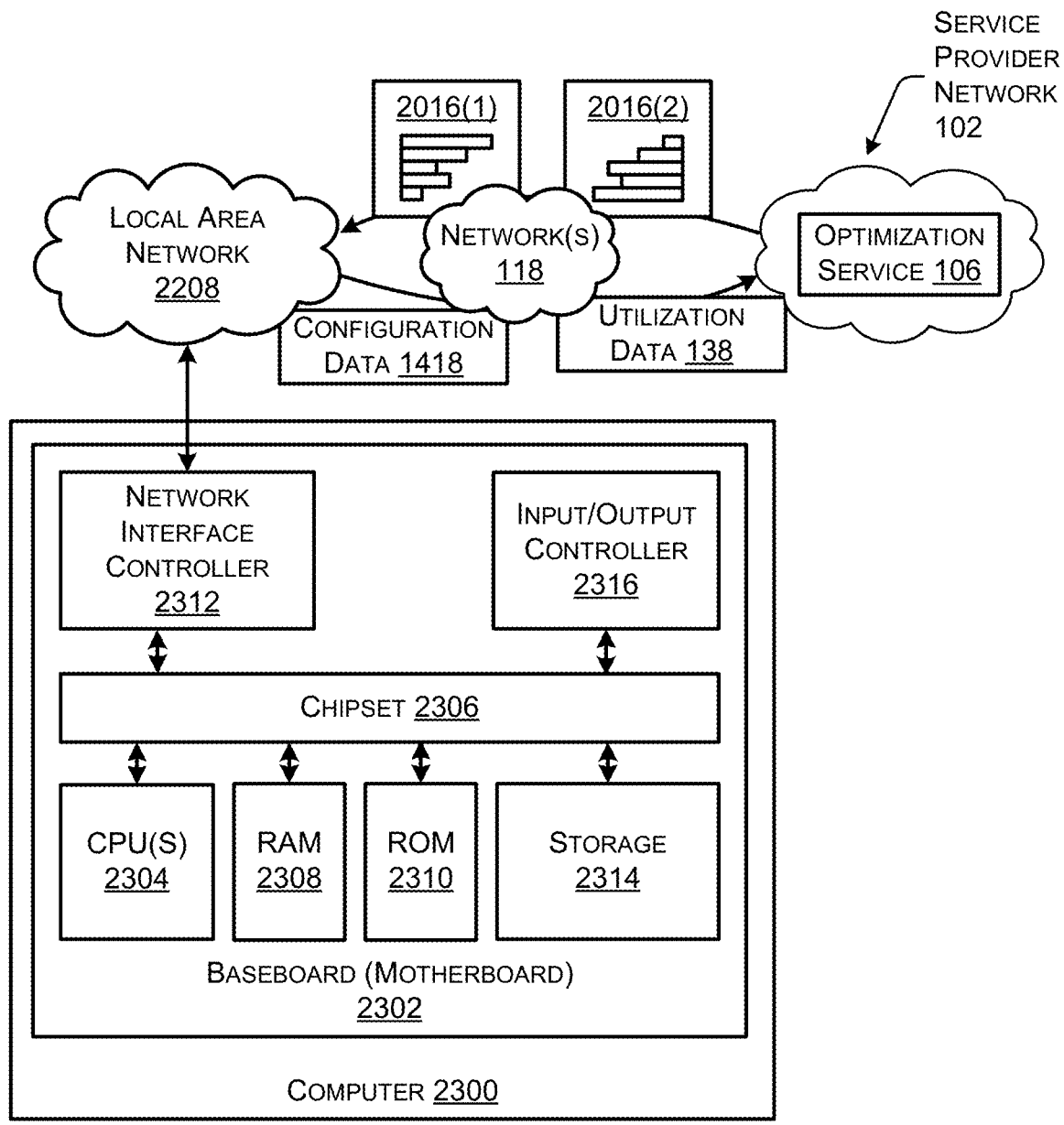
FIG. 23 is a computer architecture diagram showing an illustrative computer hardware architecture for implementing a computing device that can be utilized to implement aspects of the various technologies presented herein.

FIG. 23 shows an example computer architecture for a computer 2300 capable of executing program components for implementing the functionality described above. The computer architecture shown in FIG. 23 illustrates a conventional server computer, workstation, desktop computer, laptop, tablet, network appliance, e-reader, smartphone, or other computing device, and can be utilized to execute any of the software components presented herein. In some examples, the server computer 2300 may correspond to, or be the same as or similar to, a computing device 112 described in FIG. 1.

The computer 2300 includes a baseboard 2302, or "motherboard," which is a printed circuit board to which a multitude of components or devices can be connected by way of a system bus or other electrical communication paths. In one illustrative configuration, one or more central processing units ("CPUs") 2304 operate in conjunction with a chipset 2306. The CPUs 2304 can be standard programmable processors that perform arithmetic and logical operations necessary for the operation of the computer 2300.

The CPUs 2304 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 2306 provides an interface between the CPUs 2304 and the remainder of the components and devices on the baseboard 2302. The chipset 2306 can provide an interface to a RAM 2308, used as the main memory in the computer 2300. The chipset 2306 can further provide an interface to a computer-readable storage medium such as a read-only memory ("ROM") 2310 or non-volatile RAM ("NVRAM") for storing basic routines that help to startup the computer 2300 and to transfer information between the various components and devices. The ROM 2310 or NVRAM can also store other software components necessary for the operation of the computer 2300 in accordance with the configurations described herein.

The computer 2300 can operate in a networked environment using logical connections to remote computing devices and computer systems through a network, such as the network 2208. The chipset 2306 can include functionality for providing network connectivity through a network interface controller (NIC) 2312, such as a gigabit Ethernet adapter. The NIC 2312 is capable of connecting the computer 2300 to other computing devices over the network 2208 (or 118). It should be appreciated that multiple NICs 2312 can be present in the computer 2300, connecting the computer to other types of networks and remote computer systems.

The computer 2300 can include storage 2314 (e.g., disk) that provides non-volatile storage for the computer. The storage 2314 can consist of one or more physical storage units. The storage 2314 can store information by altering the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 2300 can further read information from the storage 2314 by detecting the physical states or characteristics of one or more particular locations within the physical storage units.

In addition to the storage 2314 described above, the computer 2300 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 2300. In some examples, the operations performed by the service provider network 102, and or any components included therein, may be supported by one or more devices similar to computer 2300. Stated otherwise, some or all of the operations performed by the service provider network 102, and or any components included therein, may be performed by one or more computer devices 2300 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The storage 2314 can store an operating system utilized to control the operation of the computer 2300. According to one embodiment, the operating system comprises the LINUX operating system. According to another embodiment, the operating system comprises the WINDOWS SERVER operating system from MICROSOFT Corporation of Redmond, Wash. According to further embodiments, the operating system can comprise the UNIX operating system or one of its variants. It should be appreciated that other operating systems can also be utilized. The storage 2314 can store other system or application programs and data utilized by the computer 2300.

In one embodiment, the storage 2314, RAM 2308, ROM 2310, and/or other computer-readable storage media may be encoded with computer-executable instructions which, when loaded into the computer 2300, transform the computer from a general-purpose computing system into a special-purpose computer capable of implementing the embodiments described herein. These computer-executable instructions transform the computer 2300 by specifying how the CPUs 2304 transition between states, as described above. According to one embodiment, the computer 2300 has access to computer-readable storage media storing computer-executable instructions which, when executed by the computer 2300, perform the various techniques described above. The computer 2300 can also include computer-readable storage media having instructions stored thereupon for performing any of the other computer-implemented operations described herein.

Generally, the computer 2300 may be an example of a computing device 112 (and other computing devices, servers, etc.) described herein. The CPU(s) 2304, RAM 2308, ROM 2310, storage 2314, bandwidth of the NIC 2312, and/or other resources of the computer 230 may be allocated to one or more different VM instances 114 as described herein based on the VM instance types 130.

The computer 2300 can also include one or more input/output controllers 2316 for receiving and processing input from a number of input devices, such as a keyboard, a mouse, a touchpad, a touch screen, an electronic stylus, or other type of input device. Similarly, an input/output controller 2316 can provide output to a display, such as a computer monitor, a flat-panel display, a digital projector, a printer, or other type of output device. It will be appreciated that the computer 2300 might not include all of the components shown in FIG. 23, can include other components that are not explicitly shown in FIG. 23, or might utilize an architecture completely different than that shown in FIG. 23.

Figure 24:
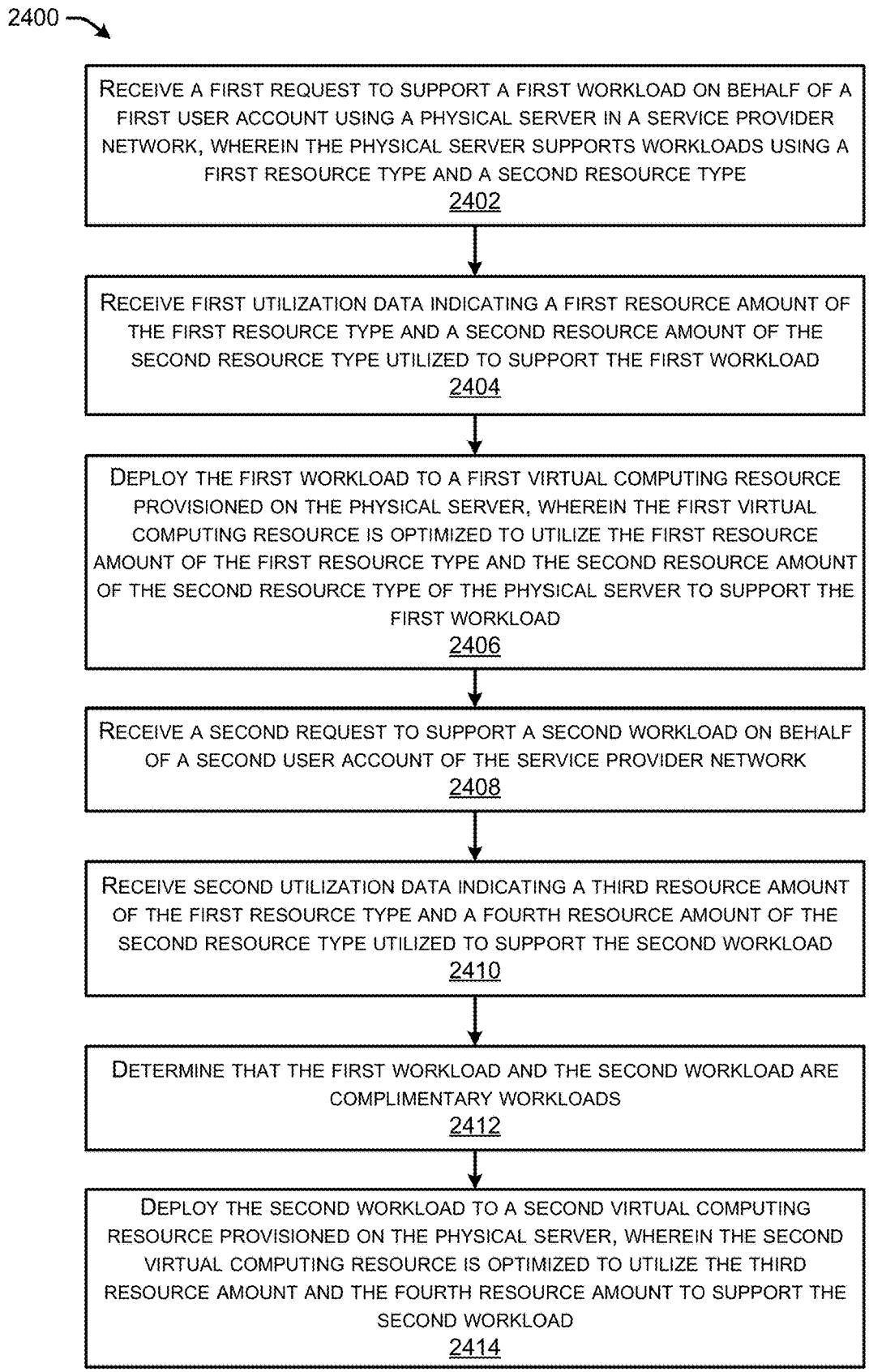
FIG. 24 illustrates a flow diagram of an example method for deploying workloads on VM instances that are supported by a same physical server based on the workloads being computationally compatible.

FIG. 24 illustrates a flow diagram of an example method 2400 for deploying workloads on virtual computing resources that are supported by a same physical server based on the workloads being computationally compatible. As described herein, a virtual computing resource may comprise one or more of a VM instance 114, a virtual container, a program, and/or any other virtual representation.

At 2402, the service provider network 102 may receive a first request to support a first workload on behalf of a first user account using a physical server in a service provider network, wherein the physical server supports workloads using a first resource type and a second resource type.

At 2404, the service provider network 102 may receive first utilization data indicating a first resource amount of the first resource type and a second resource amount of the second resource type utilized to support the first workload.

At 2406, the service provider network 102 may deploy the first workload to a first virtual machine (VM) instance provisioned on the physical server, wherein the first virtual computing resource is optimized to utilize the first resource amount of the first resource type and the second resource amount of the second resource type of the physical server to support the first workload.

At 2408, the service provider network 102 may receive a second request to support a second workload on behalf of a second user account of the service provider network. At 2410, the service provider network 102 may receive second utilization data indicating a third resource amount of the first resource type and a fourth resource amount of the second resource type utilized to support the second workload.

At 2412, the service provider network 102 may determine that the first workload and the second workload are complimentary workloads based on the first resource amount utilized to support the first workload being greater than the second resource amount utilized to support the second workload, and the second resource amount utilized to support the first workload being less than the fourth resource amount utilized to support the second workload;

At 2412, the service provider network 102 may, based at least in part on the first workload and the second workload being complimentary workloads, deploy the second workload to a second virtual computing resource provisioned on the physical server, wherein the second virtual computing resource is optimized to utilize the third resource amount and the fourth resource amount to support the second workload.

In various examples, computationally compatible workloads 136 and/or VM instance types 130 may be based on how well the compute-dimension utilization 2004 matches up for at least one of the compute dimensions 2206-2014 (e.g., one compute dimension, two compute dimensions, five compute dimensions, etc.). In some examples, computationally compatible workloads 136 and/or VM instance types 130 may include combinations of workloads 136 and/or VM instance types 130 that, in combination, (i) achieve maximum utilization of the underlying computing device 112, (ii) achieve a desired or goal utilization of the underlying computing device 112, and/or (iii) achieve a desired oversubscription of the underlying computing device 112 to ensure efficient utilization of the underlying resources of the computing device 112.

Figure 25:
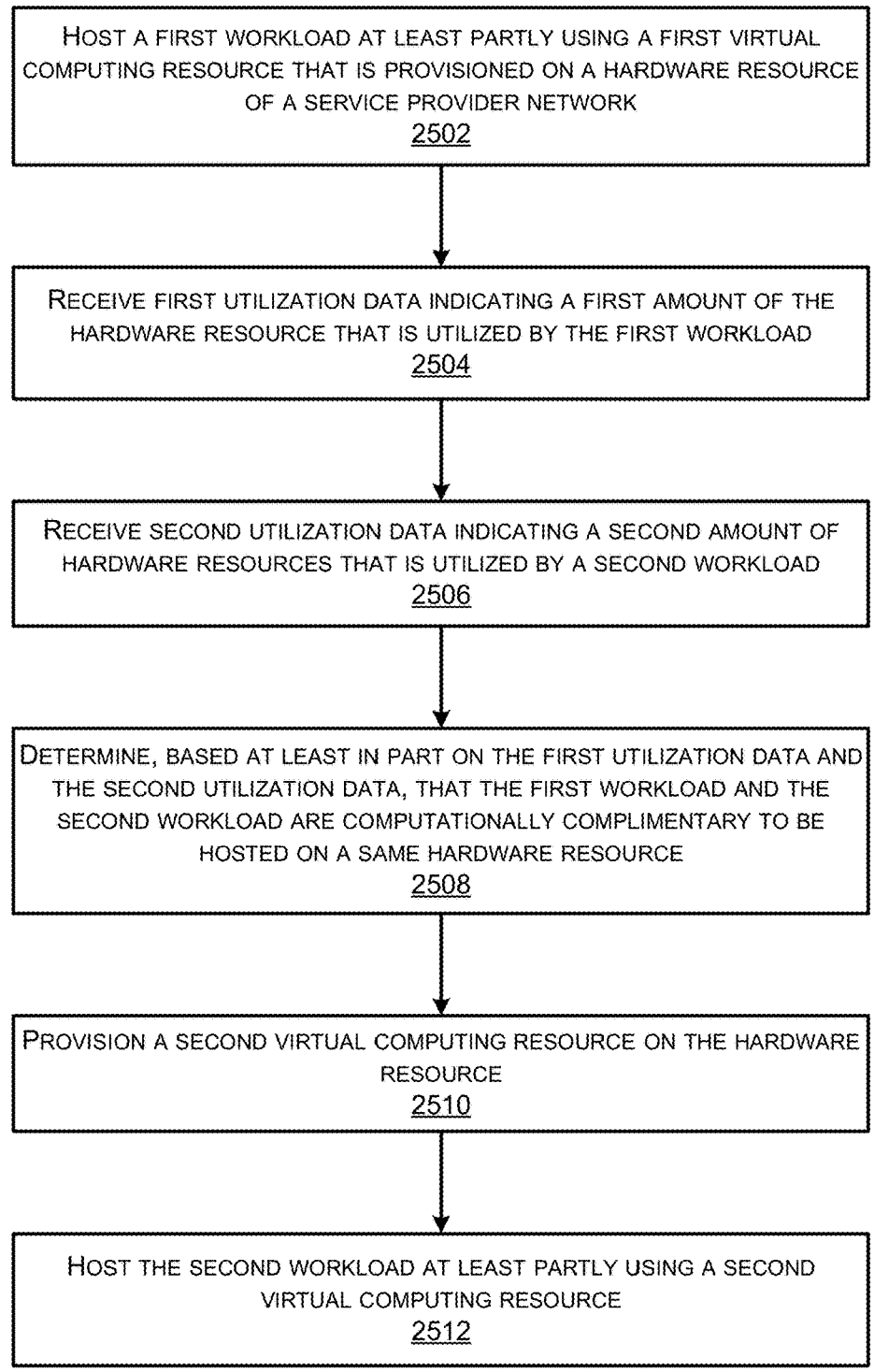
FIG. 25 illustrates a flow diagram of an example method for determining that workloads are computationally compatible, and using VM instances on a same hardware resource to host the workloads.

FIG. 25 illustrates a flow diagram of an example method 2500 for determining that workloads are computationally compatible, and using virtual computing resources on a same hardware resource to host the workloads. As described herein, a virtual computing resource may comprise one or more of a VM instance 114, a virtual container, a program, and/or any other virtual representation.

At 2502, the service provider network 102 may host a first workload at least partly using a first virtual machine (VM) instance that is provisioned on a hardware resource of a service provider network. At 2504, the service provider network 102 may receive first utilization data indicating a first amount of the hardware resource that is utilized by the first workload.

At 2506, the service provider network 102 may receive second utilization data indicating a second amount of hardware resources that is utilized by a second workload. At 2508, the service provider network 102 may determine, based at least in part on the first utilization data and the second utilization data, that the first workload and the second workload are computationally complimentary to be hosted on a same hardware resource.

At 2510, the service provider network 102 may provision a second virtual computing resource on the hardware resource. At 2512, the service provider network 102 may host the second workload at least partly using a second virtual computing resource.

Figure 26:
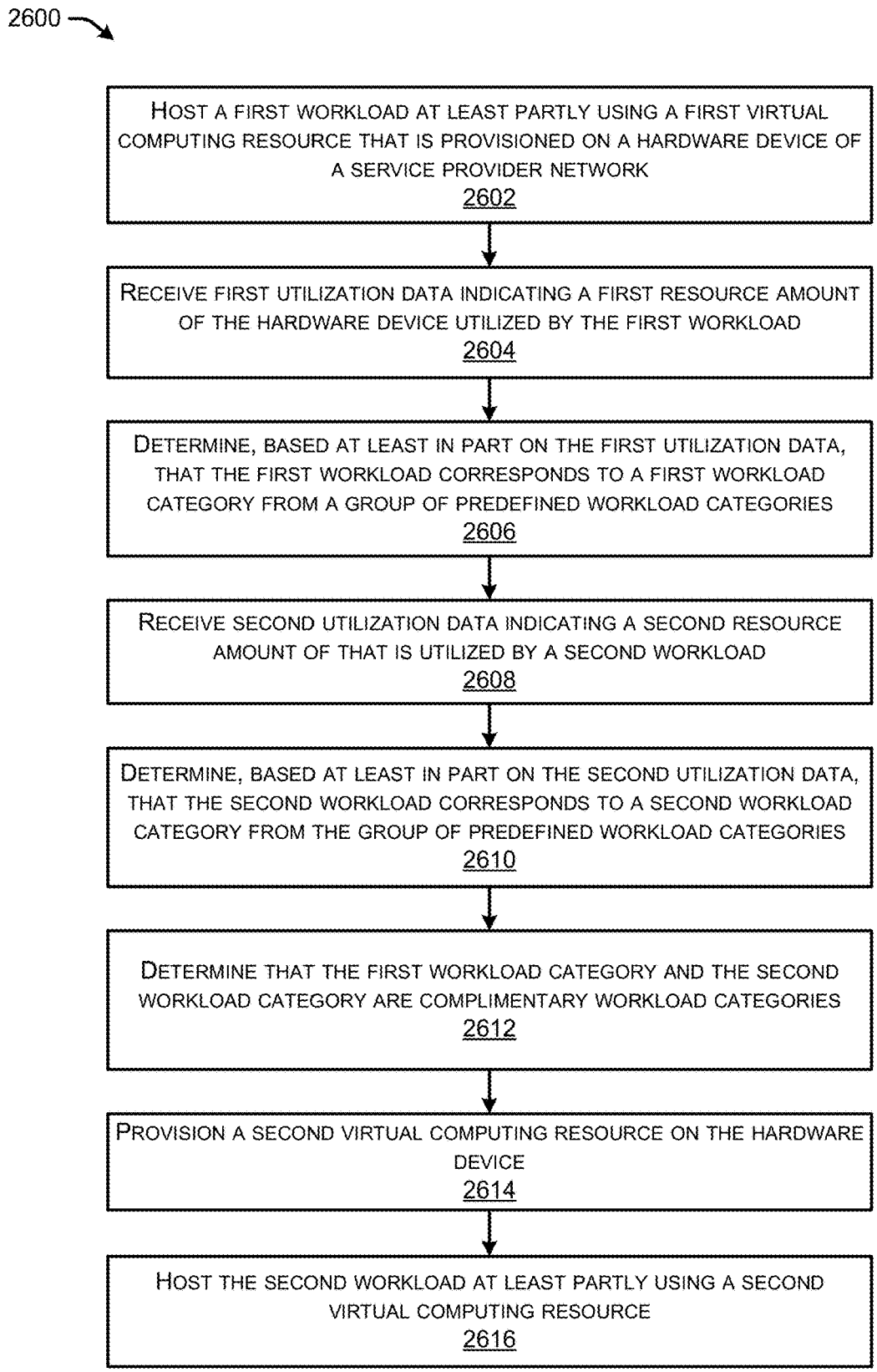
FIG. 26 illustrates a flow diagram of an example method for determining to place workloads on VM instances that are on a same hardware device based on the workloads belonging to computationally compatible workload categories.

FIG. 26 illustrates a flow diagram of an example method 2600 for determining to place workloads on virtual computing resources that are on a same hardware device based on the workloads belonging to computationally compatible workload categories. As described herein, a virtual computing resource may comprise one or more of a VM instance 114, a virtual container, a program, and/or any other virtual representation.

At 2602, the service provider network 102 may host a first workload at least partly using a first virtual machine (VM) instance that is provisioned on a hardware device of a service provider network. At 2604, the service provider network 102 may receive first utilization data indicating a first resource amount of the hardware device utilized by the first workload.

At 2606, the service provider network 102 may determine, based at least in part on the first utilization data, that the first workload corresponds to a first workload category from a group of predefined workload categories.

As described throughout this application, determining that a workload corresponds to a workload category may comprise comparing resource utilization for at least one of the computing resource types, and potentially several of the computing resource types, to the resource-utilization models 224 for the workload categories 220. The resource-utilization model 224 that is most similar across the one or more dimensions of compute (e.g., the same, similar by a factor of some x amount, etc.) may be selected as the workload category 130 to which the workload 136 matches.

At 2608, the service provider network 102 may receive second utilization data indicating a second resource amount of that is utilized by a second workload. At 2610, the service provider network 102 may determine, based at least in part on the second utilization data, that the second workload corresponds to a second workload category from the group of predefined workload categories.

At 2612, the service provider network 102 may determine that the first workload category and the second workload category are complimentary workload categories. At 2614, the service provider network 102 may provision a second virtual computing resource on the hardware device. At 2616, the service provider network 102 may host the second workload at least partly using a second virtual computing resource.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:
1. A system comprising:
a computing resource network of a service provider network that is managed by a service provider, the computing resource network comprising computing resources configured to support at least:
a first virtual machine type configured to utilize a first combination of types of the computing resources to support workloads, the first combination of the types including a first amount of a central processing unit (CPU) resource type and a second amount of a memory resource type; and
a second virtual machine type configured to utilize a second combination of the types of the computing resources to support workloads, the second combination of the types including a third amount of the CPU resource type and a fourth amount of the memory resource type; and
an optimization service associated with the service provider network, the optimization service comprising:
one or more processors; and
one or more computer-readable media storing computer-executable instructions that, when executed by the one or more processors, cause the one or more processors to:

receive, via a user account registered with the service provider network, a first request to support a workload on behalf of the user account using the computing resources;

receive, via the user account, a second request for a recommendation of a virtual machine type that is optimized to support the workload;

provide the user account with access to one or more user interfaces configured to receive input data describing the workload;

receive, via the one or more user interfaces, input data that indicates resource-utilization characteristics associated with supporting the workload;

map, based on the resource-utilization characteristics, the workload to a workload category from a group of predefined workload categories, wherein the workload category represents workloads supported by a third combination of the types of the computing resources, the third combination of the types including a fifth amount of the CPU resource type and a sixth amount of the memory resource type;

determine that the first virtual machine type is optimized to support the workload by determining that:
the first amount of the CPU resource type provided by the first virtual machine type is greater than the fifth amount of the CPU resource type used by the workloads of the workload category; and
the second amount of the memory resource type provided by the first virtual machine type is greater than the sixth amount of the memory resource type;

generate recommendation data including an indication that that the first virtual machine type is optimized to support the workload requested by the user account;

provide the user account with access to the recommendation data;

provision a virtual machine corresponding to the first virtual machine type in the computing resource network to support the workload on behalf of the user account; and run the workload on the virtual machine that is provisioned in the computing resource network.

2. The system of claim 1, wherein the recommendation data further includes:
suitability data indicating a measure of suitability for the first virtual machine type to support the workload requested by the user account; and
text data including a textual explanation regarding the suitability of the first virtual machine type for supporting the workload.

3. A computer-implemented method comprising:
receiving, via a user account associated with a service provider network, a first request to launch a workload using at least one virtual machine that is supported by computing resources associated with the service provider network, wherein the computing resources support at least:
a first virtual machine type that is allocated a first amount of a first resource type of the computing resources and a second amount of a second resource type of the computing resources; and
a second virtual machine type that is allocated a third amount of the first resource type of the computing resources and a fourth amount of the second resource type of the computing resources;

receiving, via the user account, a second request for a recommendation of a virtual machine type that is optimized to support the workload;

provide the user account with access to one or more user interfaces configured to receive input data describing the workload;

receiving, via the one or more user interfaces, input data that indicates a resource-utilization characteristic of the workload during execution, the resource-utilization characteristic indicating an amount of the computing resources consumed by the workload and a resource type of the computing resources consumed by the workload;

mapping, based at least in part on the resource-utilization characteristic, the workload to a workload category of a group of predefined workload categories, the workload category representing workloads supported by a fifth amount of the first resource type and a sixth amount of the second resource type;

determining that the first virtual machine type is optimized to support the workload by determining that:
the first amount of the first resource type provided by the first virtual machine type is greater than the fifth amount of the first resource type used by the workloads of the workload category; and
the second amount of the second resource type provided by the first virtual machine type is greater than the sixth amount of the second resource type;

providing, to the user account, recommendation data including a recommendation that the first virtual machine type be used to at least one of launch or execute the workload;

launching a virtual machine on the computing resources, the virtual machine corresponding to the first virtual machine type; and causing the workload to be at least one of launched or executed on the virtual machine.

4. The computer-implemented method of claim 3, wherein the computing resources comprise first computing resources, further comprising:
receiving, from the user account, an indication that the workload is being migrated from being supported by second computing resources included in a computing resource network remote from the service provider network,
wherein the user account is provided with access to the one or more use interfaces responsive to receiving the indication that the workload is being migrated.

5. The computer-implemented method of claim 3, further comprising at least one of:
providing, to the user account, suitability data indicating a measure of suitability for the first virtual machine type to be used to launch the workload; or
providing, to the user account, text data including a textual explanation regarding the suitability of the first virtual machine type to be used to launch the workload.

6. The computer-implemented method of claim 3, further comprising:
receiving, from the user account, input data indicating a selection of the first virtual machine type to be used to at least one of launch or execute the workload.

7. The computer-implemented method of claim 3, further comprising:
receiving historical-utilization data indicating historical resource-utilization characteristics for a group of workload types supported by the computing resources on behalf of other user accounts;

defining labeled clusters corresponding to a group of workload categories;

clustering, based at least in part on the historical resource-utilization characteristics, the workload types into the labeled clusters; and defining the labeled clusters utilizing the group of workload categories to generate the group of predefined workload categories.

8. The computer-implemented method of claim 3, further comprising:

receiving, from the user account, input data indicating an optimization goal associated with consumption of the first resource type of computing resource by the workload; and determining that the first amount of the first resource type of the computing resources allocated for the first virtual machine type satisfies the optimization goal.

9. The computer-implemented method of claim 3, further comprising:

determining a number of virtual machines of the first virtual machine type to utilize to at least one of launch or execute the workload; and providing the user account with additional recommendation data that indicates the number of the virtual machines of the first virtual machine type to utilize to at least one of launch or execute the workload.

10. The computer-implemented method of claim 3, wherein the first resource type and the second resource type correspond to different ones of at least one of:

a central processing unit (CPU) resource;
a memory resource;
a storage resource; or
a network availability resource.

11. A system comprising:

one or more processors; and one or more computer-readable media storing computer-executable instructions that, when executed by the one or more processors, cause the one or more processors to:

receive, via a user account of a service provider network, a first request to launch a workload using at least one virtual machine that is supported by computing resources associated with the service provider network, wherein the computing resources support at least:

a first virtual machine type that is allocated a first amount of a first resource type of the computing resources and a second amount of a second resource type of the computing resources; and a second virtual machine type that is allocated a third amount of the first resource type of the computing resources and a fourth amount of the second resource type of the computing resources;

receive, via the user account, a second request for a recommendation of a virtual machine type that is optimized to support the workload;

provide the user account with access to one or more user interfaces configured to receive input data associated with the workload;

receive, at least partly via the one or more user interfaces, input data that indicates a resource-utilization characteristic associated with the workload;

map, based at least in part on the resource-utilization characteristic, the workload to a workload category of a group of predefined workload categories, the workload category representing workloads supported by a fifth amount of the first resource type and a sixth amount of the second resource type determine that the first virtual machine type is optimized to support the workload by determining that:

the first amount of the first resource type provided by the first virtual machine type is greater than the fifth amount of the first resource type used by the workloads of the workload category; and the second amount of the second resource type provided by the first virtual machine type is greater than the sixth amount of the second resource type;

provide, to the user account, recommendation data including a recommendation that the first virtual machine type be used to at least one of launch or execute the workload;

launching a virtual machine on the computing resources, the virtual machine corresponding to the first virtual machine type; and causing the workload to be at least one of launched or executed on the virtual machine.

12. The system of claim 11, comprising further computer-executable instructions that, when executed by the one or more processors, cause the one or more processors to at least one of:

provide, to the user account, suitability data indicating a measure of suitability for the first virtual machine type to be used to at least one of launch or execute the workload; or provide, to the user account, text data including a textual explanation regarding the suitability of the first virtual machine type to be used to at least one of launch or execute the workload.

13. The system of claim 11, wherein:

the one or more user interfaces includes an input field associated with a set of predefined answers; and receiving the input data includes receiving a selection of a predefined answer of the set of predefined answers to populate the input field, the predefined answer defining at least a portion of the resource-utilization characteristic.

14. The system of claim 11, comprising further computer-executable instructions that, when executed by the one or more processors, cause the one or more processors to:

receive, via the user account, input data indicating an optimization goal associated with consumption of the first resource type of computing resource by the workload; and determine that the first amount of the computing resources allocated for the first virtual machine type satisfies the optimization goal.

15. The system of claim 11, wherein the resource-utilization characteristic indicates an amount of the computing resources consumed by the workload, comprising further computer-executable instructions that, when executed by the one or more processors, cause the one or more processors to:

determine a number of virtual machines of the first virtual machine type to utilize to at least one of launch or execute the workload; and provide the user account with additional recommendation data that indicates the number of the virtual machines of the first virtual machine type to utilize to at least one of launch or execute the workload.

16. The system of claim 11, comprising further computer-executable instructions that, when executed by the one or more processors, cause the one or more processors to:

receive historical utilization data indicating historical resource-utilization characteristics for a group of workload types supported by the computing resources on behalf of other user accounts;

define labeled clusters corresponding to a group of workload categories;

cluster, based at least in part on the historical resource-utilization characteristics, the workload types into the labeled clusters; and define the labeled clusters utilizing the group of workload categories to generate the group of predefined workload categories.

17. The system of claim 11, wherein the computing resources are first computing resources, comprising further computer-executable instructions that, when executed by the one or more processors, cause the one or more processors to:

receive, from the user account, an indication that the workload is being migrated from being supported by second computing resources included in a computing resource network remote from the service provider network; and provide the user account with an interface configured to receive resource consumption data associated with consumption of the second computing resources by the workload, wherein receiving the input data includes receiving, via the interface, the resource consumption data.

18. The system of claim 11, wherein:

receiving the input data includes receiving text data that includes a description of the resource-utilization characteristic associated with the workload; and determining that the first virtual machine type is optimized to support the workload includes:

using the text data, mapping the workload to a predefined workload category from a group of predefined workload categories; and determining that the first virtual machine type is optimized to at least one of launch or execute workloads of the predefined workload category.

19. The system of claim 11, wherein to receive, via the one or more user interfaces, the input data includes receiving a textual description of the workload, comprising further computer-executable instructions that, when executed by the one or more processors, cause the one or more processors to:

map at least a portion of the textual description of the workload to a workload category of a group of workload categories; and determine that the first virtual machine type is indicated as being optimized for hosting workloads of the workload category.

* * * * *